United States Patent [19]

Wood

[11] Patent Number: 5,381,332
[45] Date of Patent: Jan. 10, 1995

[54] PROJECT MANAGEMENT SYSTEM WITH AUTOMATED SCHEDULE AND COST INTEGRATION

[75] Inventor: Mark A. Wood, Fort Wayne, Ind.

[73] Assignee: Motorola, Inc., Schaumburg, Ill.

[21] Appl. No.: 803,850

[22] Filed: Dec. 9, 1991

[51] Int. Cl.6 .............................................. G06F 15/21
[52] U.S. Cl. .................................... 364/401; 364/402
[58] Field of Search .............. 364/401, 402, 408, 406, 364/468, 419.19

[56] References Cited

U.S. PATENT DOCUMENTS

| | | | |
|---|---|---|---|
| 4,843,548 | 6/1989 | Carpenter | 364/406 |
| 4,851,999 | 7/1989 | Moriyama | 364/401 |
| 4,862,376 | 8/1989 | Ferriter et al. | 364/468 |
| 4,875,162 | 10/1989 | Ferriter et al. | 364/401 |
| 5,016,170 | 5/1991 | Pollalis et al. | 364/401 |
| 5,089,970 | 2/1992 | Lee et al. | 364/468 |
| 5,101,352 | 3/1992 | Rembert | 364/401 |
| 5,189,608 | 2/1993 | Lyons et al. | 364/408 |
| 5,272,628 | 12/1993 | Koss | 364/419.19 |

*Primary Examiner*—Robert A. Weinhardt
*Attorney, Agent, or Firm*—Gregory J. Gorrie; Robert M. Handy

[57] ABSTRACT

A bridge is provided between a conventional network scheduling tool and a conventional performance measurement tool which automatically ties the two together. The combination is adapted to operate within an organization having numerous resources that are used to accomplish projects. Data required by the performance measurement tool are collected by the network scheduling tool. These data fall into two categories. One category is utilized by both the network scheduling tool and the performance measurement tool, the other category is utilized exclusively by the performance measurement tool. These data are processed by the bridge so that they have the format and properties needed by each tool. The bridge couples data between the tools and keeps the data stored in each tool consistent. In this way duplicate entry of initial data and revisions are avoided.

20 Claims, 49 Drawing Sheets

| DATA PROCESSED BY BRIDGE | | |
|---|---|---|
| NAME | REF. | SIZE |
| *UNIQUE PERFORMANCE MEASUREMENT DATA (UPMD)* | | |
| WORK BREAKDOWN STRUCTURE IDENTIFIER (WBS_ID) | 514 | 16 |
| EARNED VALUE METHOD TYPE (EVMT) | 516 | 1 |
| PERCENT TYPE | 518 | 1 |
| PERCENT COMPLETE | 520 | 3 |
| MILESTONE WEIGHT | 522 | 5 |
| BUDGETED COST OF WORK PERFORMED (BCWP) | 524 | 6 |
| WORK BREAKDOWN STRUCTURE TYPE (WBST) | 526 | 1 |
| MANAGER'S IDENTIFIER | 528 | 3 |
| PERFORMING DEPARTMENT IDENTIFIER | 530 | 5 |
| RESPONSIBLE DEPARTMENT IDENTIFIER | 532 | 5 |
| RESOURCE SPREAD CODE | 534 | 1 |
| RESOURCE SPREAD CODE OVERRIDE | 536 | 1 |
| *COMMON ACTIVITY NETWORK SCHEDULING DATA* | | |
| WORK UNIT DESCRIPTION | 538 | 50 |
| EARLY START DATE (ES) | 540 | 8 |
| EARLY FINISH DATE (EF) | 542 | 8 |
| LATE START DATE (LS) | 544 | 8 |
| LATE FINISH DATE (LF) | 546 | 8 |
| PLANNED START DATE (PS) | 548 | 8 |
| PLANNED FINISH DATE (PF) | 550 | 8 |
| TIME LINE PERCENT COMPLETE | 552 | 8 |
| ACTIVITY IDENTIFICATION | 554 | |
| WORK UNIT TYPE | 558 | 10 |
| *COMMON RESOURCE NETWORK SCHEDULING DATA* | | |
| RESOURCE NAME | 560 | 16 |
| RESOURCE UNIT | 562 | 16 |
| RESOURCE PLANNED | 564 | 8 |
| RESOURCE REMAINING | 566 | 8 |

| DATA PROCESSED BY BRIDGE | | |
|---|---|---|
| NAME | REF. | SIZE |
| UNIQUE PERFORMANCE MEASUREMENT DATA (UPMD) | | |
| WORK BREAKDOWN STRUCTURE IDENTIFIER (WBS_ID) | 514 | 16 |
| EARNED VALUE METHOD TYPE (EVMT) (SEE FIGURE 6) | 516 | 1 |
| PERCENT TYPE | 518 | 1 |
| PERCENT COMPLETE | 520 | 3 |
| MILESTONE WEIGHT | 522 | 5 |
| BUDGETED COST OF WORK PERFORMED (BCWP) | 524 | 6 |
| WORK BREAKDOWN STRUCTURE TYPE (WBST) (SEE FIGURE 7) | 526 | 1 |
| MANAGER'S IDENTIFIER | 528 | 3 |
| PERFORMING DEPARTMENT IDENTIFIER | 530 | 5 |
| RESPONSIBLE DEPARTMENT IDENTIFIER | 532 | 5 |
| RESOURCE SPREAD CODE (SEE FIGURE 8) | 534 | 1 |
| RESOURCE SPREAD CODE OVERRIDE (SEE FIGURE 8) | 536 | 1 |
| COMMON ACTIVITY NETWORK SCHEDULING DATA | | |
| WORK UNIT DESCRIPTION | 538 | 50 |
| EARLY START DATE (ES) | 540 | 8 |
| EARLY FINISH DATE (EF) | 542 | 8 |
| LATE START DATE (LS) | 544 | 8 |
| LATE FINISH DATE (LF) | 546 | 8 |
| PLANNED START DATE (PS) | 548 | 8 |
| PLANNED FINISH DATE (PF) | 550 | 8 |
| TIME LINE PERCENT COMPLETE | 552 | 8 |
| ACTIVITY IDENTIFICATION | 554 | |
| WORK UNIT TYPE | 558 | 10 |
| COMMON RESOURCE NETWORK SCHEDULING DATA | | |
| RESOURCE NAME | 560 | 16 |
| RESOURCE UNIT | 562 | 16 |
| RESOURCE PLANNED | 564 | 8 |
| RESOURCE REMAINING | 566 | 8 |

FIG. 5

| EARNED VALUE METHOD TYPE (EVMT) CODES ||
|---|---|
| CODE | DESCRIPTION |
| 0 | NO EARNED VALUE COMPUTATION REQUIRED. |
| 1 | X/Y COMPUTATION WITH 0% EARNED AT START AND 100% EARNED AT COMPLETION. |
| 2 | X/Y COMPUTATION WITH 25% EARNED AT START AND 75% EARNED AT COMPLETION. |
| 3 | X/Y COMPUTATION WITH 40% EARNED AT START AND 60% EARNED AT COMPLETION. |
| 4 | X/Y COMPUTATION WITH 50% EARNED AT START AND 50% EARNED AT COMPLETION. |
| 5 | COMPLETION PERCENTAGE SUPPLIED. |
| 6 | LEVEL OF EFFORT (LOE): EARNINGS ARE EQUAL TO EFFORT PLANNED AMOUNTS. |
| 7 | EARNED STANDARDS: TOTAL EARNED STANDARDS SUPPLIED. |
| 8 | MILESTONES: MILESTONE WEIGHTS USED FOR EARNING. |
| 9 | BCWP: BUDGETED COST OF WORK PERFORMED SUPPLIED. |
| P | MILESTONE PERCENTAGE: EARNINGS AT MILESTONES CORRESPOND TO SUPPLIED PERCENTAGES. |

| WORK BREAKDOWN STRUCTURE TYPE (WBST) CODES ||
|---|---|
| CODE | DESCRIPTION |
| C | COST ACCOUNT |
| M | MILESTONE |
| O | OTHER (TYPICALLY A SUMMARY WBS ELEMENT) |
| P | PLANNING PACKAGE |
| W | WORK PACKAGE |

| RESOURCE SPREAD CODES ||
|---|---|
| CODE | DESCRIPTION |
| 1 | LINEAR (RESOURCE USED EVENLY OVER TIME) |
| 2 | BELL CURVE (USAGE FOLLOWS BELL CURVE) |
| 3 | FRONT LOAD #1 (GREATEST USAGE IMMEDIATELY AFTER START) |
| 4 | FRONT LOAD #2 (GREATEST USAGE SHORTLY AFTER START) |
| 5 | BACK LOAD #1 (GREATEST USAGE IMMEDIATELY BEFORE COMPLETION) |
| 6 | BACK LOAD #2 (GREATEST USAGE SHORTLY BEFORE COMPLETION) |
| 7 | DOUBLE PEAK (TWO PERIODS OF GREATEST USAGE) |
| 8 | EARLY PEAK (SIMILAR TO BELL CURVE, BUT USAGE PEAK IS SHIFTED TOWARD START) |
| 9 | LATE PEAK (SIMILAR TO BELL CURVE, BUT USAGE PEAK IS SHIFTED TOWARD COMPLETION) |
| 10 | TRAPEZOID (SIMILAR TO BELL CURVE, BUT USAGE PEAK IS DISTRIBUTED OVER A GREATER PERCENTAGE OF WORK) |

FIG. 8

PROJECT MANAGEMENT SYSTEM WITH AUTOMATED SCHEDULE AND COST INTEGRATION

TECHNICAL FIELD OF THE INVENTION

The present invention relates generally to project management systems. Specifically, the present invention relates to computerized systems and methods for coordinating project scheduling and for controlling project costs. In particular, the present invention relates to systems and methods for automatically integrating schedule coordination with cost control.

BACKGROUND OF THE INVENTION

Computerized project management tools are used in an organization to coordinate complex projects so that they may be successfully completed in an efficient manner. In general, such tools collect data that describe the organization. This collected data describe materials, supplies, and equipment available for or needed by a project, the personnel available to work on the project, project timing constraints, project budget, and the like. Such tools then process this data so that information pertinent to evaluating a project's progress, needs, and forecast is generated. The project management tools' data structures are routinely updated during the course of a project so that they remain current. Resources are allocated and reallocated within the organization in response to the information generated by the project management tools in order to complete the project in a desired manner.

The present invention relates to two diverse types of project management tools. One type is a network scheduling tool (NST) and the other is a performance measurement tool (PMT). NSTs are useful in coordinating the schedule of a complex project and in managing the projects resources. PMTs are useful in allocating budgets and in controlling or otherwise managing a project's costs. Both types of project management tools are well known to those skilled in the art of project management, and both types of tools are often used in the management of a single complex project.

When both types of tools are used on a single project, it is critically important that they be integrated. In other words, certain types of data must be maintained in alignment between the NST and the PMT. For example, if the NST defines a task differently from the PMT, then the feedback provided by the PMT will be meaningless. Worse yet, a task scheduled in the NST may not have a budget allocated for its completion if the PMT does not have accurate data describing the task.

Maintaining alignment between an NST and a PMT is difficult because conventional NSTs and conventional PMTs use incompatible methodologies in collecting and processing the data they need to perform their respective functions. For example, NST's assume resource usage is linear over time. In other words, if a resource, such as 10 people, is allocated to performing a particular task, called an activity in NST terminology, then the NST assumes that the resource (i.e. the 10 people) is consumed at a constant rate throughout the duration of the task or activity. More detail is undesirable because it is irrelevant to the scheduling function and would only obfuscate scheduling information generated by the NST.

On the other hand, the PMT is concerned with allocating budgets and measuring how actual performance conforms to budgets. The focus is on money more than time. While PMTs recognize resource planning and usage, they are required to budget resource usage as that usage is actually expected to occur. For example, the PMT recognizes that a task, called a work package in PMT terminology, which averages 10 people throughout the duration of the task might actually be expected to utilize 20 people at its beginning stages and to taper down to 1 person at its ending stages. This added level of detail is necessary to insure that accurate budgets are prepared and followed.

In addition, a conventional NST utilizes only a single technique for taking credit for completed work. In particular, a statusing operation in an NST generates information that describes only the percentage of an activity's planned duration that has transpired as of a status date. For example, at one week into an activity that is scheduled to require two weeks for completion, the activity is considered 50% complete. This limited level of crediting completed work is acceptable for the NST function and even desirable because added details would only obfuscate scheduling concerns. On the other hand, because PMTs deal with budgeting and performance against an allocated budget, they are required to focus upon additional details. For example, a conventional PMT recognizes that a work package which is expected to require two weeks for completion might have consumed 90% of its budget and be 90% complete after the first week.

Furthermore, data structures used by conventional NSTs are less complex than data structures used by conventional PMTs. Hierarchical data structures formed and recorded in NSTs seldom exceed 2–3 levels of hierarchy while data structures formed and recorded in PMTs for projects performed under government contracts often have 10–15 levels of hierarchy. Hence, no set relationship exists between the hierarchy of NST activities and the hierarchy of PMT work packages.

While conventional PMTs may be viewed as having more complex data requirements than conventional NSTs, PMTs cannot simply be expanded to provide the NST functions. Since PMTs deal with performance and budgeting matters, they typically employ strict data security measures to insure that approved baselines are not lightly altered, either by accident or individual action. On the other hand, NSTs require flexibility. They are designed to easily perform numerous iterations of "what if" scenarios and to quickly "snap" new baseline configurations. The rigid security measures of a conventional PMT would defeat the flexibility needed by an NST.

Another reason why PMTs cannot simply be expanded to provide NST functions is that in most organizations NSTs are typically designed for and placed under the control of the management that is responsible for project completion. PMTs are typically designed for and placed under the control of financial departments which provide specialized services for the project management. Such an expansion would place those who provide specialized financial services in the role of being responsible for project scheduling. Not only do the financial departments lack the knowledge needed to make schedules, but such an arrangement would usurp project management responsibilities. Hence, any expansion of PMT functionality to include NST functions would be unacceptable to project management.

Accordingly, conventional project management systems typically include an NST and a PMT. The NST and PMT operate independently of one another. Any integration between the NST and the PMT takes place manually. In other words, the common elements of data between the NST and the PMT are transcribed two or three times. Moreover, an operator of the PMT and a project manager must undergo a tedious and time consuming interviewing process so that a PMT operator will understand how to set up an acceptable work breakdown structure within a PMT. Each of these processes leads to errors and misalignment between NST and PMT data. And, the problems of maintaining alignment between NST and PMT data are multiplied by the continuous changes in an organization's circumstances that take place throughout the course of a project. Consequently, project management suffers, organizational resources are not used as efficiently as they might be, and overall costs increase. While computer programs have been written to check for certain discrepancies and misalignment between NST and PMT data, such programs typically fail to catch all errors and such programs do nothing to prevent the discrepancies from occurring in the first place.

SUMMARY OF THE INVENTION

Accordingly, it is an advantage of the present invention that an improved project management system is provided.

Another advantage of the present invention is that a method for automatically maintaining alignment between network scheduling tool (NST) data and performance measurement tool (PMT) data is provided.

Yet another advantage is that the present invention minimizes duplication efforts in transcribing data needed by both an NST and a PMT.

Another advantage is that the present invention provides a method whereby project management utilizes an NST to enter into a project management system substantially all data needed to operate a PMT.

The above and other advantages of the present invention are carried out in one form by a system for coordinating the management of a project undertaken by an organization and for maintaining alignment of scheduling and performance measurement data. The system of the present invention is adapted to utilize an NST that collects, stores, and processes network schedule data (NSD). The NST is also used to collect unique performance measurement data (UPMD) which would normally be provided separately to the PMT. The NST generates data that coordinate scheduling for the project.

The present invention provides a bridging tool responsive to at least a portion of the data collected by the NST. The bridging tool generates performance measurement data (PMD) for use by the PMT. The PMT receives and responds to the PMD transferred to it by the bridging tool. The PMT is configured to collect, store, and manipulate the PMD, and the PMT generates data which coordinate performance measurement for the project. The bridging tool insures that the information transferred to the PMT from the NST has the proper form and that the data in the NST and PMT are correlated.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a table of data exported from the NST for use by a bridging tool;

FIG. 6 shows a table of codes assigned to an earned value method type (EVMT) item of the data exported from the NST;

FIG. 7 shows a table of codes assigned to a work breakdown structure type (WBST) item of the data exported from the NST;

FIG. 8 shows a table of codes assigned to a resource spread code item of the data exported from the NST;

FIGS. 11–18A, 18B and 19 together show flow charts of modules performed by the bridging tool of the present invention to transform the data exported from the NST into initial baseline data for importation into the PMT;

FIGS. 20–27A and 27B together show flow charts of modules performed by the bridging tool of the present invention to transform the data exported from the NST into status data for importation into the PMT; and FIGS. 28–40A, 40B, 41, 42A, 42B, 43A and 43B together show flow charts of modules performed by the bridging tool of the present invention to transform the data exported from the NST into baseline revision data for importation into the PMT.

The description presented below utilizes reference numbers to indicate features in the Figures which are being discussed in the description. These reference numbers are related to the number of the Figure in which they first occur. In particular, the two-digit reference numbers shown in FIGS. 9A–9B equal numbers of subsequent Figures which present flow charts of indicated modules in more detail. Otherwise, the most significant digit of all three-digit reference numbers and the most significant two digits of all four-digit reference numbers equal the number of a Figure in which that referenced feature is illustrated.

DETAILED DESCRIPTION OF THE PREFERRED EMBODIMENT

Figure 1:
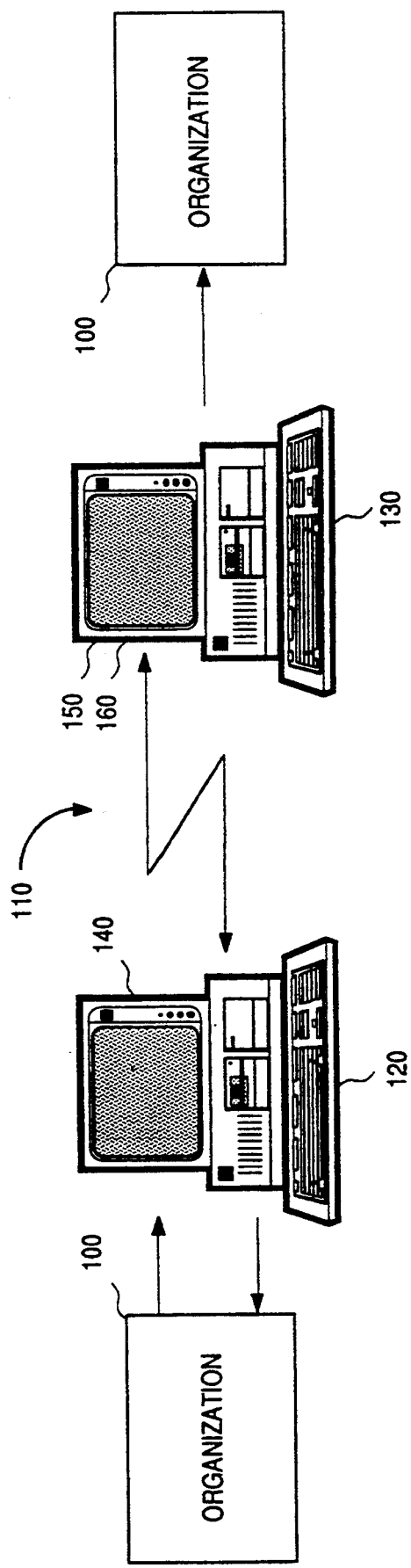
FIG. 1 illustrates the cooperation between the project management system of the present invention and an organization to which the system applies.

FIG. 1 illustrates the cooperation between an organization 100 and a project management system 110, which coordinates projects undertaken by organization 100. Organization 100 represents any governmental, business, non-profit, or other association which undertakes complex projects. Organization 100 includes numerous resources which are coordinated so that an undertaken project may be successfully completed. These resources include employees or other personnel, raw materials, equipment, consumable supplies, services, and the like. In general terms, the organization's resources must be assigned, applied, spent, or otherwise allocated to a project in order for the project to be completed. Preferably, the resources are available when needed, and are allocated only as needed to accomplish various tasks required to complete the project. Otherwise, the project may not be completed on time, or resources may be used inefficiently in completing the project.

Project management system 110 includes three tools which together coordinate resource allocations to a project. These three tools are computerized tools which may be operated through the use of computers 120 and 130. In the preferred embodiment of the present invention, computers 120 and 130 are conventional general purpose personal computers. While FIG. 1 illustrates only a single computer 120 and a single computer 130, those skilled in the art will appreciate that any number of computers 120 and 130 may be employed in connection with system 110. Moreover, computers 120 and 130 are in data communication with one another. Such communication may take place over a local area network (LAN), through telecommunication channels, or by physically transferring disks or other data storage media between computers 120 and 130.

Figure 2:
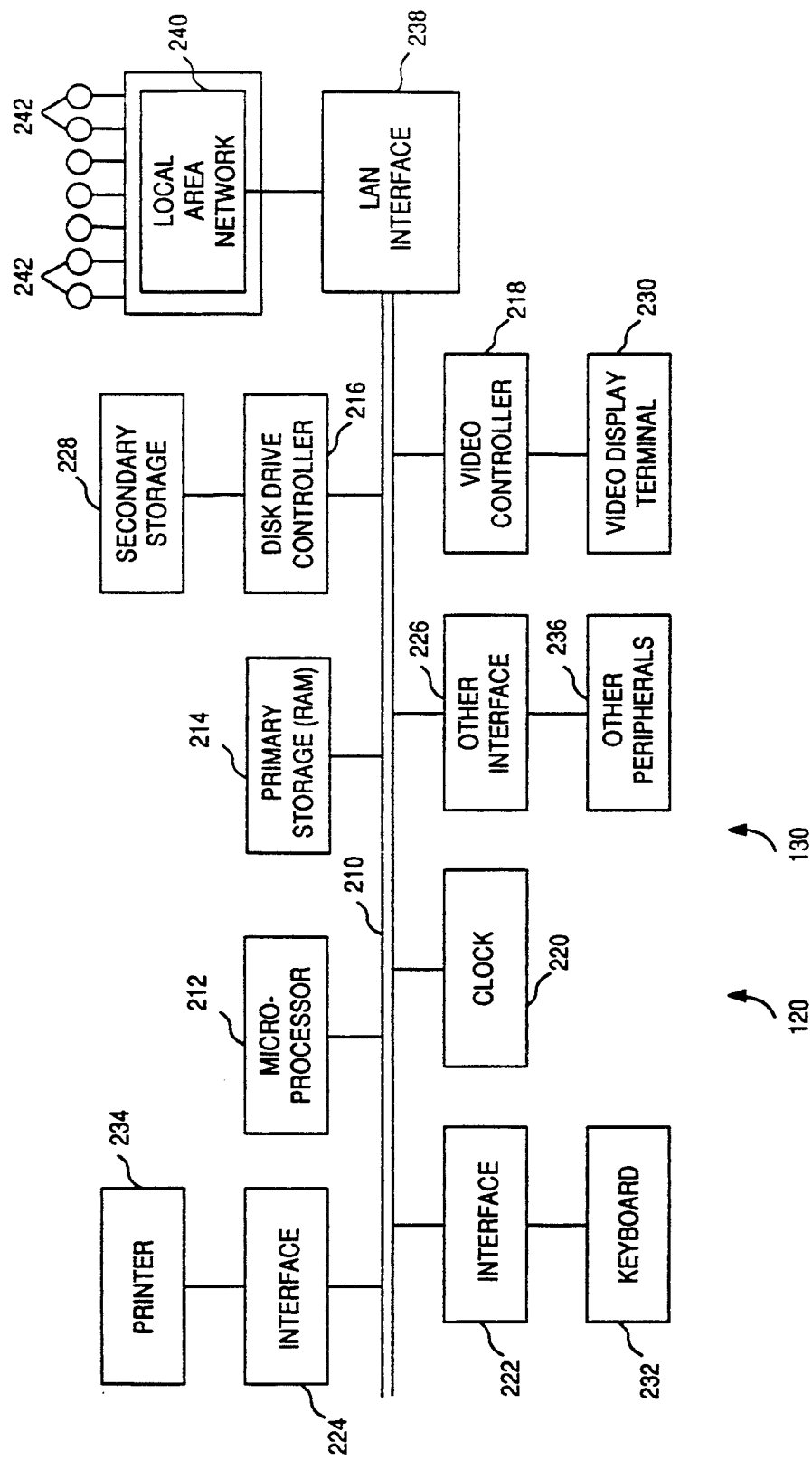
FIG. 2 shows a block diagram of an exemplary computer which is utilized by the present invention.

FIG. 2 shows a block diagram of a representative computer 120 or 130. The representative computer shown in FIG. 2 includes an address, data, and control (ADC) bus 210 to which many devices couple. For example, a microprocessor 212, a primary storage or memory 214, a disk drive controller 216, a video controller 218, a clock 220, a keyboard interface 222, a printer interface 224, and other interfaces 226 all couple to ADC bus 210. A secondary storage or memory 228, such as a disk drive, couples to disk drive controller 216, a video display terminal (VDT) 230 couples to video controller 218, a keyboard 232 couples to keyboard interface 222, a printer 234 couples to printer interface 224, and other peripherals 236 couple to their respective interfaces 226.

Devices 210-236 cooperate with one another in a conventional fashion. In other words, microprocessor 212 executes programming instructions stored within primary storage 214, receives data from keyboard 232 and other peripherals 236, and outputs data to VDT 230 and printer 234. Microprocessor 212 additionally receives data from and supplies data to secondary storage 228 in the form of data files.

ADC bus 210 preferably, but not necessarily, couples to a local area network (LAN) interface 238. LAN interface 238 also couples to a LAN 240, and through LAN 240 to other computer devices 242 within project management system 110. The other computer devices 242 include any number of file servers, workstations, personal computers, mini computers, mainframe computers, gateways, bridges, and the like. Many of these other devices 242 have an internal structure similar to the above-described structure for computers 120 and 130.

With reference back to FIG. 1, the present invention preferably operates computer 120 as a network scheduling tool (NST) 140. Preferably, NST 140 is operated by project management personnel (as opposed to financial personnel) to collect, process, and record data that describe organization 100 and the project being undertaken by organization 100. In addition, NST 140 generates scheduling and resource management information which is fed back to organization 100 through such project management personnel to cause the organization's resources to be allocated to the project in a coordinated fashion.

The present invention contemplates the use of a conventional NST 140 by project management system 110. In particular, a computer program commercially available under the trade name ViewPoint from Computer Aided Management, Inc. of Petaluma, Calif. causes computer 120 to operate as NST 140 in the preferred embodiment of the present invention. However, those skilled in the art of computerized project management can easily adapt the teachings of the present invention to other NST computer programs, including, but not limited to, tools commercially available under the trade names: Microsoft Project for Windows, PertMaster Advanced, Artemis Schedule Publisher, On-Target, Prestige, Project Director, TimeLine, and PrimaVera.

In general terms, NST 140 forms and manages a database within computer 120. This database is specifically tailored to the functions of network scheduling and resource management. In terms of the FIG. 2 block diagram, this database is stored and maintained within secondary storage 228. As is conventional, a user of NST 140 may cause NST 140 to collect two types of data. A first type of data describes features of organization 100 and of the project. This first type of data are needed by NST 140 so that NST 140 can perform its scheduling and resource management functions. This type of data is referred to as network scheduling data (NSD) below.

Figure 3:
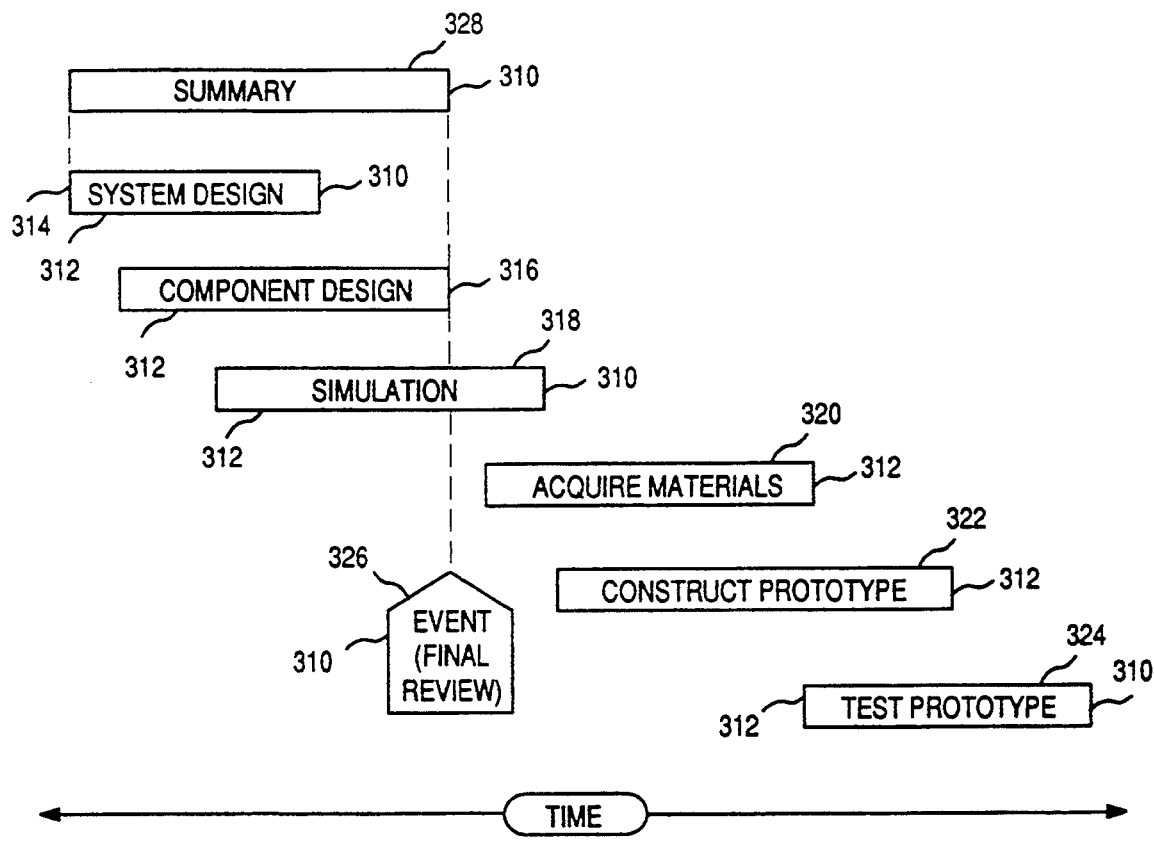
FIG. 3 shows an example of a data structure formed by a conventional network scheduling tool (NST) to describe a hypothetical situation.

FIG. 3 illustrates an example of NSD collected and recorded by NST 140 to describe a hypothetical situation. In particular, these NSD are organized into work unit records 310, each of which has a particular relationship to time. Activity work units 312 are utilized to describe particular tasks which have been described to NST 140. Each activity 312 is listed as beginning at a particular point in time and continuing for a particular duration. Those skilled in the art will appreciate that several different types of timing data may be associated with each activity work unit 312. The hypothetical situation depicted in FIG. 3 describes the design of a widget in terms of a system design activity 314, a component design activity 316, a design simulation activity 318, an activity 320 to acquire materials for constructing a prototype of the widget, an activity 322 for constructing the widget prototype, and an activity 324 for testing the prototype. Of course, actual projects may be much more complex than depicted in FIG. 3.

In addition, a portion of the NSD may be configured as an event work unit 326, which is similar to an activity except that it has no duration. Events may be fixed in time or floating. The event 326 depicted in FIG. 3 describes a final review which is scheduled to take place at the completion of component design activity 316. Furthermore, another portion of the NSD may be configured as a summary work unit 328. Summary work units 328 summarize other specified activity work units 312 and may be viewed as residing at a higher level of a work unit hierarchy than activity work units 312. Summary work units 328 may represent either simple summaries or Hammocks.

With reference back to FIG. 1, a second type of data collected by NST 140 represents "customized" data. Customized data need not be used in performing scheduling functions. In the preferred embodiment of NST 140, the customized data are carried by data elements called activity code fields 1-3. These customized data are collected and recorded with work units 310 by NST 140 but are not otherwise processed in performing scheduling and resource management functions.

In accordance with the present invention, the customized data collected by NST 140 are one type of performance measurement data (PMD). The particular PMD collected by NST 140 are data items which are uniquely utilized by a performance measurement tool (PMT) 150. PMT 150 is preferably operated on computer 130 by financial personnel. This type of PMD is referred to as unique PMD (UPMD) below. These UPMD are processed along with a portion of the NSD in a bridging tool, or simply a bridge, 160 before being passed on to PMT 150. Bridge 160 is also preferably operated on computer 130 by financial personnel.

The present invention also contemplates the use of a conventional PMT 150 by project management system 110. In particular, a computer program commercially available under the trade name M*PM (or CONTROL) from Micro-Frame Technologies, Inc. of Ontario, Calif. causes computer 130 to operate as PMT 150 in the preferred embodiment of the present invention. However, those skilled in the art of computerized project management can easily adapt the teachings of the present invention to other PMT computer programs, including, but not limited to tools commercially available under the names IBM PMC and Artemis I/CSCS.

In general terms, PMT 150 forms and manages a database within computer 130. This database is specifically tailored to the functions of budgeting, cost management, and performance measurement. In terms of the FIG. 2 block diagram, this database is stored and maintained within secondary storage 228. PMT 150 collects data so that it can perform its functions. These data are referred to as performance measurement data (PMD) below. The above-discussed UPMD forms one part of the PMD. Another part of the PMD represents data that are common between NST 140 and PMT 150. These common PMD are collected and utilized by NST 140 for scheduling and resource management functions. Thus, they also represent a common portion of the NSD. They are processed into a form which is useful to PMT 150 by bridge 160.

Figure 4:
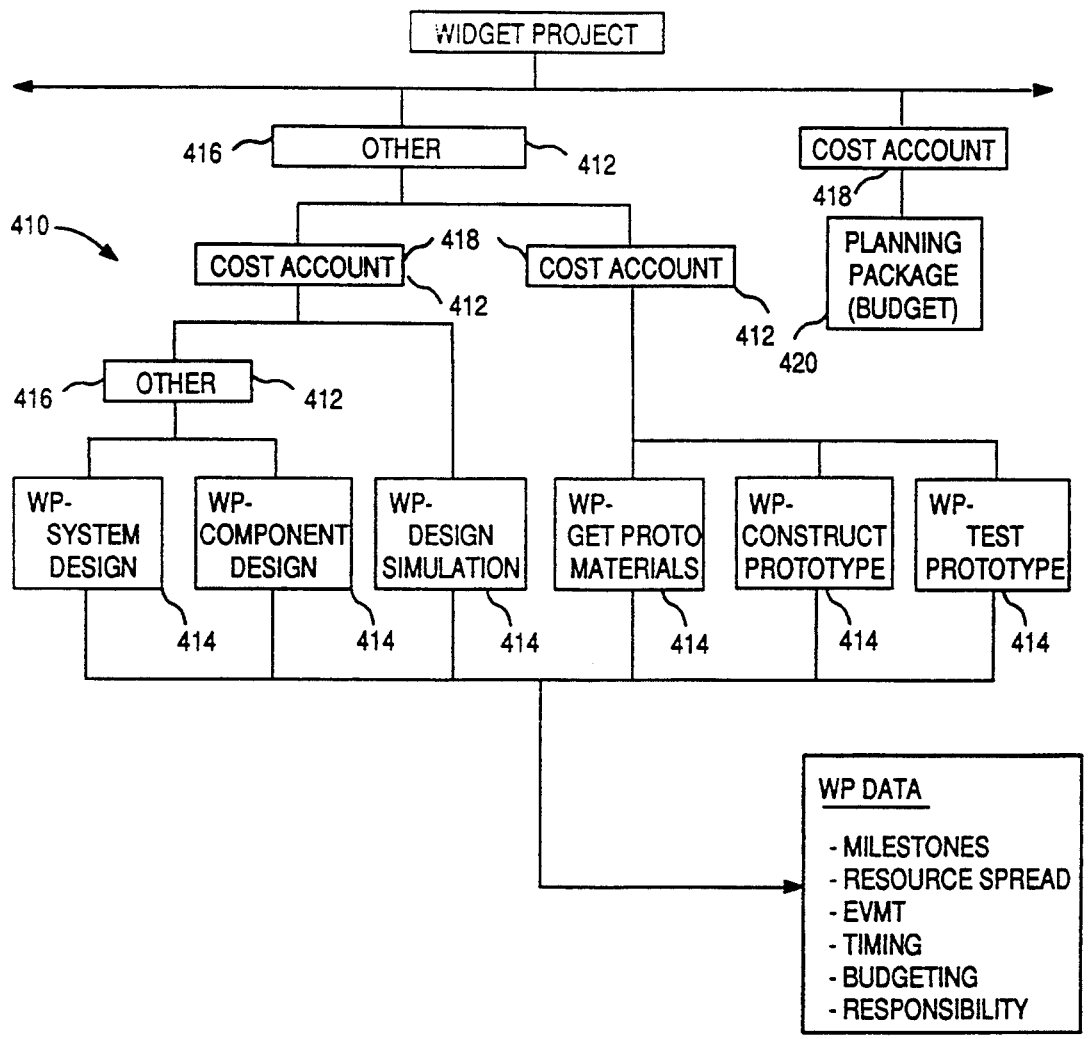
FIG. 4 shows an example of a data structure formed by a conventional performance measurement tool (PMT) to describe the hypothetical situation that FIG. 3 also illustrates.

FIG. 4 illustrates an example of PMD collected and recorded by PMT 150 to describe the same hypothetical situation that is depicted in FIG. 3 for NST 140. In particular, these PMD are organized into a work breakdown structure (WBS) 410 that includes numerous WBS elements 412. Elements 412 are arranged in a hierarchy which is more complex than the hierarchy depicted by FIG. 3. Each element 412 has a parent/child relationship to other elements in WBS 410. The elements are identified through a unique name, called a WBS_ID herein.

In the preferred embodiment, four different types of WBS elements 412 are included in WBS 410. Work package elements 414 are used to record and monitor information related to units of work at the levels where the work will be performed. Work packages reside at the lowest levels of the hierarchy of WBS 410. Each work package 414 includes scheduled start and completion dates and a budget. In addition, milestones, resource spreading information, earned value methodology techniques, and identification of responsible parties may all be recorded in connection with a work package 414. FIG. 4 illustrates work packages 414 for the system design, component design, design simulation, acquisition of prototype materials, construction of a prototype, and prototype testing. These work packages are defined to correspond to the activities 312 listed in FIG. 3.

Other WBS elements 416 are used to summarize WBS elements 414 from lower levels of the hierarchy of WBS 410. Cost Account elements 418 represent management control points at which budgets, earned value, estimates, and actual costs are accumulated and computed for variance analysis. Planning packages 420 are similar to work packages, except that they exist primarily to record far term work that can be identified and budgeted. Typically, planning packages 420 are used to allocate budget when insufficient information exists for defining the work into work packages.

Referring back to FIG. 1, it is bridge 160 which receives the common portion of the NSD and the UPMD collected by NST 140. Bridge 160 then processes this information to construct memory data files which are suitable for importation into PMT 150. These memory data files cause the processed information to fit within a defined WBS, such as the structure illustrated in FIG. 4. As is conventional, PMT 150 may be operated to import such files into its database. PMT 150 then processes its database to produce performance measurement information. This performance measurement information is fed back to organization 100 through project management to influence resource allocations.

In the preferred embodiment, data describing the basic structure of WBS 410 is entered directly into PMT 150. This data identifies the WBS_ID names used by WBS 410. The bulk of the remaining information needed by PMT 150 is obtained through NST 140 via bridge 160.

FIG. 5 shows a table that identifies the data which are exported from NST 140 and which bridge 160 uses in forming import files for PMT 150. The table of FIG. 5 illustrates a single record 510 of a file 512 which may include any number of records 510. One record 510 is provided for each work unit 310. A user of NST 140 supplies the information contained in records 510 by operating NST 140 in a conventional manner.

The table of FIG. 5 includes three columns. One column provides a description of respective data items, a second column indicates a reference number in the range of 514-566 which is associated herein with the corresponding data items, and a third column describes the number of characters that are required to carry the corresponding data items in each record.

The table of FIG. 5 is further divided into three groups of data items. The top group of data items (items 514-536) is used to describe the above-discussed UPMD. This UPMD group indicates that the user of NST 140 follows certain conventions in entering the UPMD into NST 140. For example, work unit records 510 of NST 140 may correspond to a WBS_ID defined for PMT 150 through data item 514. In the preferred embodiment, file 512 is sorted by WBS_ID data item 514. Hence all work unit records 510 which are linked to a single WBS_ID are grouped together within file 512.

Likewise, data item 516 defines a parameter called earned value method type (EVMT). Those skilled in the art will appreciate that EVMT refers to a quantitative method used by PMT 150 to calculate budgeted cost of work performed (BCWP). One of ten potential diverse predetermined calculation algorithms is identified by data item 516. When appropriate (i.e. for WBS work package elements) the user of NST 140 specifies an EVMT to use in connection with the work package.

FIG. 6 shows a table that describes various codes assigned by the preferred PMT 150 to EVMTs.

Through data item 526, the user of NST 140 defines a PMT parameter called work breakdown structure type (WBST). FIG. 7 shows a table that describes various codes assigned by PMT 150 to WBSTs. WBST defines a type of WBS element, such as the work package, other, cost account and planning elements discussed above (see FIG. 4). Alternatively, WBST may be specified as a milestone. In the preferred embodiment of PST 150, a milestone is included in a work package and not a separate WBS element. By including a milestone as a potential WBST, a user of NST 140 may equate the NSD associated with an NST work unit to either a milestone or a WBST element.

Through data items 534 and 536, the user of NST 140 defines a PMT parameter called a resource spread code. Those skilled in the art will understand that a resource spread code defines a particular numeric distribution pattern for use by PMT 150 in automatically spreading a resource in a work package. FIG. 8 shows a table that describes various resource spread codes recognized by PMT 150.

The middle group of data items in the table shown in FIG. 5 (items 538–558) describes a portion of the above-discussed NSD. This portion represents those data items which are needed by bridge 160 to form PMT data import files. The middle group of NSD are also related to the scheduling functions performed by NST 140. The bottom group of data items (items 560–566) describes another portion of the above-discussed NSD. This second portion of the NSD represents those data items which are related to resource management functions performed by NST 140. Data items 538–566 together represent common NSD.

Data items 538–566 from the NSD are discussed in more detail below in connection with other features of the present invention that use these data items. Those skilled in the art will appreciate that it is a user of NST 140 that enters this data as needed for the scheduling and resource management functions for which NST 140 is conventionally employed.

For simplification, FIG. 5 shows all of data items 514–566 as being included in a single record. However, in the preferred embodiment resource NSD items 560–566 are actually exported to a different file from activity or scheduling NSD items 538–558. The records in these two files are linked together through a common data item, in particular item 514. Those skilled in the art may, if desired, easily combine such files into a single file using conventional programming techniques. In addition, those skilled in the art will appreciate that additional data fields may be exported from NST 140 with each record 510.

Figure 9A:
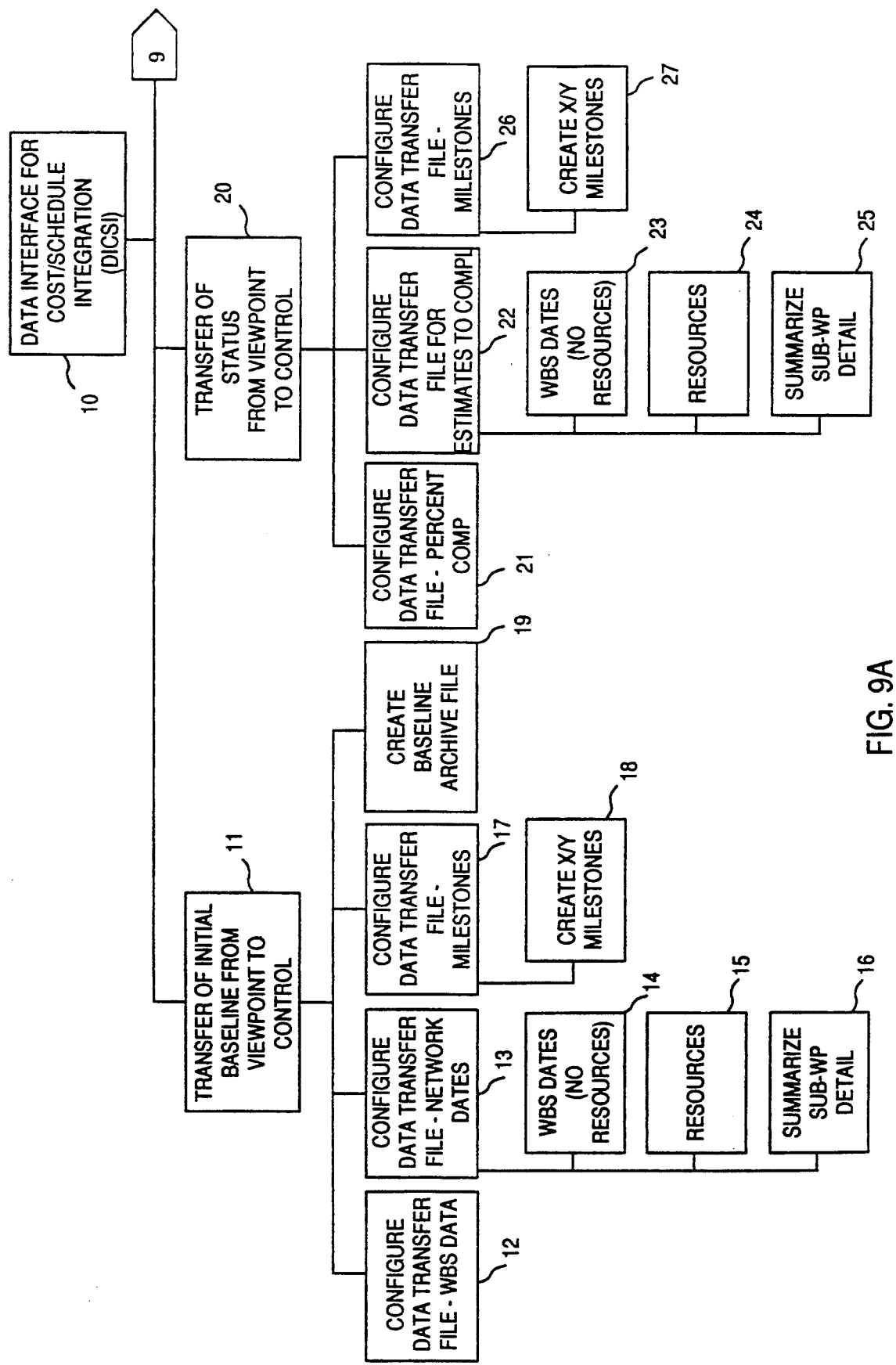
FIGS. 9A–9B together present a block diagram of various modules performed by the bridging tool of the present invention.
Figure 9B:
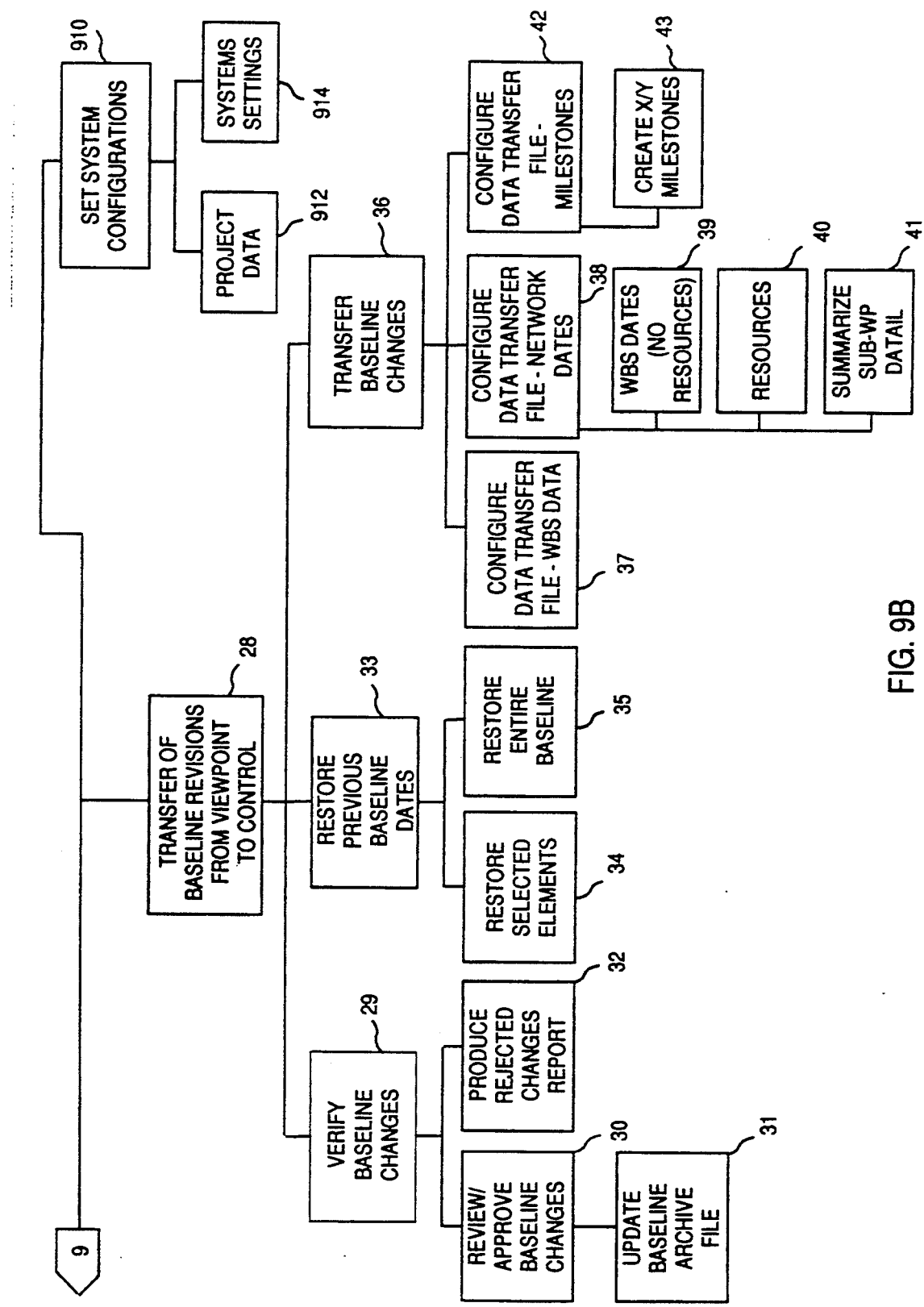

FIGS. 9A–9B together present a block diagram of various modules performed by bridge 160 in processing file 512 to produce import files for PMT 150. Those skilled in the art will appreciate that each of these modules represent specific programming instructions which are stored in memories 214 and 228 (see FIG. 2) of computer 130 (see FIG. 1) and which alter the structures of memories 214 and 228 to record the instructions. FIGS. 9A–9B illustrate a modular programming structure which includes modules 10–43. Modules 10–43 cause computer 130 to perform the processes described in more detail below in the flow charts presented in FIGS. 10–43, respectively. The processes shown by FIGS. 10–43 are discussed below.

FIG. 9B also illustrates a module 910 which is entered from a main menu module 10 of bridge 160. Module 910 controls video display terminal 230 of computer 130 to present a user of bridge 910 with information about system operations. In particular, module 910 allows the user to select whether bridge 160 will subsequently perform a project data module 912 or a system settings module 914. Project data module 912 is used to update information about a current project being managed through bridge 160, and system settings module 914 is used to change operating system file directory information and default settings. Modules 910–914 cause computer 130 to perform conventional operating system functions which do not directly affect the tasks performed by bridge 160 in forming PMT data import files. Thus, modules 910–914 are not discussed further herein.

Figure 10:
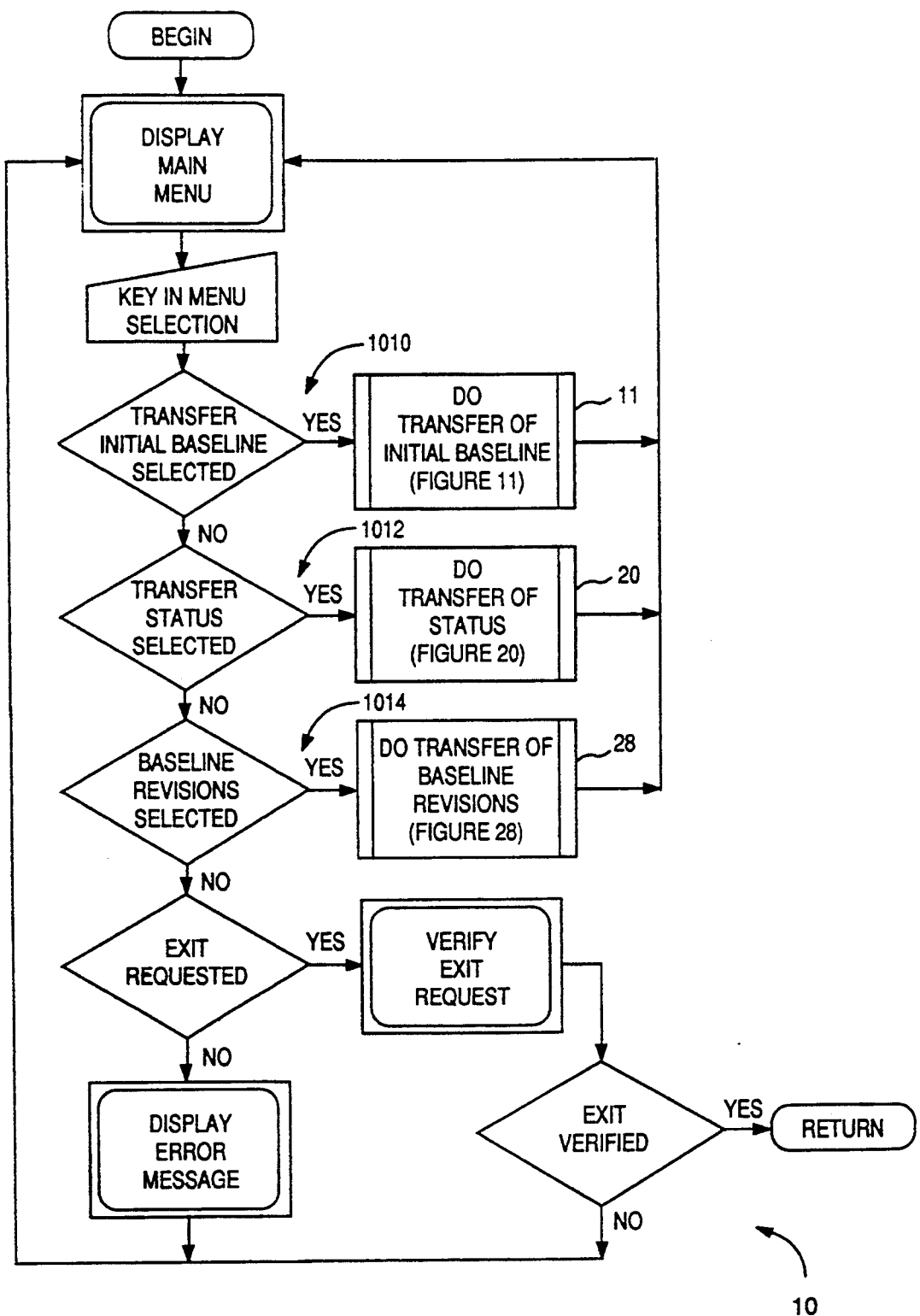
FIG. 10 shows a flow chart of a main menu module performed by the bridging tool of the present invention.

FIG. 10 shows a block diagram of module 10, which causes computer 130 to "run" a main menu for bridge 160. Although not specifically shown in FIG. 10, upon entering module 10 computer 130 preferably permits a user to select a project name from a recorded list of projects or to start a new project. In addition, module 10 may cause computer 130 to verify that an NST file 512 is available for processing by bridge 160. Moreover, module 10 may request a user to enter a date, called Time—Now, to associate with any NST file 512. The Time—Now variable is used in statusing operations, as discussed below.

When all beginning operations have been performed, module 10 causes a "main menu" of selections to be displayed on video display terminal 230. This main menu operates in a conventional fashion. In other words, the user may manipulate keyboard 232 or some other input device to cause a displayed selection to become highlighted or otherwise indicated. Then, the user may select or "key in" the indicated selection by again manipulating the input device, and program control will be transferred in accordance with the user's selection.

The main menu gives the user a choice of three selections in addition to the system settings discussed above in connection with modules 910–914. Specifically, the user may perform an initial baseline transfer via a selection 1010, a transfer of statusing information via a selection 1012, or a transfer of baseline revisions via a selection 1014. Only one selection is allowed by module 10. In response to the selected one of potential selections 1010, 1012, or 1014, program control will be transferred to modules 11 (FIG. 11), 20 (FIG. 20), or 28 (FIG. 28), respectively.

With reference back to FIGS. 9A–9B as well as FIG. 10, modules 11, 20, and 28 correspond to three different jobs for which an NST file 512 may be used by bridge 160. Upon the initial characterization of a project to project management system 110, a baseline needs to be established. The baseline results from a process known as project planning. In order to maintain alignment of the baseline between NST 140 and PMT 150 a user makes selection 1010 to perform module 11. Module 11 and related modules transfer an initial baseline when an NST file 512 carries initial baseline data that has been collected through NST 140.

After a baseline has been established and the project is underway, the actual start and complete dates will usually diverge from the dates established in the baseline. This divergence is recognized through statusing. Status data are routinely collected at intervals in NST 140. These status data cause project management system 110 to recognize accomplished work and to respond to the continuous changes that occur in organization 100. A user makes selection 1012 to perform module 20 and to transfer status data to PMT 150 when an NST file 512 carries status data that has been collected through NST 140.

When the project is underway, it often becomes necessary to alter the baseline when the original plans appear to be no longer valid. When an NST file 512 contains data for a new or revised baseline, a user makes selection 1014 to perform module 28. Module 28 processes the revision data to form a new baseline. Accordingly, NST 140 is operated repetitively during the course of a project to produce numerous versions of NST file 512. A user selects baseline, status, and revision modules 11, 20, and 28, respectively, to appropriately process the various versions of NST file 512.

Figure 11:
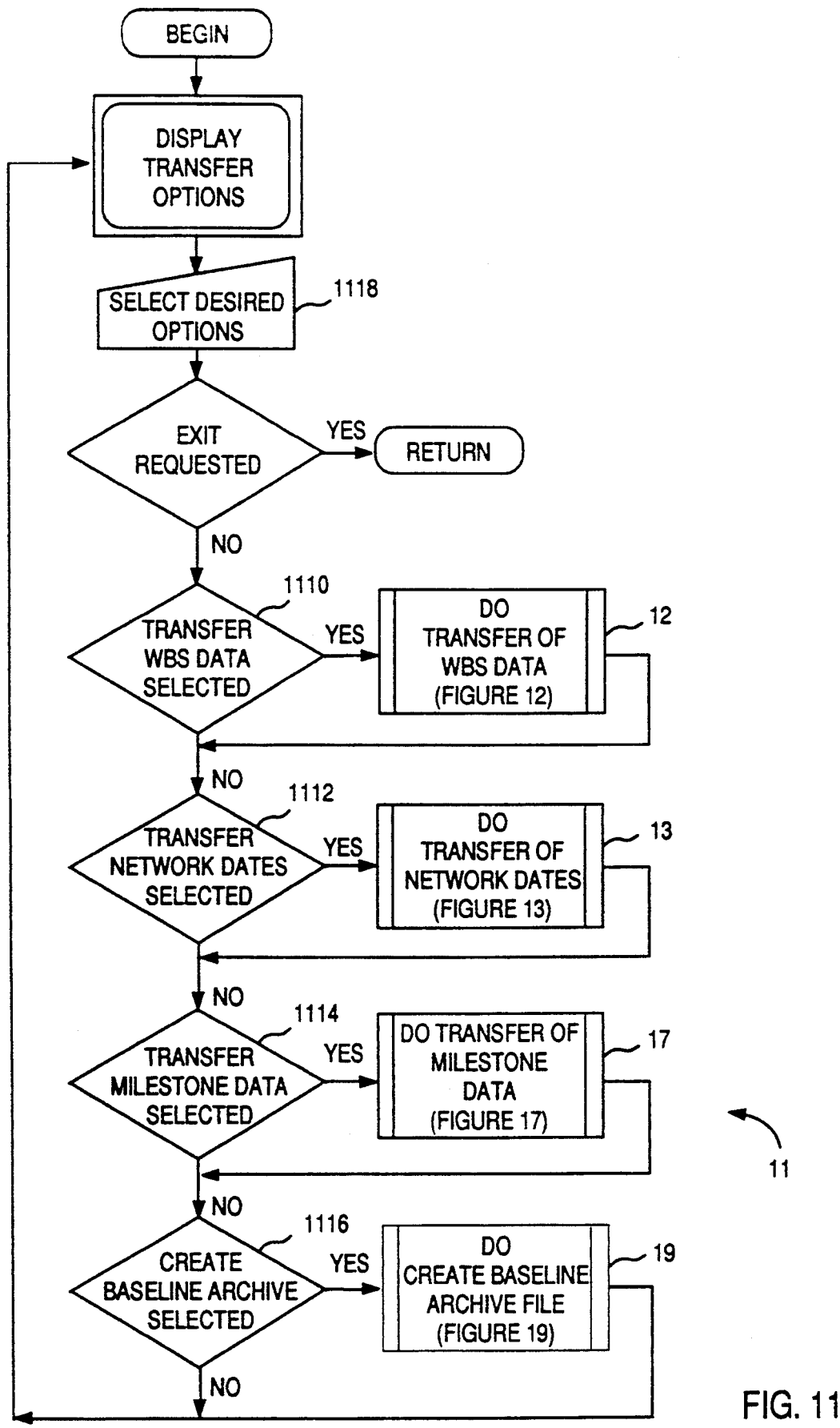

When baseline transfer selection 1010 has been made through the menu of module 10, program control transfers to module 11, a flow chart of which is presented in FIG. 11. As shown in FIG. 11, module 11 runs another menu. This time the menu presents the user with a set of selections that relate to forming an initial baseline for project manager 110.

The present invention recognizes three distinct types of data which may be filtered from an NST file 512 and independently processed to generate PMT import files. One type of data is primarily descriptive in nature. This type of data is chosen by making a selection which is recognized at query task 1110. Another type of data is primarily timing-related and is chosen by making a selection which is recognized at query task 1112. The third type of data relates primarily to defining milestones for PMT 150, and is chosen by making a selection that is recognized at a query task 1114. In addition, the user may make a selection that is recognized in a query task 1116 and which causes bridge 160 to form a baseline archive file in secondary storage 228. This archive file is used in maintaining secure baseline data for project manager 110.

The menu that module 11 runs is a multiple selection menu. In other words, the user may select one or more of the potential choices at a task 1118, then program control proceeds beyond task 1118 when the user enters a command that instructs bridge 160 to process the selections. The multiple selections give the user flexibility in the various ways that bridge 160 may be used. However, in normal circumstances a user may be expected to select all choices so that all three types of data will be prepared for importation into PMT 150 and so that a baseline archive file will be formed without the user having to give bridge 160 further instructions to do so. Modules 12, 13, 17, and 19 are performed in response to the selections recognized in tasks 1110, 1112, 1114, and 116, respectively.

Figure 12:
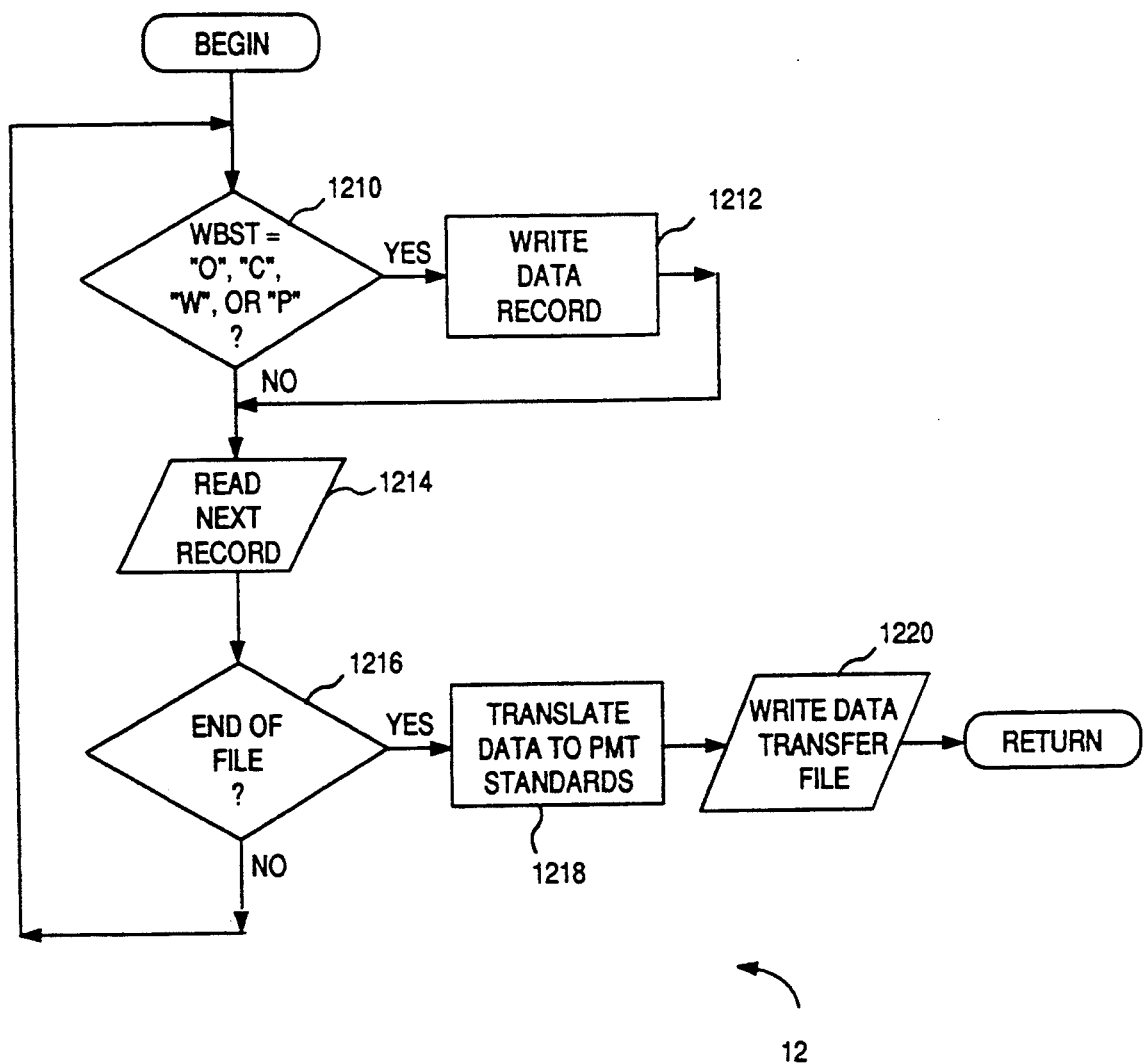

When a module 11 recognizes the selection of transferring descriptive initial baseline data in task 1110, program control transfers to module 12, a flow chart of which is presented in FIG. 12. Upon entering module 12, the first one of records 510 of NST file 512 is read. This occurs automatically as a function of the CLIPPER programming language within which the preferred embodiment of the present invention is written. WBST data item 526 is examined in a query task 1210 to see if it has been characterized as directly corresponding to a WBS element (an other, cost account, work package, or planning package) for PMT 150. If one of these work breakdown structure types is detected in record 510, then a task 1212 writes a record to a temporary file. This record contains the following data items:

| DATA ITEM NAME | SOURCE |
| --- | --- |
| Work Breakdown Structure Identifier (WBS_ID) | DI: 514 |
| Work Unit Description | DI: 538 |
| Manager's Identifier | DI: 528 |
| Performing Department Identifier | DI: 530 |
| Responsible Department Identifier | DI: 532 |
| Work Breakdown Structure Type (WBST), (see FIG. 7) | DI: 526 |
| Earned Value Method Type (EVMT), (see FIG. 6) | DI: 516 |
| Parent | "** ... **" |

"DI" refers to a data item from the current NST record 510. The " ... " value represents a constant value which causes the preferred version of PMT 150 to ignore WBS relationships. Of course, other data items may be written to the temporary file record to cause the record formed by task 1212, and similar tasks to be discussed below, to conform to data import requirements of PMT 150.

After task 1212, or whenever task 1210 discovers a record 510 that does not directly correspond to a WBS element, a task 1214 causes the next record to be read from NST file 512. A query task 1216 then determines whether or not the end of NST file 512 has been encountered. So long as the end of NST file 512 has not yet been encountered, program control loops back to task 1210. When the end of NST file 512 is encountered, a task 1218 processes the entire temporary file to translate the data items stored therein into the format required by PMT 150. In the preferred embodiment, this processing includes the removal of unwanted characters from the trailing portion of the WBS_ID data element. After the temporary file has been translated, a task 1220 copies the temporary file into a WBS descriptive data file that will be imported into PMT 150, and program control returns to module 11.

The PMT import file produced in task 1220, as well as other PMT import files to be discussed below, are then input to PMT 150 through normal importation operations of PMT 150. Accordingly, data that have been collected by NST 140 are then available for PMT 150 without duplication of transcription efforts.

Figure 13:
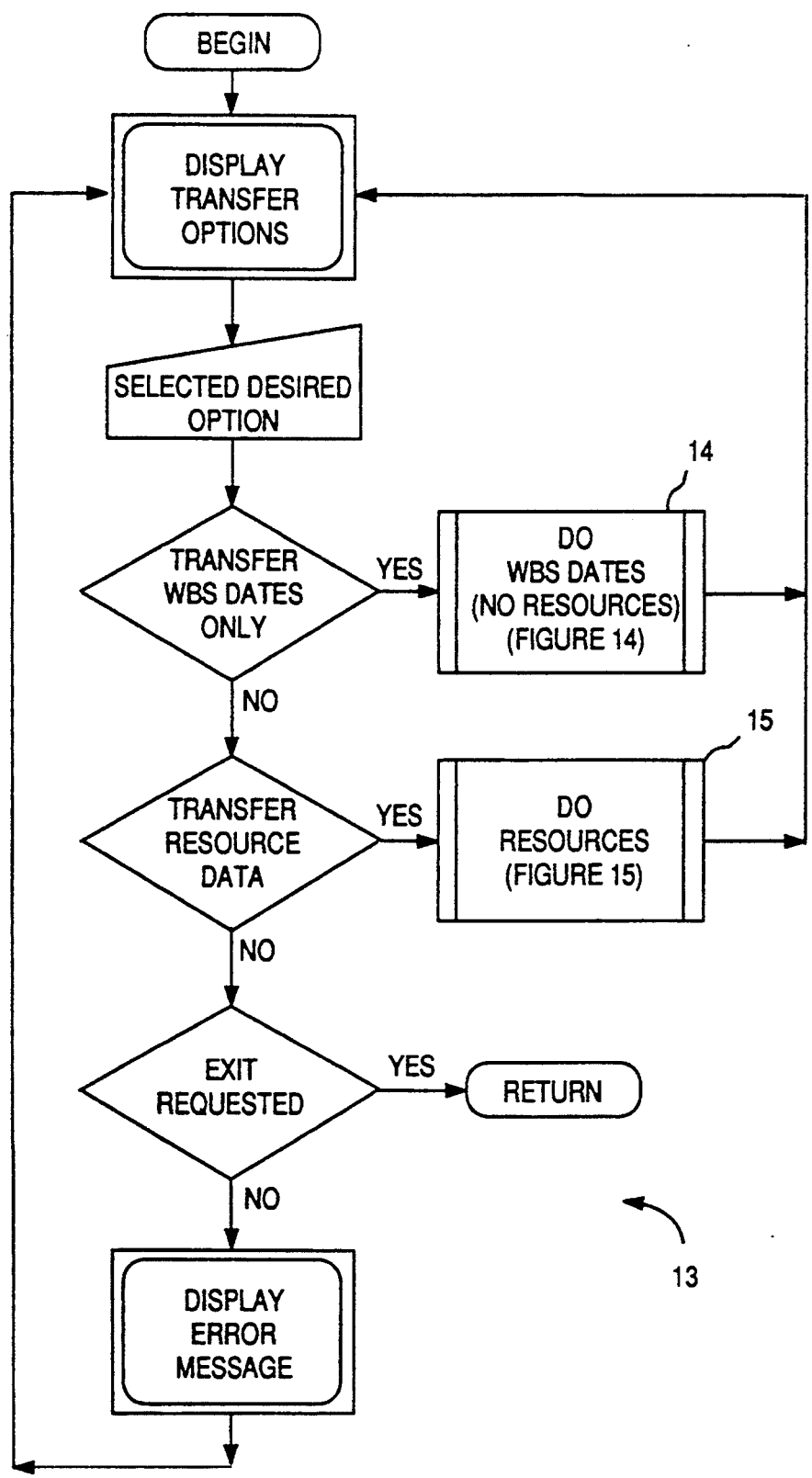

With reference back to FIG. 11, when module 11 detects a selection for transferring initial baseline scheduling or timing data in task 1112, program control transfers to module 13, a flow chart of which is presented in FIG. 13. As shown in FIG. 13, module 13 runs another menu. This time the menu presents the user with a set of selections that relate to two different types of timing-related baseline data. The user may choose to process data related to activities (data items 538-558 in NST file 512) or the user may choose to process data related to resource management (data items 560-566). If the user chooses to process activities, module 14 is performed. If the user chooses to process resources, module 15 is performed.

Figure 14:
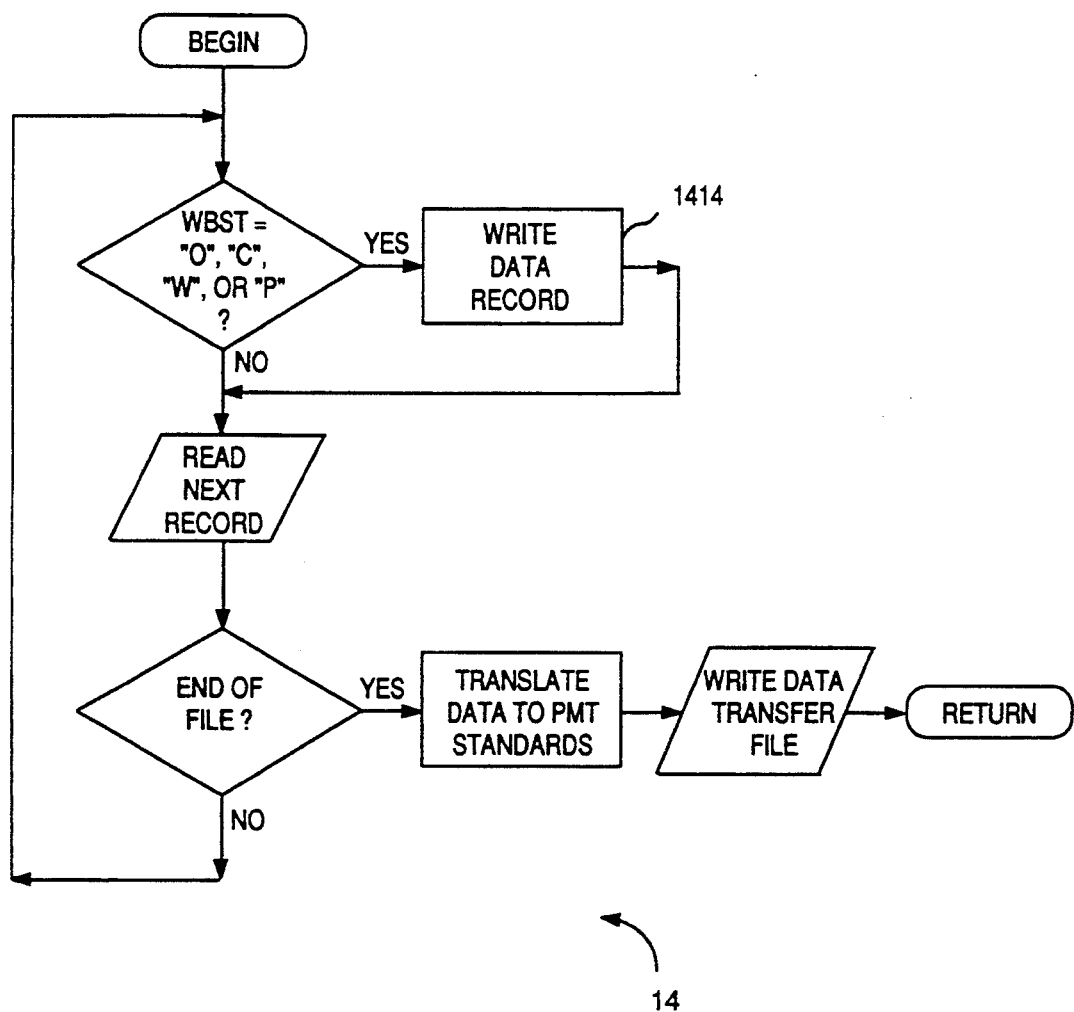

FIG. 14 shows a flow chart of the process performed by module 14. The process tasks included in module 14 are substantially the same as those discussed above for module 12. However, a task 1414 of module 14, which writes data to a temporary file, uses different data than discussed above in connection with module 12. Specifically, task 1414 writes a record to the temporary file that contains the following data items from record 510:

| DATA ITEM NAME | SOURCE |
| --- | --- |
| Work Breakdown Structure Identifier (WBS_ID) | DI: 514 |
| Early Start (ES) | DI: 540 |
| Early Finish Date (EF) | DI: 542 |
| Late Start Date (LS) | DI: 544 |
| Late Finish Date (LF) | DI: 546 |

Upon completion of module 14, program control returns to module 13. At this point a WBS initial baseline schedule file has been formed and stored in memory 228 for later importation into PMT 150.

Figure 15:
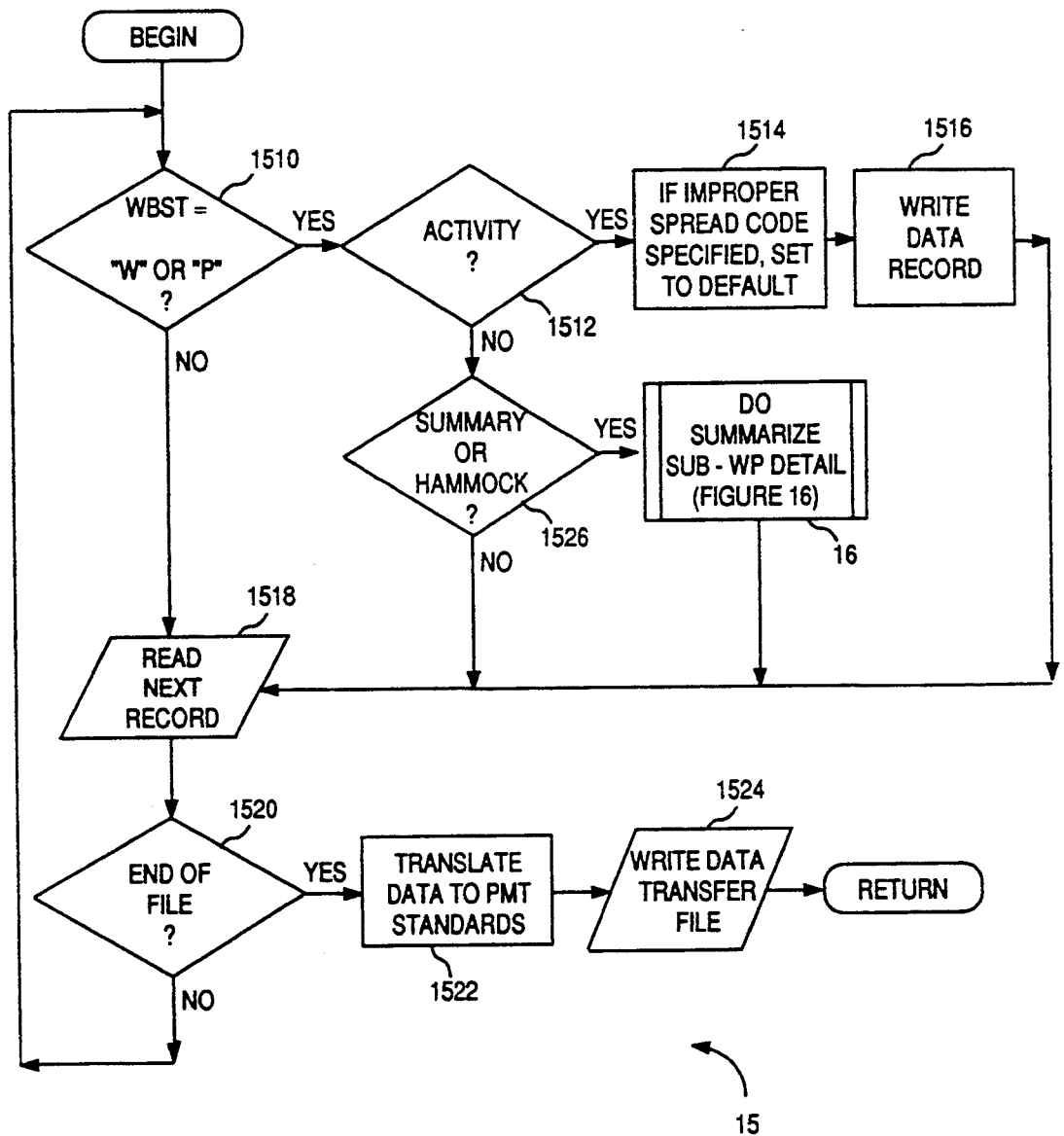

FIG. 15 shows a flow chart of the process performed by module 15 to form an initial baseline file of resource-related data for PMT 150. As discussed above, module 15 is entered from module 13. Upon entering module 15, the first one of records 510 from NST file 512 is read. WBST data item 526 is examined in a query task 1510 to see if it has been characterized as either a work package or a planning package (see FIG. 7). If one of these work breakdown structure types is detected in record 510, a query task 1512 then determines whether the current NST record 510 represents an activity work unit for NST 140. This determination is made by examining data item 558.

When task 1512 encounters an activity work unit record 510, a task 1514 examines resource spread code data item 534 of record 510. If an improper spread code has been specified, the value is changed to a default value. The spread codes which are recognized by the preferred embodiment of PMT 150 are listed in FIG. 8. An improper spread code is, for example, a blank or an "X". Task 1514 preferably utilizes a default of "1" which corresponds to a linear spread curve. After task 1514, a task 1516 writes the following data to a temporary file:

| DATA ITEM NAME | SOURCE |
| --- | --- |
| Work Breakdown Structure Identifier (WBS_ID) | DI: 514 |
| Resource Name | DI: 560 |
| Early Start Date (ES) | DI: 540 |
| Early Finish Date (EF) | DI: 542 |
| Resource Unit | DI: 562 |
| Resource Planned | DI: 564 |
| Resource Spread Code (see FIG. 8) (possibly changed by task 1514) | DI: 534 |

After task 1516, program control proceeds to a task 1518 to read another NST record 510 and a task 1520 to test for the end of NST file 512. Until the end of file 512 is encountered, program control loops back to task 1510. When the end of NST file 512 is encountered a task 1522 translates the temporary file into the format required by PMT 150, and a task 1524 copies the temporary file to an initial baseline estimates file for importation into PMT 150. After task 1524 program control returns to module 13.

Task 1512, discussed above, may encounter an NST record 510 which does not describe an activity work unit. In this situation, a query task 1526 then determines if data item 558 identifies a summary or Hammock type of work unit. If the NST record 510 is not an activity, summary, or Hammock type of work unit (i.e. an event work unit), program control proceeds to task 1518, and bridge 160 ignores the record 510. However, when a summary or Hammock work unit is encountered, program control is transferred to module 16 so that all activity work units which are summarized by the summary/Hammock work unit may be processed. After the completion of module 16, program control again returns to task 1518 to loop onto the next record.

Figure 16:
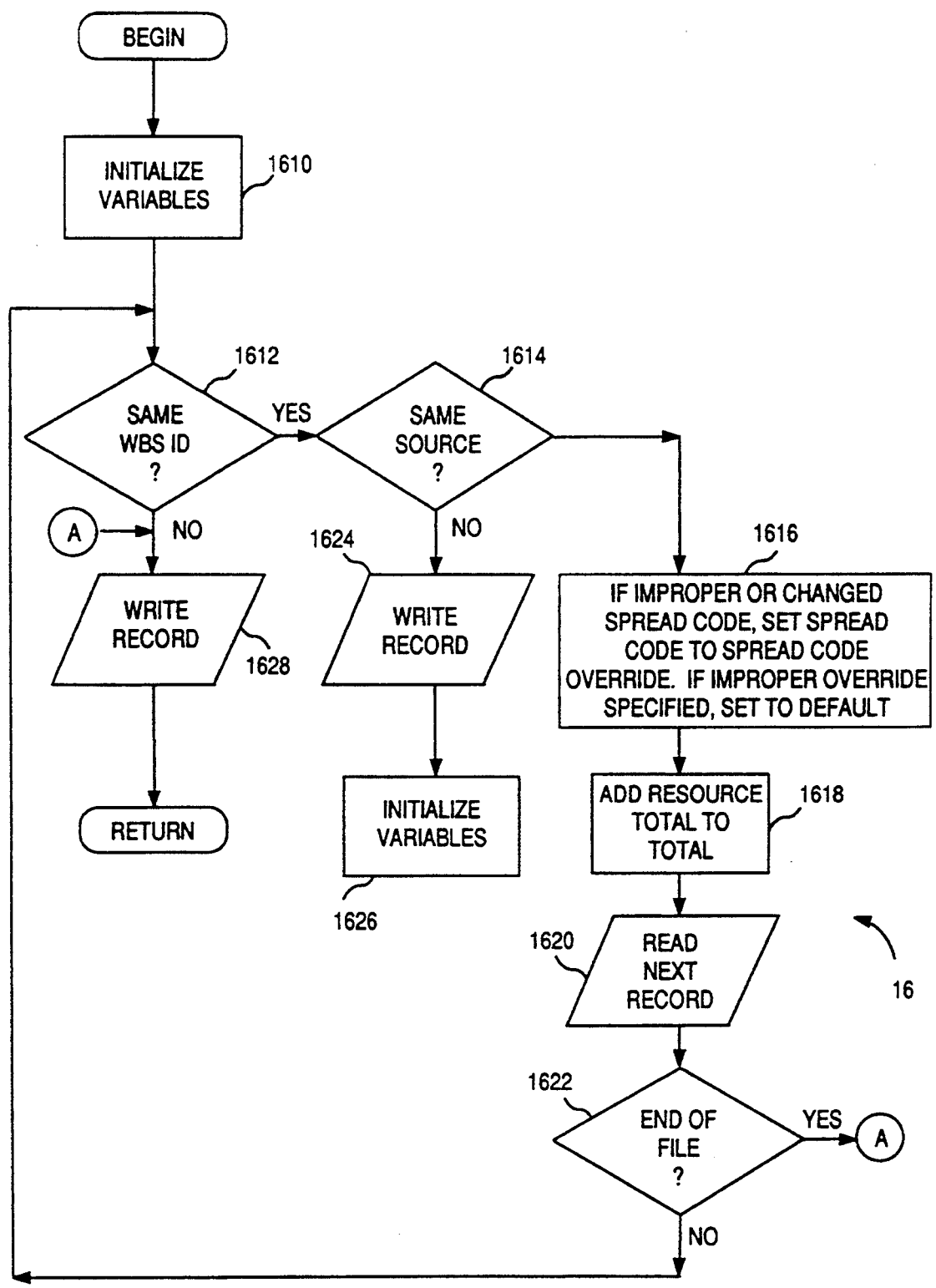

FIG. 16 shows a flow chart of module 16. Upon entry to module 16, a task 1610 initializes some variables utilized in module 16. For example, an accumulator which keeps track of planned resources is set to zero. In addition, the resource spread code associated with the summary/Hammock record is saved along with the first-encountered WBS_ID 514 and resource name 560. Further, an "estimate type" parameter used by PMT 150 is determined in accordance with resource unit data item 562 of the first-encountered record 510.

As discussed above, NST file 512 is sorted on WBS_ID data item 514, and all work unit records related to a common WBS_ID are located together in NST file 512. Accordingly, module 16 remains in a loop to process all records related to a single WBS_ID. A query task 1612 determines if WBS_ID 514 for the current record 510 differs from the saved WBS_ID. If not, a query task 1614 examines whether resource name data item 560 of the current record 510 matches the saved resource name. So long as the current record 510 describes the same resource as a previous record, module 16 remains in an inner loop to summarize the total amount planned for that resource.

In particular, a task 1616 determines what sort of a resource spread code to pass along to PMT 150. In general, resource spread code data item 534 is the preferred choice made by module 16. However, if the current work unit indicates a resource spread code item 534 that differs from the resource spread code saved above in task 1610, the override resource spread code from data item 536 is utilized instead. Finally, if the override resource spread code is left blank or otherwise set improperly, the default spread code discussed above in connection with task 1514 is used. As a result of task 1616, a single common resource spread code is used for a single WBS element, as required by PMT 150. Moreover, if entry errors suggest inconsistencies in resource spread codes, then two levels of substituted spread codes are used. These safeguards insure that a reasonable spread code will be specified in spite of potential operator entry errors. Since resource spread codes are critical in allocating budget, serious budgeting errors are reduced.

After task 1616, a task 1618 adds the value in resource planned data item 564 to the accumulator, a task 1620 reads the next record 510, and a query task 1622 tests for the end of NST file 512. If the end of file is not encountered, program control loops back to task 1612.

When all work unit records related to a single resource in a single WBS element have been summarized, task 1614 routes program control to a task 1624. Task 1624 writes a data record to the temporary file. The data carried by this data record is the same as was discussed above in connection with task 1516 of module 15, except for the above-discussed processing related to the resource spread code and planned resource parameters.

After task 1624, a task 1626 initializes variables for the next resource associated with the indicated WBS element, and program control proceeds to task 1618 to begin accumulating amounts planned for the next resource.

When all work unit records 510 related to a single WBS element have been processed, task 1612 routes program control to a task 1628, which writes the last summarized resource data record to the temporary file, and program control returns to module 15.

Figure 17:
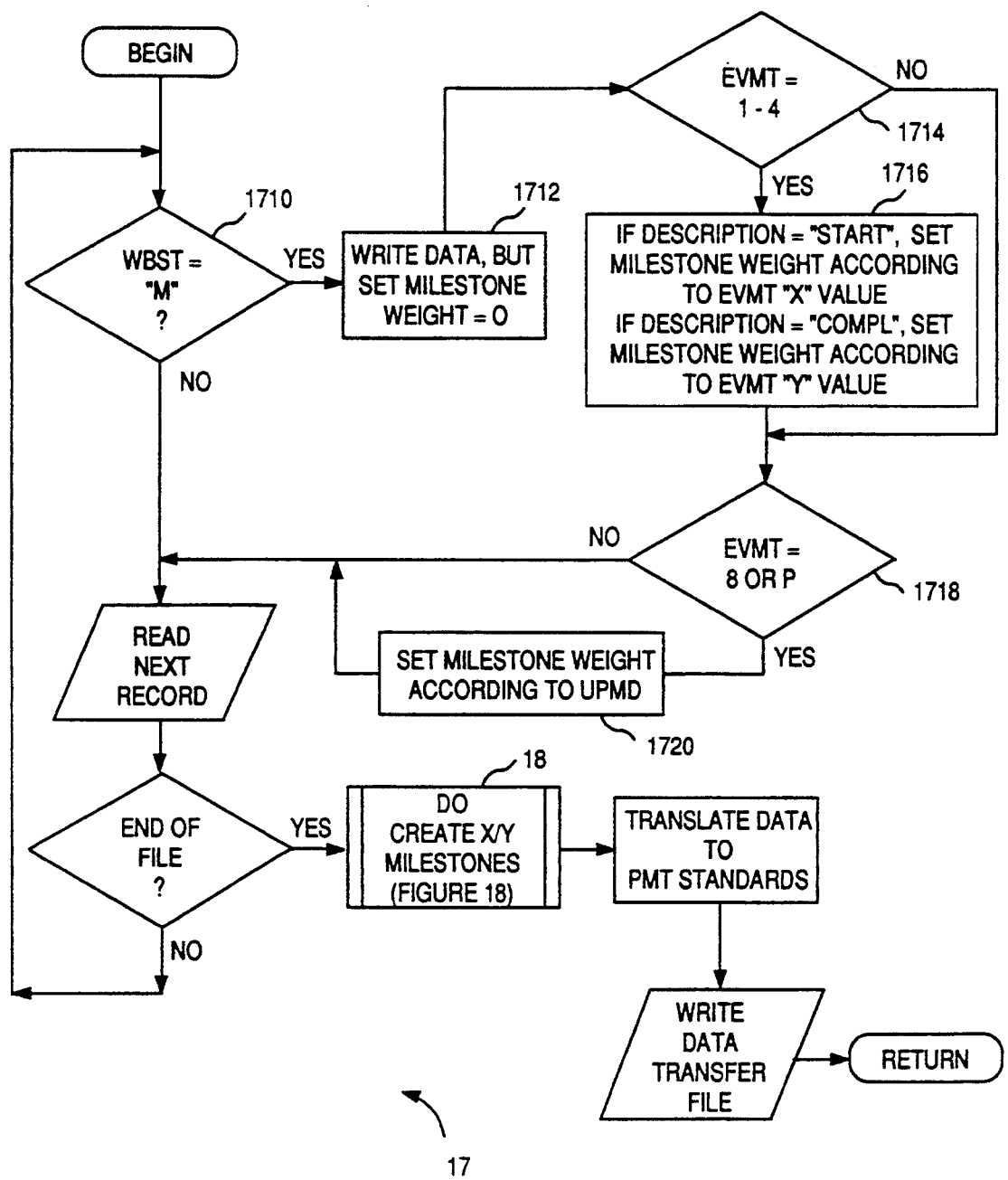
Figure 18A:
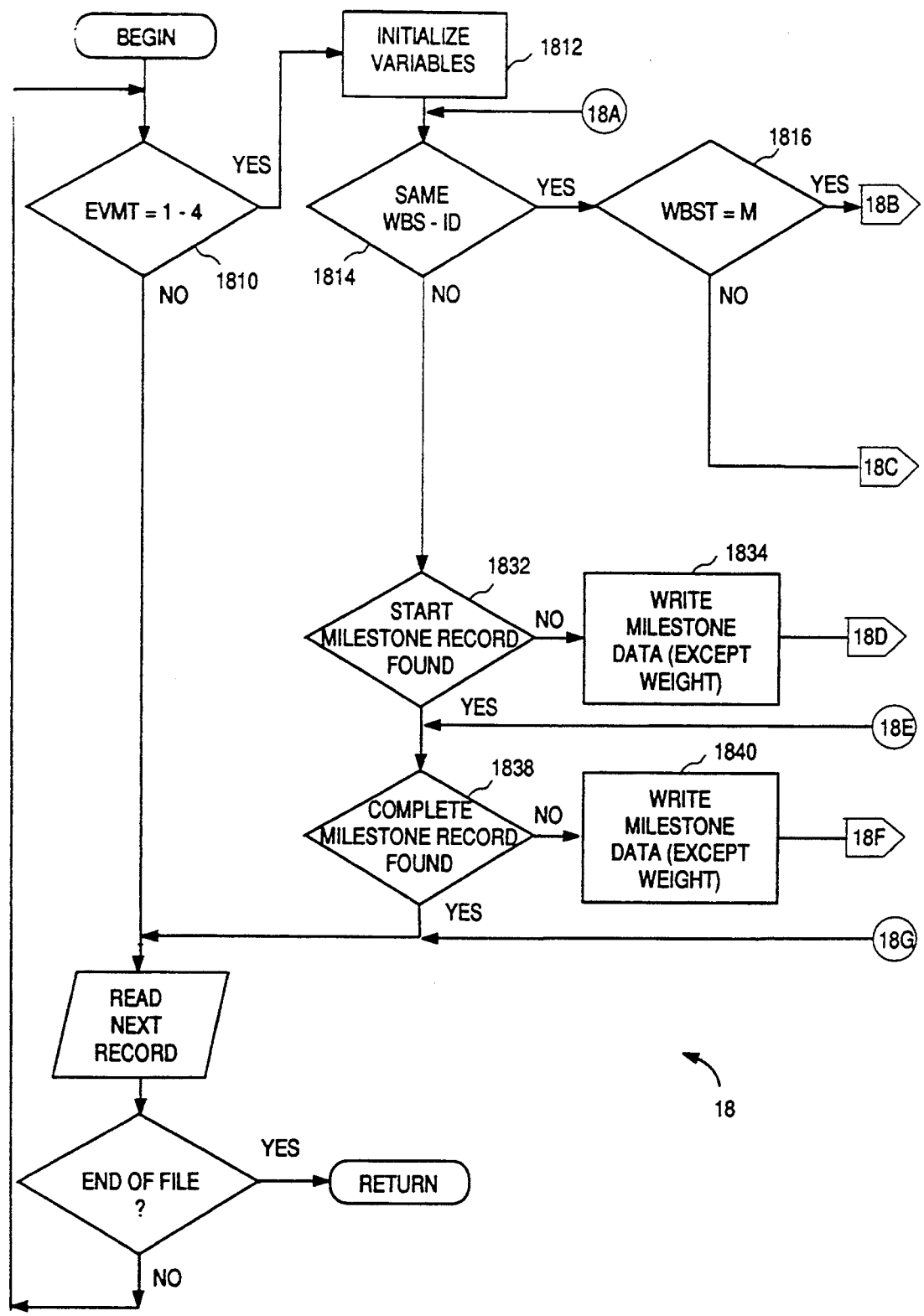
Figure 18B:
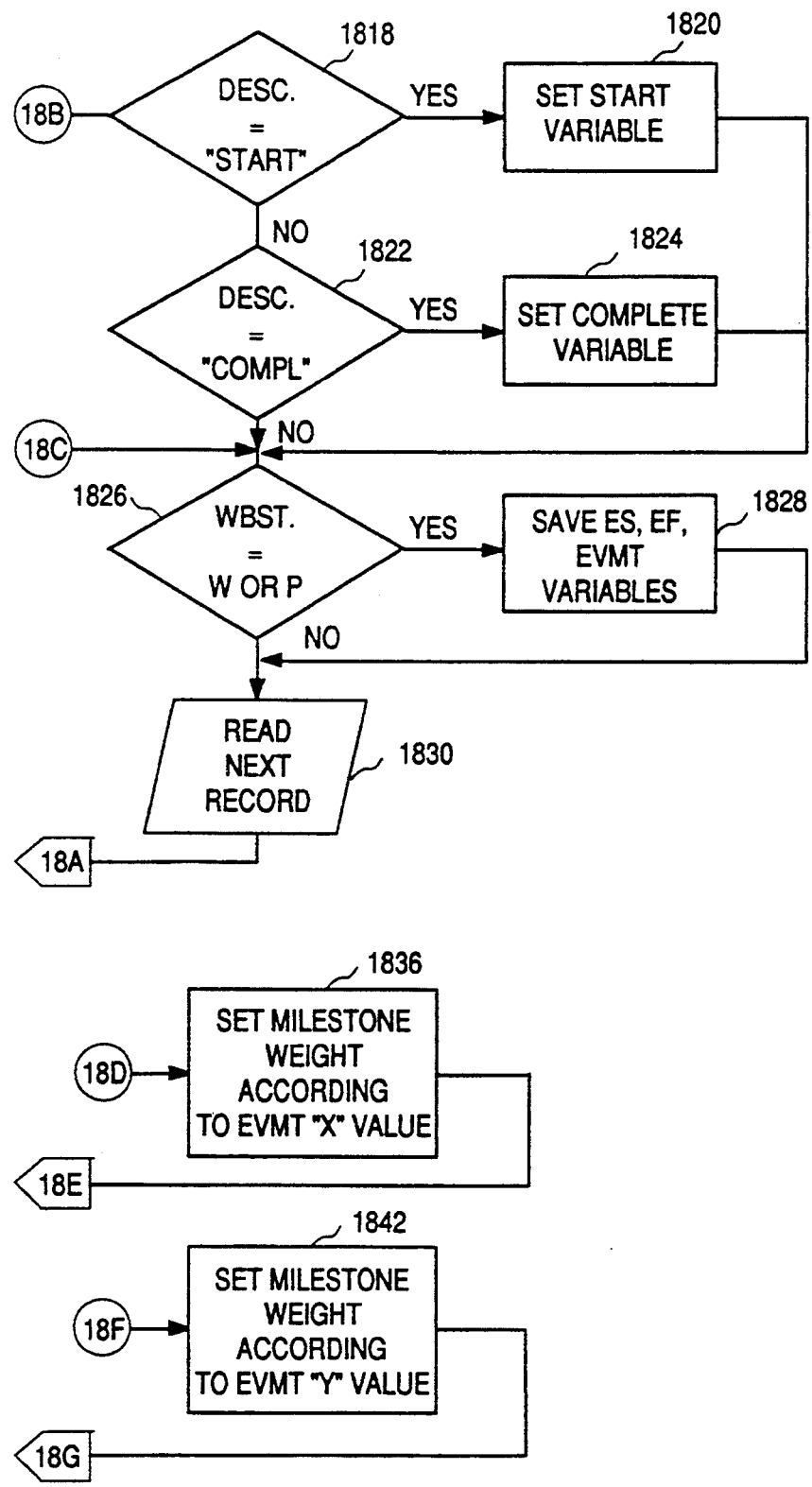

When module 11 recognizes the selection of transferring milestone-related data in task 1114, program control proceeds to module 17, a flow chart of which is presented in FIG. 17. Upon entering module 17, the first one of records 510 of NST file 512 is read. A query task 1710 examines WBST data item 526 for a code that indicates that the NST work unit record 510 carries milestone data for PMT 150. If the current record 510 is not a milestone record, the current record 510 is ignored for now, and program control loops to get the next record 510.

When a milestone record is encountered, program control proceeds from task 1710 to a task 1712. Task 1712 gets data from the current record 510 and writes these data to a temporary file. In particular, task 1712 writes the following data to the temporary file:

| DATA ITEM NAME | SOURCE |
| --- | --- |
| Work Breakdown Structure Identifier | DI: 514 |
| Description (the first 5 characters of DI 514 are appended to the first 9 characters of DI 538) | DI: 538, 514 |
| Milestone Symbol | "—" |
| Milestone Weight | "0" |
| Scheduled Date | DI: 542 |
| Forecast/Revised Date | DI: 542 |
| Status | "N" |
| Percent Complete | "0" |

The status and percent complete data elements are set to "N" (for no) and "0", respectively, because for "planned" initial baseline configuration no work should have taken place and no milestones should have be met. The milestone symbol data element specifies how data are displayed in the preferred version of PMT 150.

After task 1712, further processing is preformed with respect to the milestone weight data element written to the temporary file. A query task 1714 examines EVMT data item 516 to determine whether an X/Y earned value calculation method has been specified. With reference to FIG. 6, X/Y EVMTs are represented by EVMT codes of 1–4 in the preferred embodiment of the present invention. Those skilled in the art will appreciate that with X/Y calculation methods, an "X" percentage of a work package's budget is earned upon starting the work package and a "Y" percentage of the total budget is earned upon completion. FIG. 6 shows that any one of four different X/Y calculation methods are potentially specified.

With reference back to FIG. 17, when task 1714 encounters a milestone record with an X/Y EVMT, a task 1716 sets the milestone weight data element accordingly. In particular, if description data item 538 of the current record 510 indicates that the milestone corresponds to the start of a work package, the milestone weight data element written to the temporary data file is set to 0% 25% 40% or 50% depending upon whether an EVMT code of 1, 2, 3, or 4, respectively, is specified. Likewise, if description data item 538 indicates that the milestone corresponds to the completion of a work package, the milestone weight data element is set to 100%, 75%, 60%, or 50% depending upon whether an EVMT code of 1, 2, 3, or 4, respectively, is specified.

After task 1716 or when task 1714 determines that the EVMT code does not represent an X/Y computational method, a query task 1718 determines whether the specified EVMT requires a user-supplied milestone weight. User-supplied milestone weights are required for EVMT computations that allocate earned values in accordance with reaching milestones (see FIG. 8). These EVMTs are represented by the EVMT codes of "8" or "P." When task 1718 detects the milestone EVMTs, a task 1720 sets the milestone weight variable in the temporary file equal to milestone weight data item 522 from the UPMD portion of current record 510. As discussed above, this data item was collected by NST 140 from a user of NST 140. After task 1720 and when task 1718 does not detect a milestone EVMT, module 17 loops to process the next record from NST file 512. When the entire NST file 512 has been processed, program control passes to module 18, which is described in more detail in FIG. 18. Generally speaking, module 18 processes NST file 512 again to determine when milestone data records need to be created for work packages that are assigned an X/Y EVMT, and module 18 creates such milestone records.

Upon entering module 18, a query task 1810 reads EVMT data item 516 of the first and current NST record 510. If task 1810 does not detect an X/Y EVMT record, the record 510 is ignored by module 18, and program control loops to process the next record from NST file 512. When task 1810 finds an X/Y EVMT record 510, a task 1812 initializes certain variables used by module 18. In particular, "start" and "complete" variables are set to "N" to indicate that no start or complete milestone conditions have been detected, and the current WBS_ID is saved for future use.

After task 1812, a query task 1814 determines whether the current WBS_ID 514 matches the saved WBS_ID. If it does, then program control remains in a loop that examines all work unit records related to a single WBS_ID. In particular, a query task 1816 examines WBST data item 526 for a milestone (M) characterization. If a milestone record is encountered, then a query task 1818 examines description data item 538 to determine if it is a "start" milestone. If so, a task 1820 sets the start variable to a "Y" to indicate that a start milestone condition has been detected in the loop. Tasks 1822 and 1824 duplicate the process of tasks 1818–1820 for a complete condition. Task 1824 sets the complete variable to a "Y" when a complete milestone condition occurs. The loop additionally examines WBST data item 526 in a query task 1826 to detect a work package (W) or planning package (P) characterization. When found, a task 1828 saves ES, EF, and EVMT data items 540, 542, and 516 in variables for later use. Finally, a task 1830 reads the next record 510 from NST file 512, and program control loops back to task 1814 to test for the end of the loop.

The loop ends when all records 510 relating to a common WBS_ID have been examined and a record 510 for another WBS_ID has been read. Upon ending this loop, a query task 1832 examines the "start" variable that might have been set to a "Y" in task 1820. If the start variable was set, then a milestone record for the previously examined X/Y EVMT WBS element already exists. However, if the start variable was not set, module 18 creates the needed milestone record. Specifically, a task 1834 writes milestone data to the temporary file. The data written in task 1834 are similar to that discussed above in connection with task 1712. However, task 1834 sets both the "Scheduled Date" and "Forecast/Revised Date" equal to early start date (ES) data item 540, and the "Description" data element is set to "START." After task 1834, a task 1836 sets the milestone weight variable written to the temporary file in accordance with the specified EVMT "X" value, as discussed above in connection with task 1716.

After tasks 1832–1836, tasks 1838–1842 duplicate the process of tasks 1832–1836, respectively, for a complete milestone. A complete milestone record is created when none previously existed for the WBS_ID that has an X/Y EVMT. The complete record includes data similar to that discussed above in connection with task 1712. However, the "Description" data element is set to "COMPLETE," and the "Scheduled Date" and "Forecast/Revised Date" are both set to equal the early finish date (EF) data item 542.

After tasks 1838–1842, program control loops back to task 1810 to process the next set of common WBS_ID records 510 from NST file 512. When the end of NST file 512 is encountered, program control returns to module 17. As shown in FIG. 17, module 17 then translates the data in the temporary file to PMT standards and copies the temporary file to an initial baseline milestone import file for PMT 150. When the initial baseline milestone import file has been stored in memory 228, program control returns to module 11.

Figure 19:
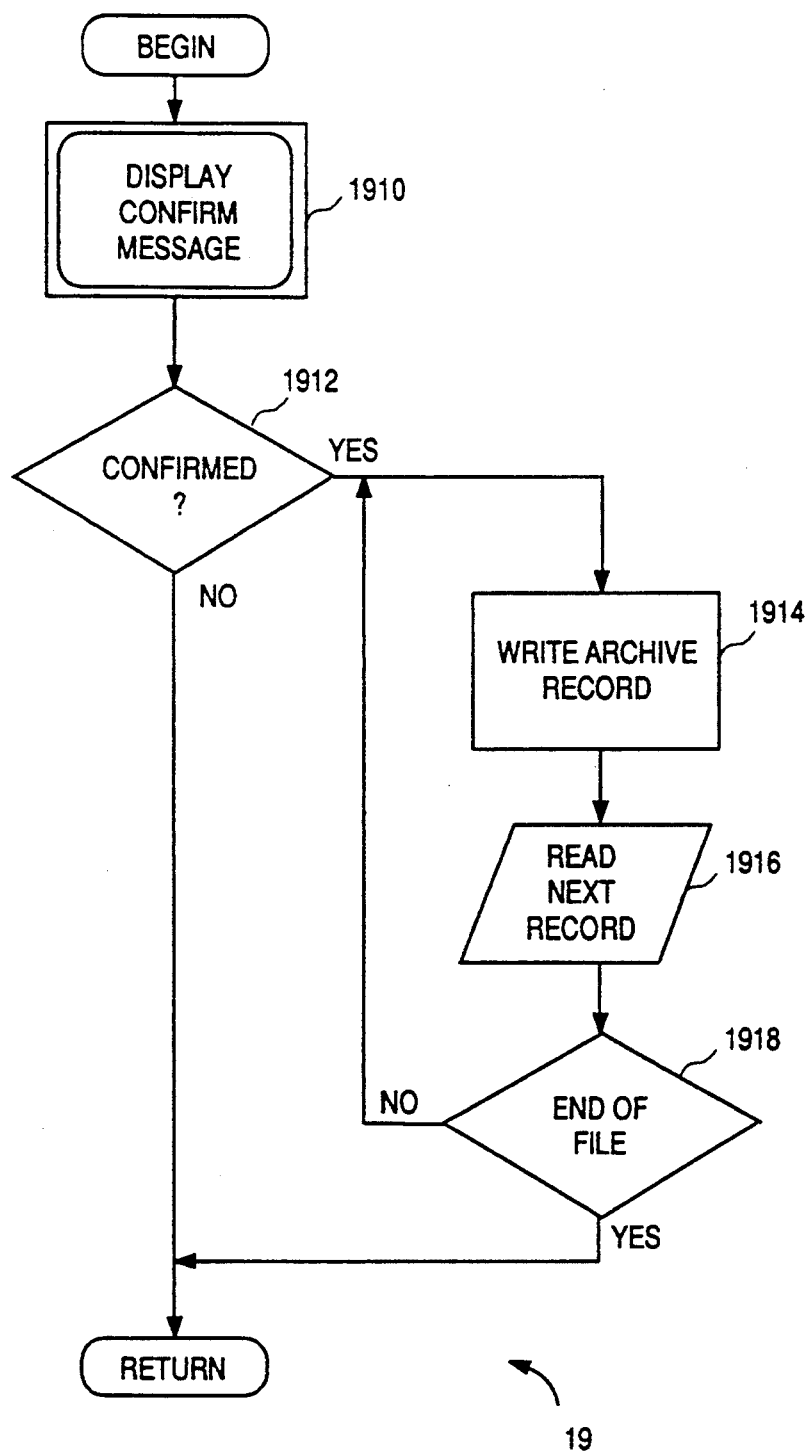

When module 11 recognizes the selection of the option to create an initial baseline archive file in task 1116, program control proceeds to module 19, a flow chart of which is presented in FIG. 19. Upon entering module 19, a task 1910 checks for an existing baseline archive file. If a baseline archive file for the current project already exists, the user is required to confirm that a new baseline archive file is desired before module 19 continues beyond a query task 1912. If the user does not confirm the overwriting of an old archive file with a new file, program control returns to module 11. If the user confirms the new baseline archive file, then a loop consisting of tasks 1914–1918 reads all records 510 in NST file 512 and makes corresponding records in an archive file. Each record written to the archive file by task 1914 includes the following data elements:

| DATA ITEM NAME | SOURCE |
| --- | --- |
| Work Breakdown Structure Identifier (WBS_ID) | DI: 514 |
| Work Unit Description | DI: 538 |
| Planned Start Date (PS) | DI: 548 |
| Planned Finish Date (PF) | DI: 550 |
| Work Breakdown Structure Type (WBST), (see FIG. 7) | DI: 526 |
| Activity Identification | DI: 554 |

When task 1918 encounters the end of NST file 512, program control returns to module 11. The baseline archive file is not imported into PMT 150 but is used later by bridge 160 to maintain secure baseline data.

Figure 20:
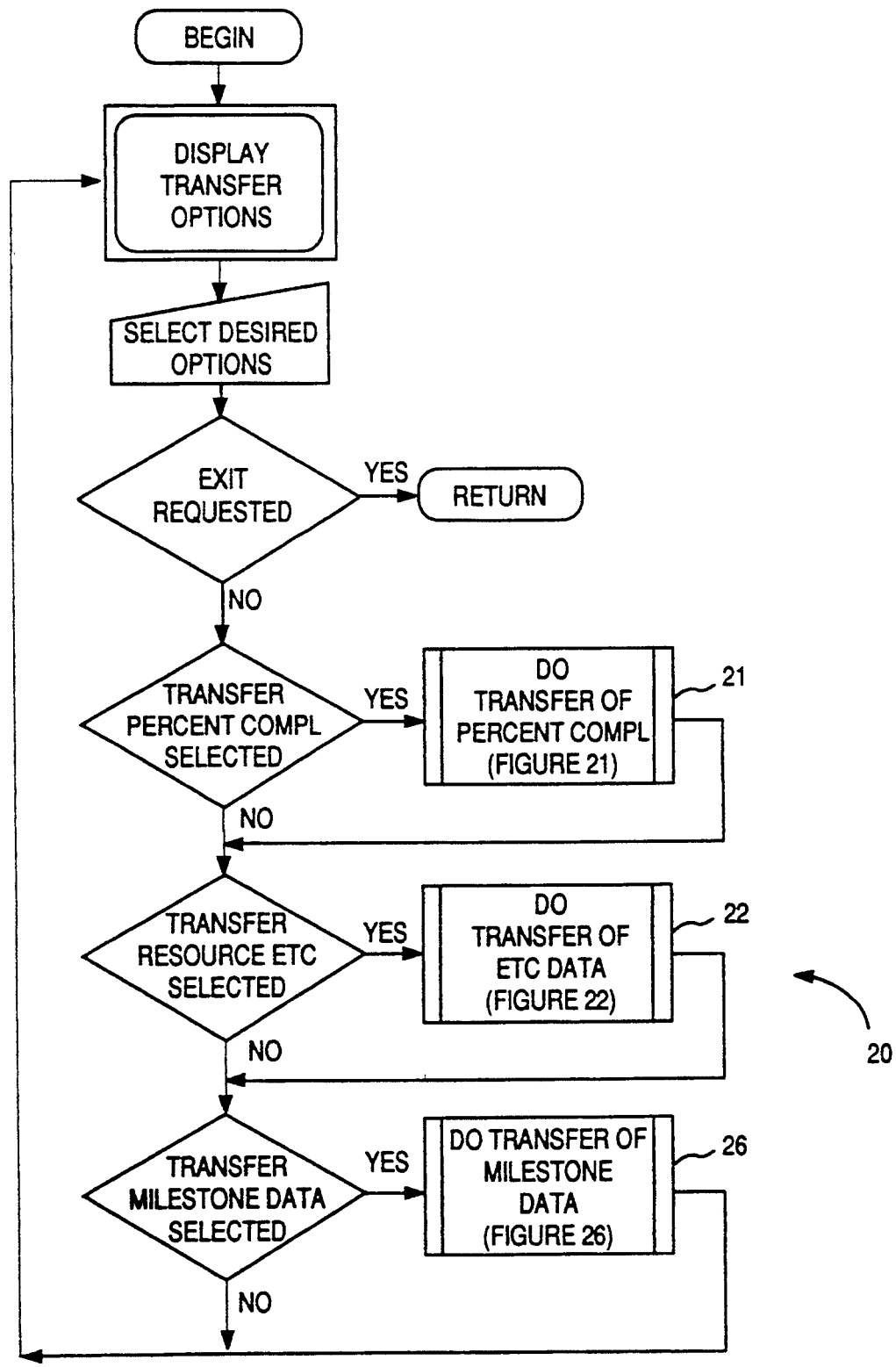
Figure 21:
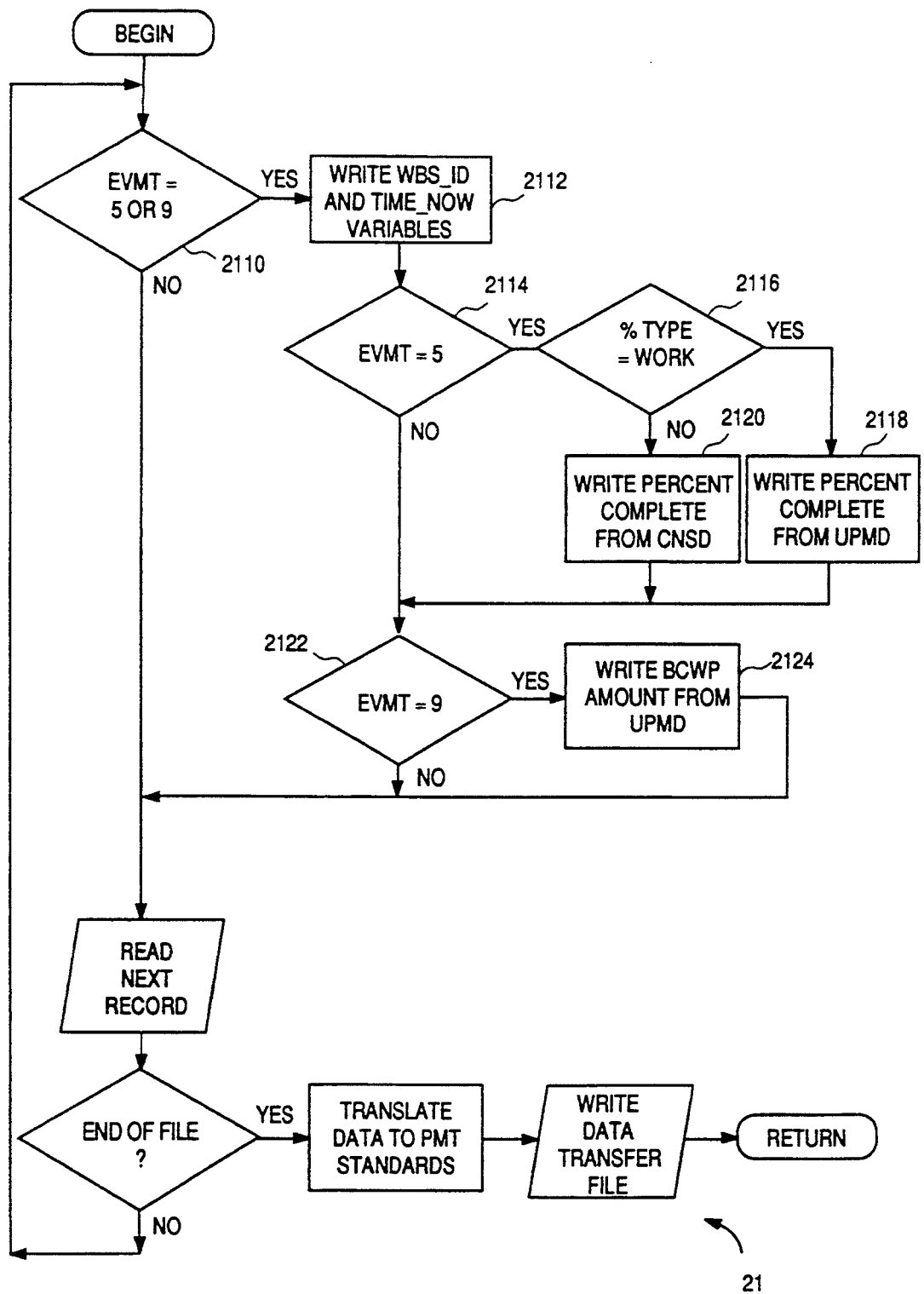
Figure 22:
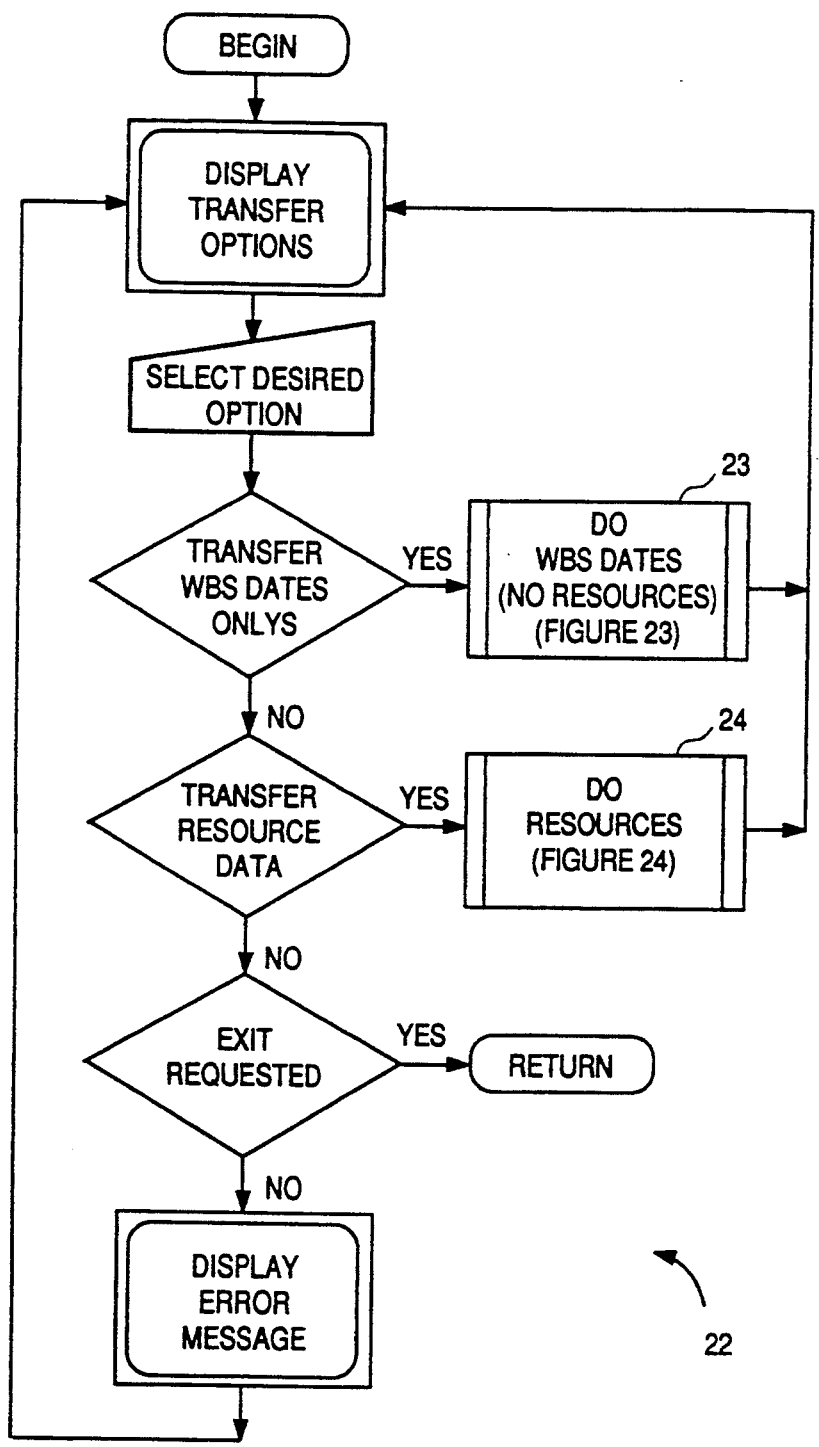

When option 1012 to transfer status data has been selected through the main menu of module 10 (see FIG. 10), program control transfers to module 20, a flow chart of which is presented in FIG. 20. As shown in FIG. 20, module 20 runs another menu. The menu run by module 20 is much like the menu run by module 11, discussed above. This menu gives the user multiple selection options. These options are related to status data for characterizing the percentage of completion of work, scheduling or timing consideration, such as estimate to completion (ETC), and milestone data. Of course, the data processed as a result of operating module 20 are status data rather than the initial baseline data discussed above in connection with modules 11–19. In response to user selections, module 20 routes program control to modules 21, 22, and 26.

Module 21 is entered from module 20 when the user specifies a selection for transferring percentage completion status data or budgeted cost of work performed (BCWP) amounts collected by NST 140. Upon entering module 21, a query task 2110 examines EVMT data item 516 of the first NST record 510 for an EVMT that requires some sort of a completion value, such as options 5 or 9 (see FIG. 6). If the current record 510 does not require a completion value, then module 21 loops to the next record 510. When a completion value is needed, the following data elements are written to a record in a temporary file:

| DATA ITEM NAME | SOURCE |
| --- | --- |
| Work Breakdown Structure Identifier (WBS_ID) | DI: 514 |
| Statusing Time | Time_Now |
| Percent Complete | DI: 520 or DI: 552 |
| BCWP | DI: 524 |

In particular, a task 2112 saves the WBS_ID and Statusing Time variables. The Time_Now variable, discussed above in connection with module 10, provides a date to be associated with the status data. A query task 2114 tests the current record 510 for a "percent complete" EVMT (5). When found, a query task 2116 then examines percent type data item 518 of the UPMD to determine whether to use time line percent complete (T) or to base the percent completion parameter on work accomplished (W). When a work accomplished percent type is specified, the percentage is supplied by the user through data item 520 in a task 2118. When a time line percent type is specified, the percentage is supplied by NST 140 through data item 552 in a task 2120. This time line percentage comes from the common portion of the NSD (CNSD). Those skilled in the art will appreciate that a time line percentage is based solely on the duration of a scheduled activity while work accomplished may characterize completed work in accordance with all pertinent factors.

After tasks 2114–2120, a query task 2122 examines EVMT data item 516 for a BCWP EVMT. When found, the BCWP amount is obtained from UPMD data item 524 in the current record 510. After tasks 2122–2124, program control loops to process the next record 510 in NST file 512. When the end of NST file 512 is encountered, the temporary file is processed to translate its data into a format compatible with PMT 150 standards, and the temporary file is then copied to a status data file in secondary storage 228 for importation into PMT 150.

Module 22 is entered from module 20 when the user specifies a selection for transferring scheduling or timing status data to PST 150. Module 22 runs a menu giving the user the same two choices as are provided by module 13, discussed above. The user may choose to perform module 23 to process activity-related timing status data (WBS dates) or to perform module 24 to process resource-related timing status data.

Figure 23:
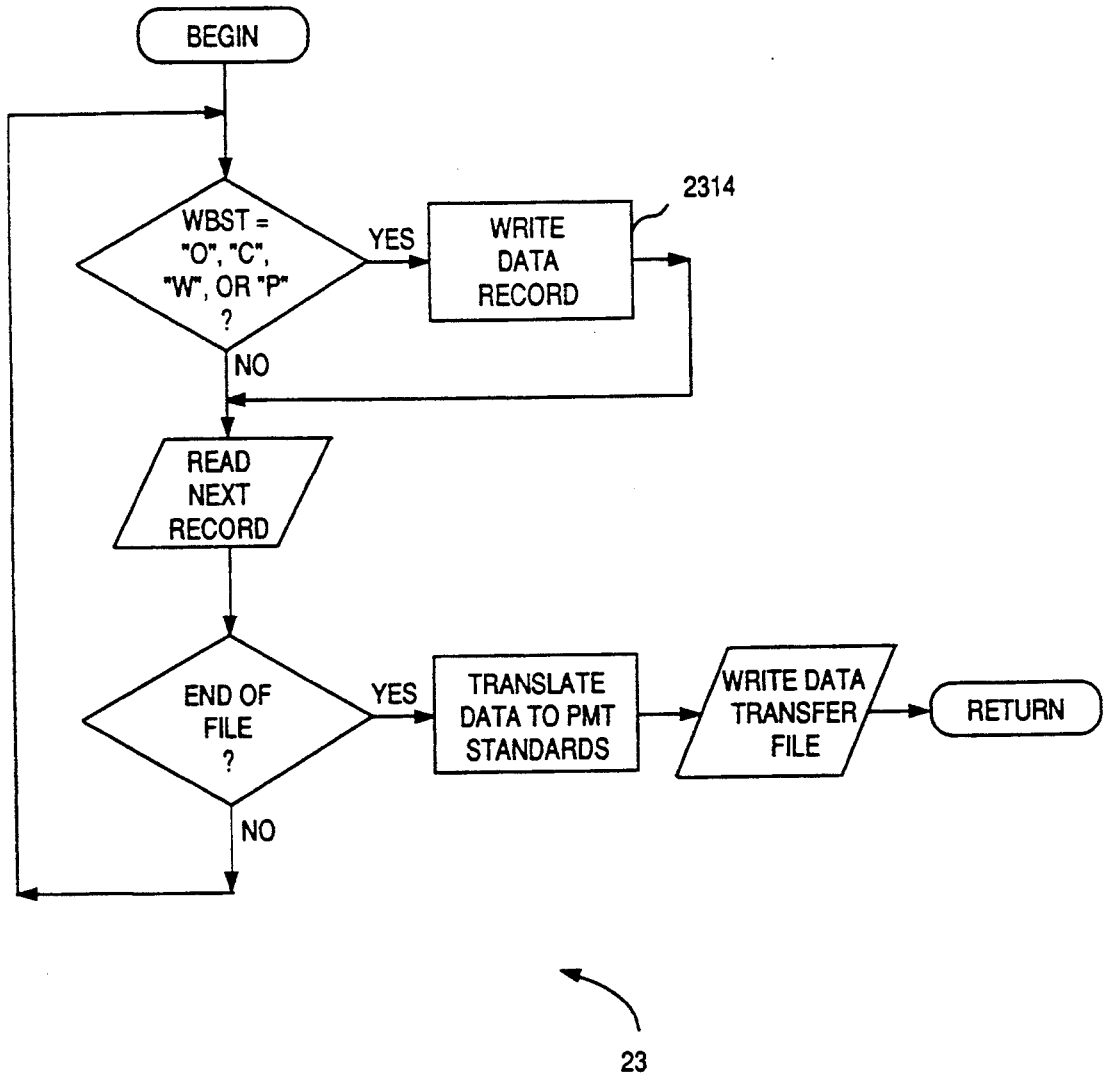

As shown in FIG. 23, the process performed by module 23 is substantially the same as that performed by modules 12 and 14. A task 2314 writes a record to the temporary file that contains the following data items from record 510:

| DATA ITEM NAME | SOURCE |
| --- | --- |
| Work Breakdown Structure Identifier (WBS_ID) | DI: 514 |
| Early Start Date (ES) | DI: 540 |
| Early Finish Date (EF) | DI: 542 |
| Late Start Date (LS) | DI: 544 |
| Late Finish Date (LF) | DI: 546 |

Upon completion of module 23, program control returns to module 22. At this point a WBS schedule status data file has been formed and stored in secondary storage 228 for later importation into PMT 150.

Figure 24:
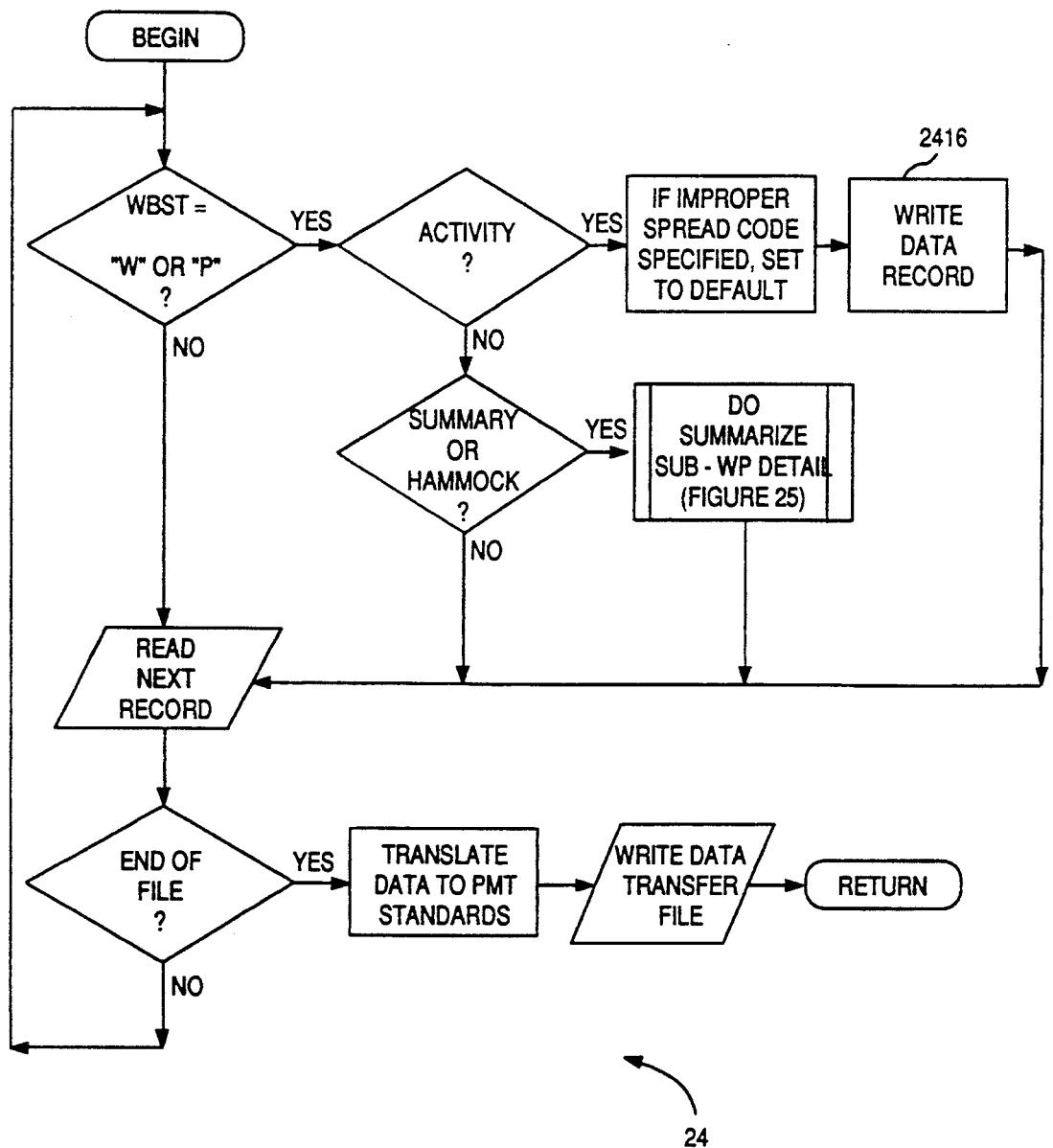

As shown in FIG. 24, the process performed by module 24 is substantially the same as that performed by module 15. However, a task 2416, which writes data to a temporary file, writes different data. In particular, task 2416 writes a record to the temporary file that contains the following data items from record 510:

| DATA ITEM NAME | SOURCE |
| --- | --- |
| Work Breakdown Structure Identifier (WBS_ID) | DI: 514 |
| Resource Name | DI: 560 |
| Early Start Date (ES) | DI: 540 |
| Early Finish Date (EF) | DI: 542 |
| Resource Unit | DI: 562 |
| Resource Remaining | DI: 566 |
| Resource Spread Code (see FIG. 8) (possibly changed by task 2414) | DI: 534 |

Figure 25:
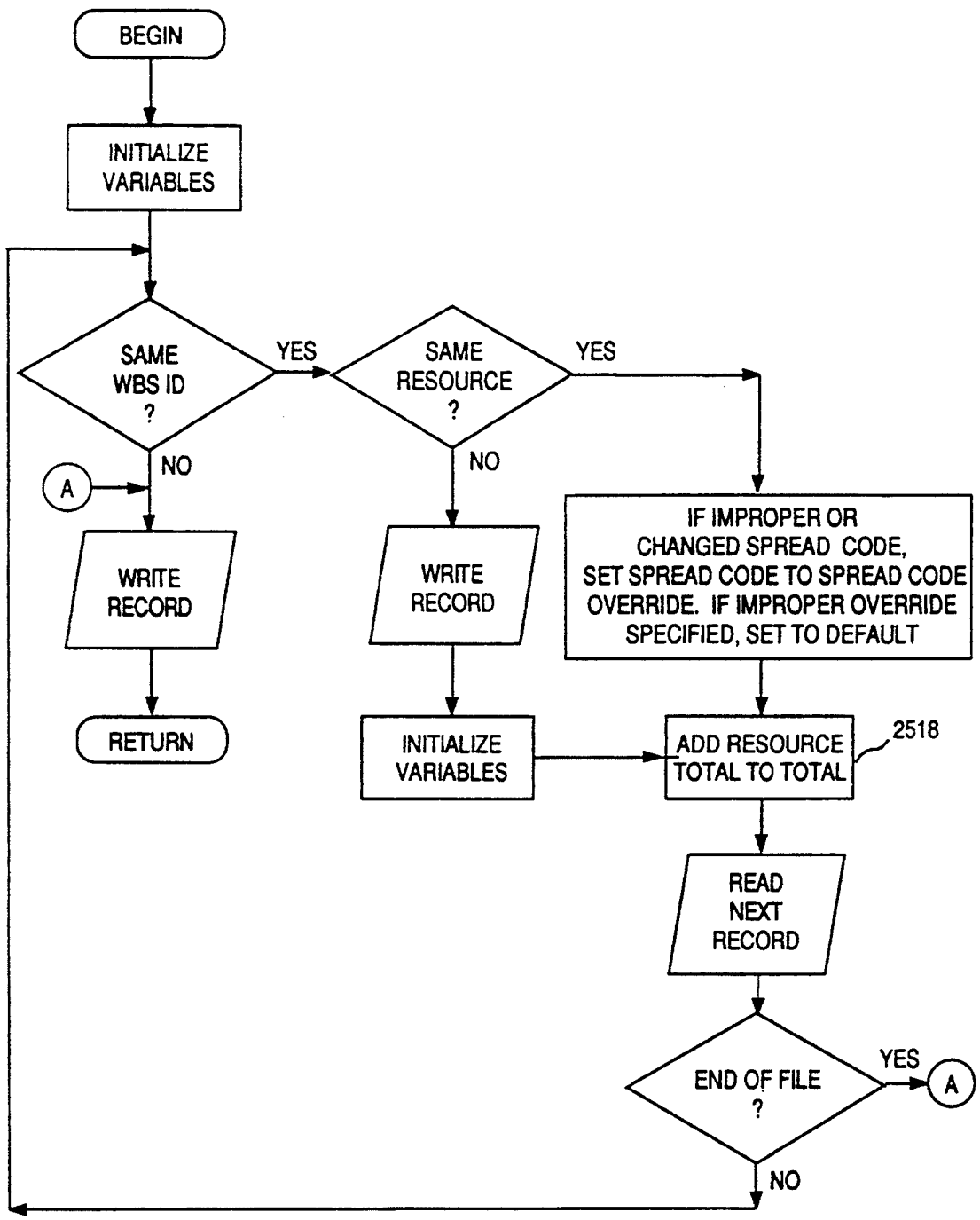

Module 24 calls module 25, shown in FIG. 25, in the same manner as module 15 calls module 16, discussed above. The process performed by module 25 is substantially the same as that performed by module 16. However, a task 2518 in module 25 keeps track of remaining resources identified in data items 566 of summarized records 510 rather than planned resources. Upon completion of module 25, program control returns to module 24. Upon the completion of module 24, program control returns to module 22. At this point a WBS resource status data file has been formed and stored in secondary storage 228 for later importation into PMT 150.

Figure 26:
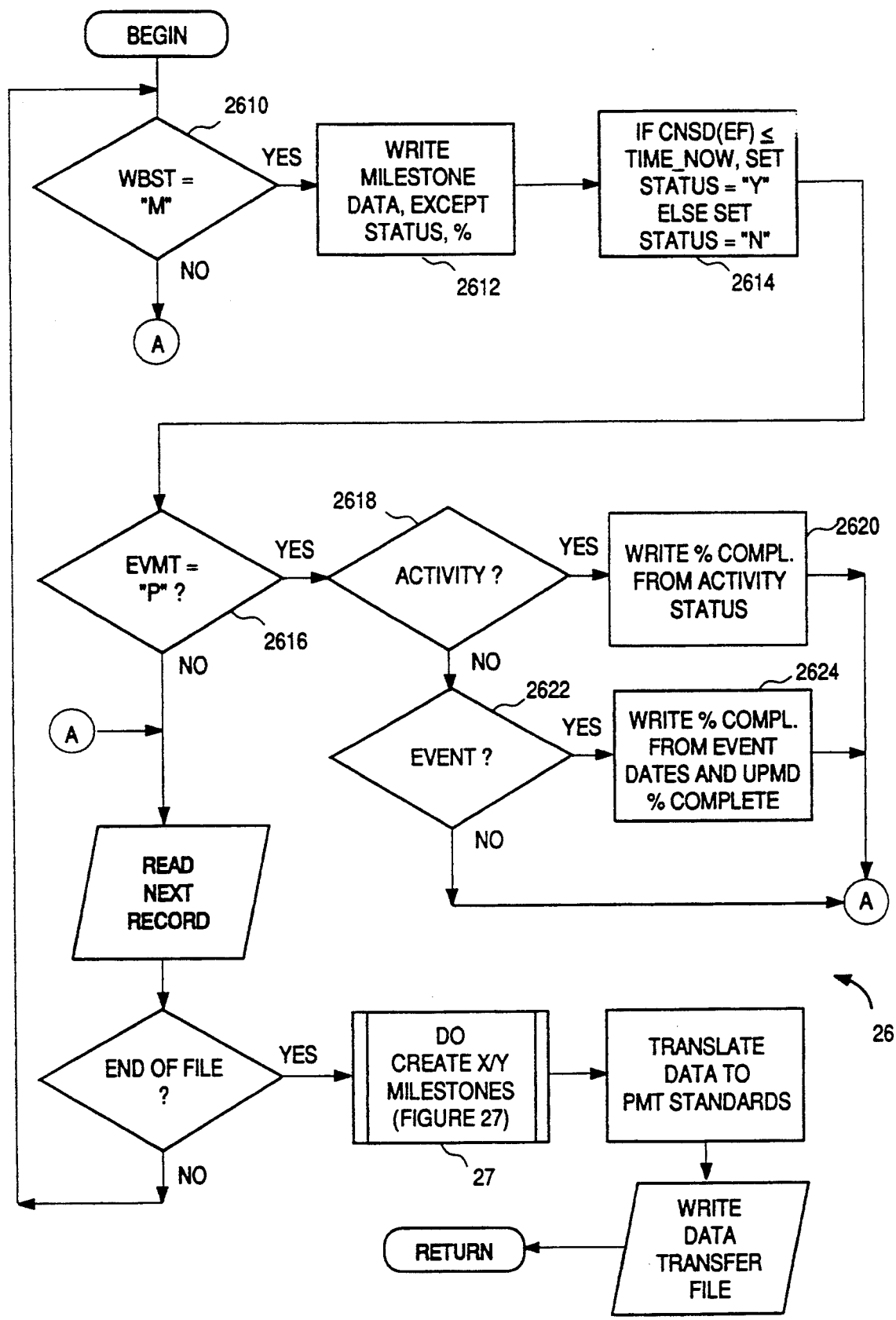

Module 26 is entered from module 20 when the user specifies a selection for transferring milestone status data from NST 140 to PMT 150. A flow chart of the process performed by module 26 is shown in FIG. 26. Upon entering module 26, a query task 2610 examines WBST data item 526 of the first NST record 510 for a milestone (M) WBST. If the current record 510 is not a milestone record, then module 26 loops to the next record 510 and repeats task 2610. When a milestone record is encountered, the following milestone data are written to a temporary file:

| DATA ITEM NAME | SOURCE |
| --- | --- |
| Work Breakdown Structure Identifier (WBS_ID) | DI: 514 |
| Description (the first 5 characters of DI 514 are appended to the first 9 characters of DI 538) | DI: 538, 514 |
| Milestone Symbol | "_" |
| Scheduled Date | DI: 550 |
| Forecast/Revised Date | DI: 542 |
| Status | "Y" or "N" |
| Percent Complete | DI: 552 or DI: 520 |

In particular, a task 2612 writes all the above-listed data, except for the Status and Percent Complete data elements. After task 2612, a task 2614 sets the Status data element in response to the Time_Now variable and early finish data item 542 of the current record 510. When the status data are greater than or equal to (past) the early finish (EF) data supplied by NST 140, the Status data element is set to a "Y" to indicate that the milestone has been met. When the status data are less than (before) the early finish (EF) data supplied by NST 140, the Status data element is set to an "N" to indicate that the milestone has not been met.

After task 2614, a query task 2616 examines EVMT data item 516 to detect whether a percentage complete type of milestone has been specified for the current record 510. If this type of EVMT has not been specified, then module 26 loops to process the next record 510. When this type of EVMT is encountered, a query task 2618 examines work unit type data item 558 to detect whether NST 140 classified the current work unit record as an activity. When an NST activity has been characterized as a PMT percentage complete type of milestone, a task 2620 writes a value equal to the time line percent complete data item 552 into the Percent Complete data element in the temporary file. Module 26 then loops back to process the next record 510. When a record characterized as a percentage complete type of milestone is not an activity work unit to NST 140, a task 2622 examines activity work unit data item 558 to detect whether NST 140 classified the current work unit record as an event. When an NST event has been characterized as a PMT percentage complete type of milestone, a task 2624 writes a value equal to the UPMD user-supplied percent complete data item 520 into the Percent Complete data element in the temporary file. Module 26 then loops back to process the next record 510.

Figure 27A:
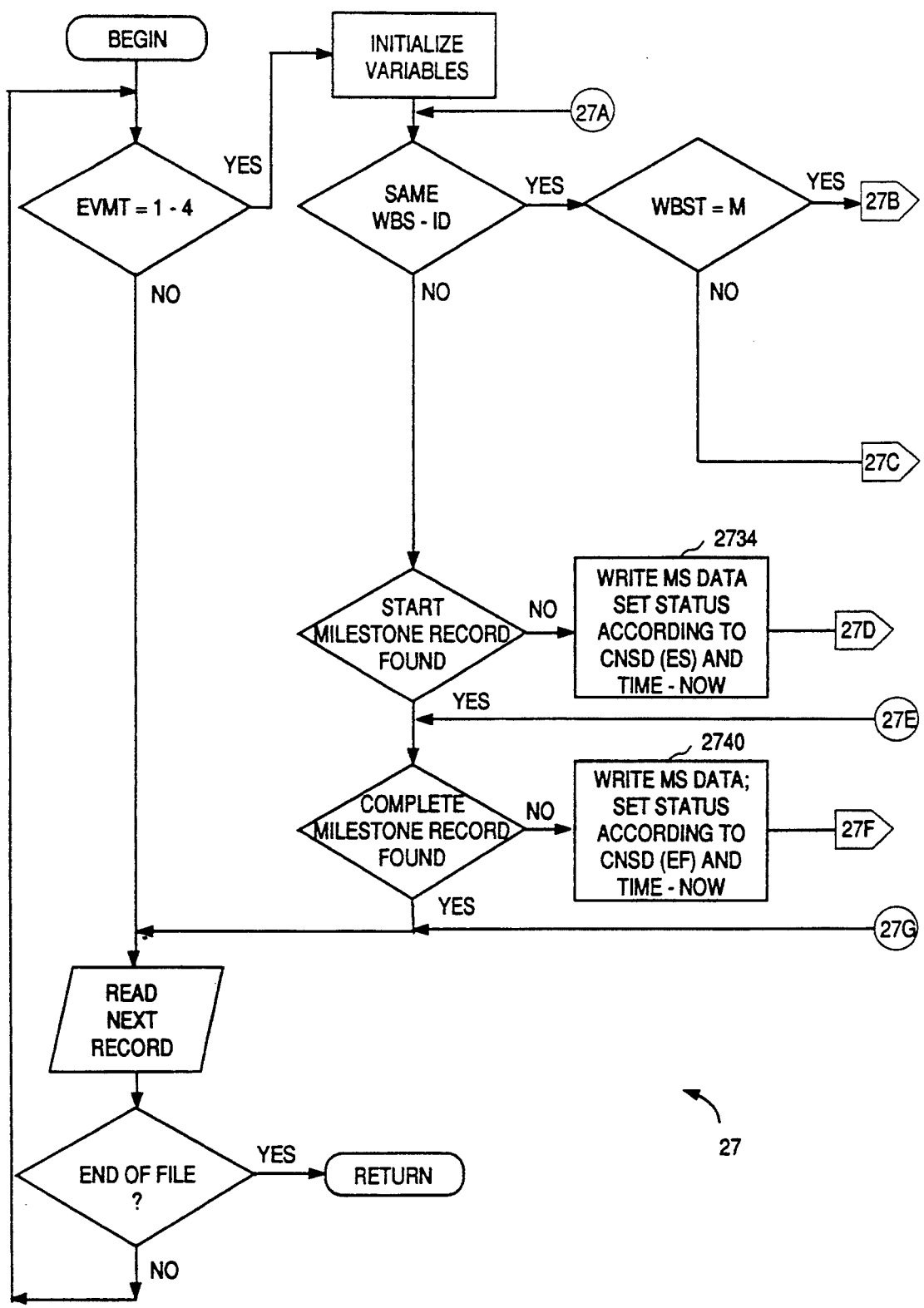
Figure 27B:
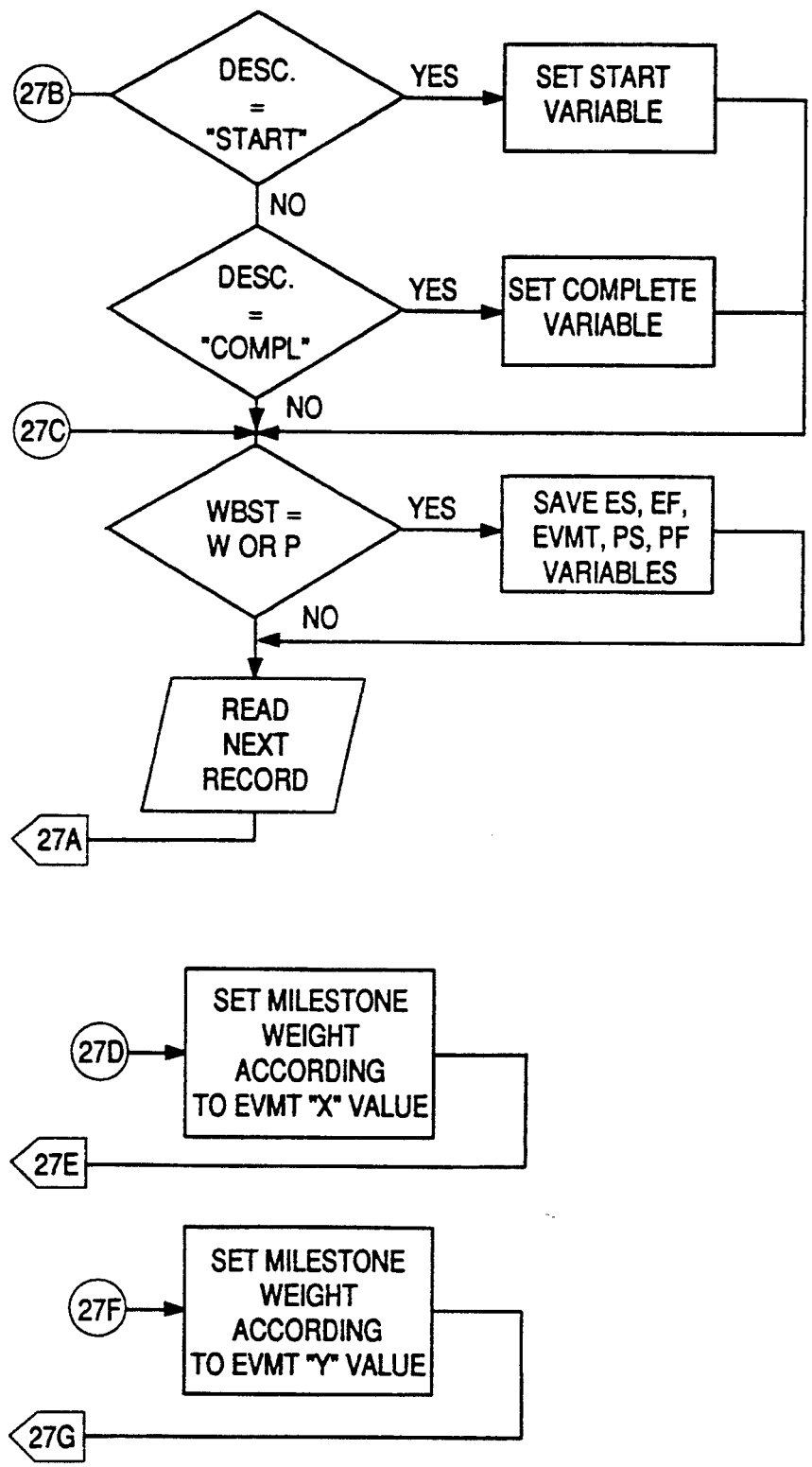

When the entire NST file 512 has been processed, program control passes to module 27, which is described in more detail in FIG. 27. Generally speaking, module 27 performs substantially the same process as was described above for module 18. In other words, module 27 processes NST file 512 again to determine when milestone status data records need to be created for work packages that are assigned an X/Y EVMT, and module 27 creates such milestone records.

However, module 27 differs slightly from module 18 in the data written to the temporary file. In particular, a task 2734 writes a milestone record when a start milestone is not encountered in NST file 512 for some WBS_ID. Task 2734 sets the Scheduled data element to equal the planned start date (PS) rather than the early start date (ES). In addition, task 2734 sets the Status data element in accordance with the procedure discussed above in connection with task 2614 of module 26, except that the early start date (ES) is compared against the statusing time to determine status. A task 2740 writes a milestone record when a complete milestone is not encountered in NST file 512 for some WBS_ID. Task 2740 sets the Scheduled data element to equal the planned finish date (PF) rather than the early finish date (EF). In addition, task 2740 sets the Status data element in accordance with the procedure discussed above in connection with task 2614 of module 26. Task 2740 also uses the early finish date (EF) to determine status.

When module 27 encounters the end of NST file 512, program control returns to module 26. As shown in FIG. 26, module 26 then translates the data in the temporary file to PMT standards and copies the temporary file to a status milestone import file for PMT 150. When the status milestone import file has been stored in secondary storage 228, program control returns to module 20.

Figure 28:
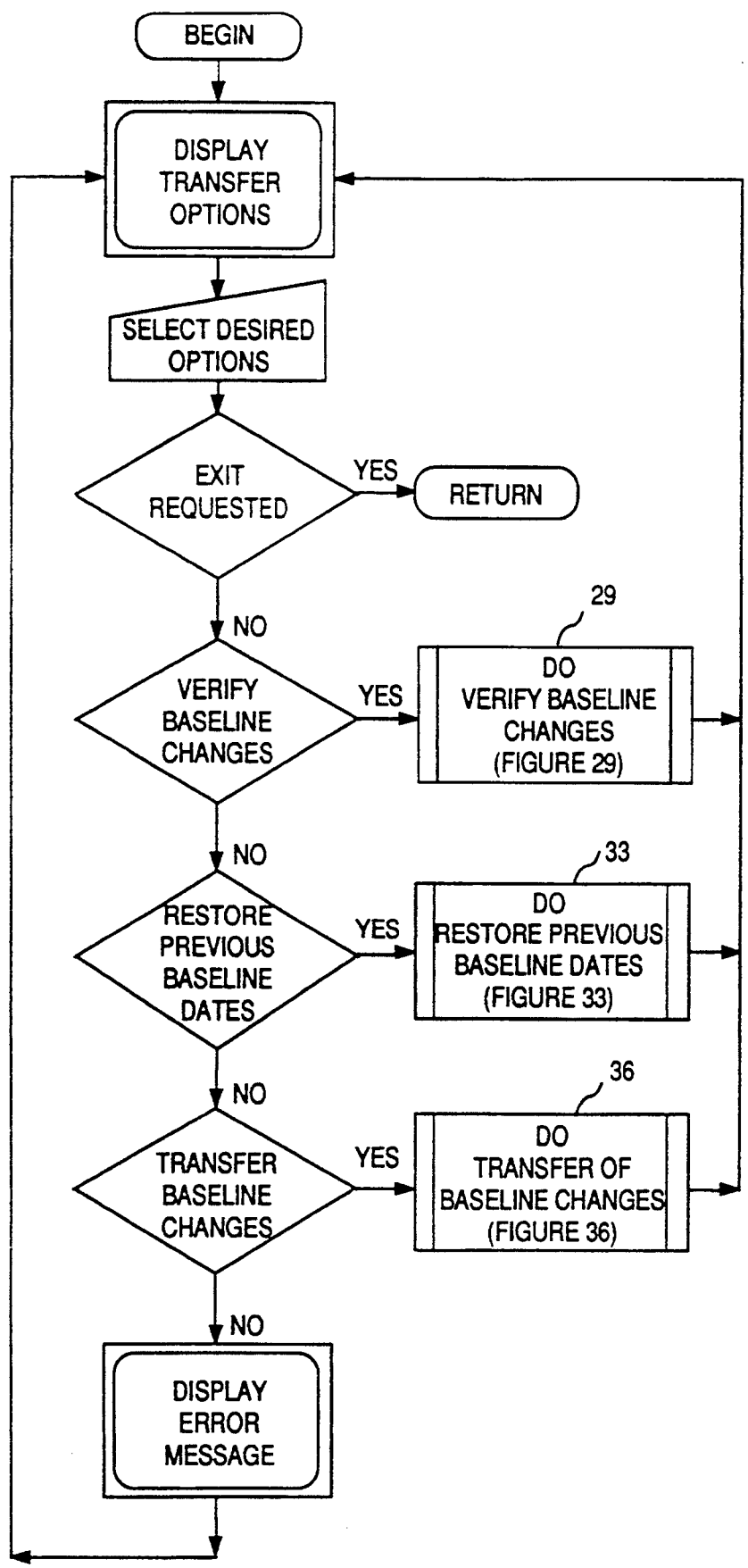

When baseline revision data transfer selection 1014 has been made through the main menu of module 10 (see FIG. 10), program control transfers to module 28, a flow chart of which is presented in FIG. 28. As shown in FIG. 28, module 28 runs another menu. The menu run by module 28 operates much like the menus discussed above. This menu gives the user single selection choices. In other words, once the user makes a single selection, program control immediately proceeds to the selected module. The choices presented through the menu of module 28 are related to verifying changes to the baseline configuration, restoring previously archived baseline data to NST 140, and transferring baseline revisions to PMT 150. In response to user selections, module 28 routes program control to modules 29, 33, or 36.

Figure 29:
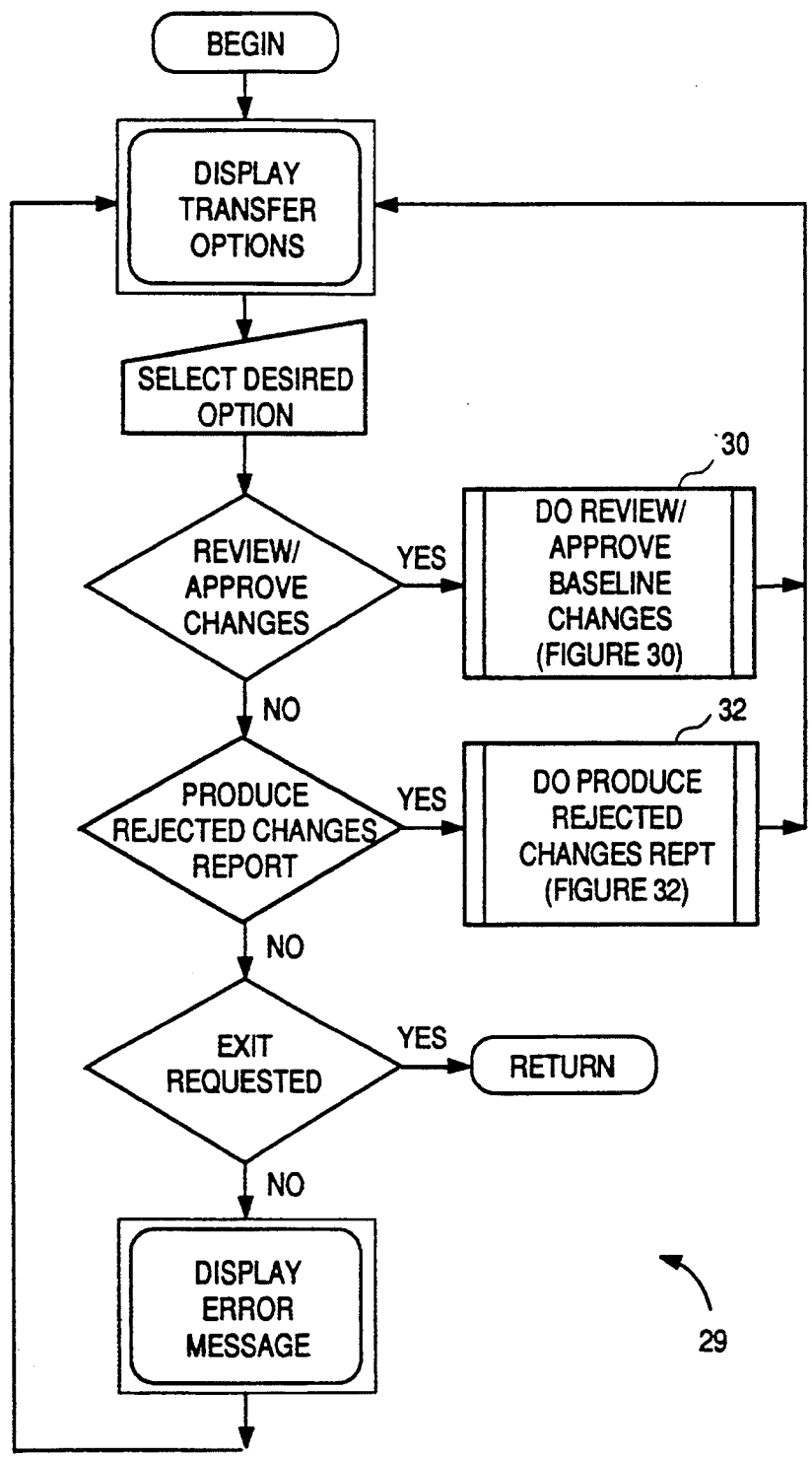

Module 29, a flow chart of which is presented in FIG. 29, runs another menu. The module 29 menu is a single selection menu that requires the user to choose between reviewing and approving baseline changes and producing a "rejected changes report". In response to user selections, module 29 routes program control to modules 30 or 32.

Figure 30:
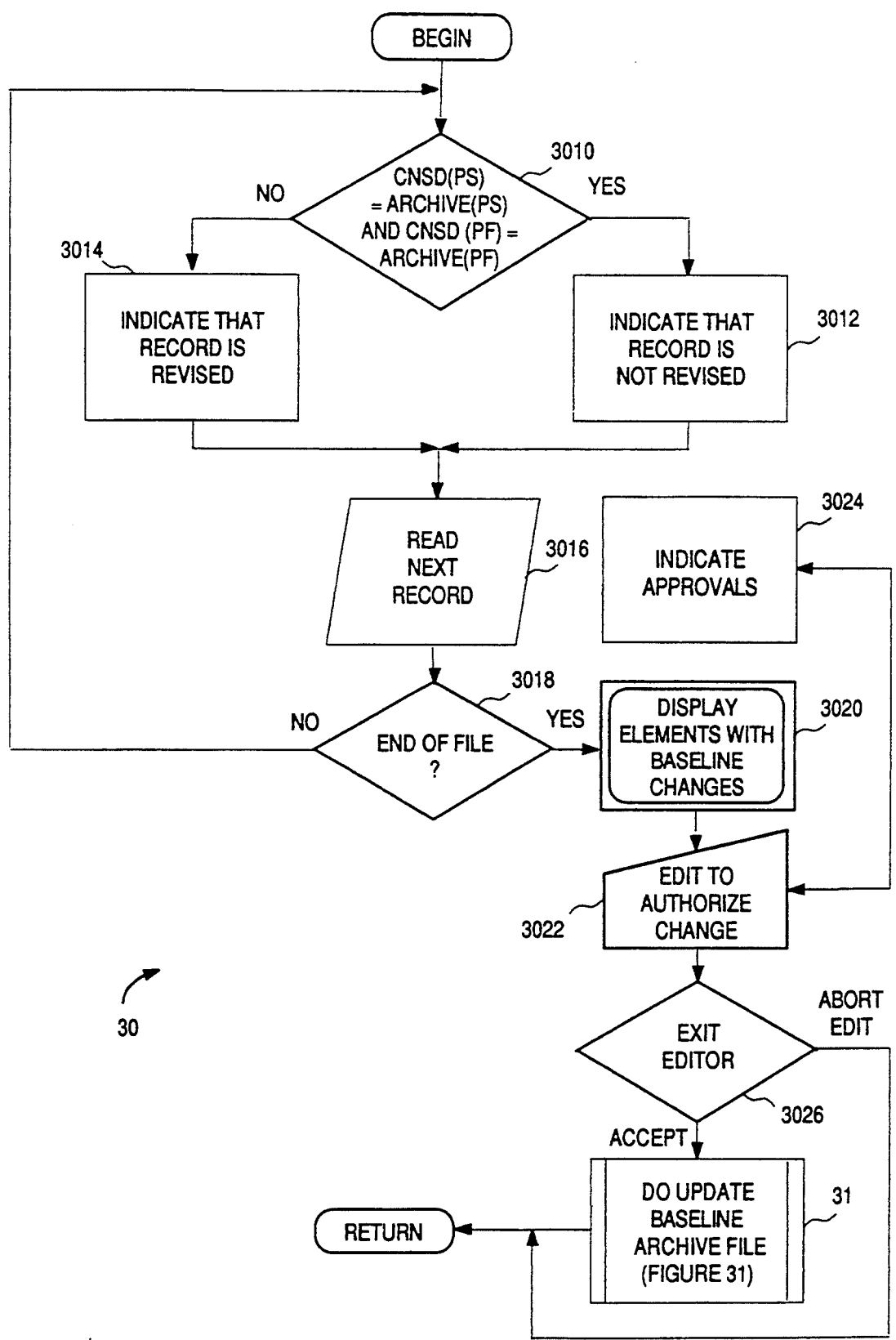

FIG. 30 shows a flow chart for module 30. Bridge 160 performs module 30 so that the user may verify changes in the baseline configuration before such changes take place. In other words, the user may either approve or reject any changes from the baseline archive file (see FIG. 19) that are presented in an NST file 512.

Upon beginning module 30, a query task 3010 reads the current record 510 of the NST file 512 to determine if it indicates a change from data recorded in the baseline archive file. In particular, WBS_ID data item 514 is read and used to locate a record in the baseline archive file that has the same WBS_ID. Then, planned start date (PS) data item 548 and planned finish date (PF) data item 550 from NST 512 are compared with the corresponding values recorded at the located record in the baseline archive file. If both parameters match, a task 3012 writes a tag to the current record of the NST file 512 to indicate that the record is not revised. If either parameter does not match or if the WBS_ID cannot be found in the archive file, a task 3014 writes a tag to the current record of the NST file 512 to indicate that the record has been revised. Those skilled in the art will appreciate that additional data fields may be present within each record of NST file 512 to accommodate this tag. A task 3016 reads the next record from file 512, and a query task 3018 tests for end of file. Module 30 loops through tasks 3010-3018 until all records 510 of file 512 have been tagged as being revised or not.

After all records 510 have been tagged, a task 3020 controls video display terminal 230 to display those elements from file 512 that have been revised, as indicated via the above-discussed tags. The WBS_ID, its description, its WBST, the new planned start and finish dates from NST file 512, and the original planned start and finish dates from the archive file are displayed. A task 3022 allows the user to approve or reject the changed records. The user may indicate approval or rejection in a conventional manner. For example, task 3022 may highlight data related to a single changed record in response to user-supplied input. Additional input may then allow the user to toggle an indicator that signifies whether or not the change is authorized. In a task 3024, this indicator is both displayed at video display terminal 230 and written to the appropriate records in NST file 512 for later use. When the user has finished editing in task 3022, a query task 3026 determines whether to process the authorization session or not in response to user input. If the user has elected to abort the session, program control returns to module 29.

Figure 31:
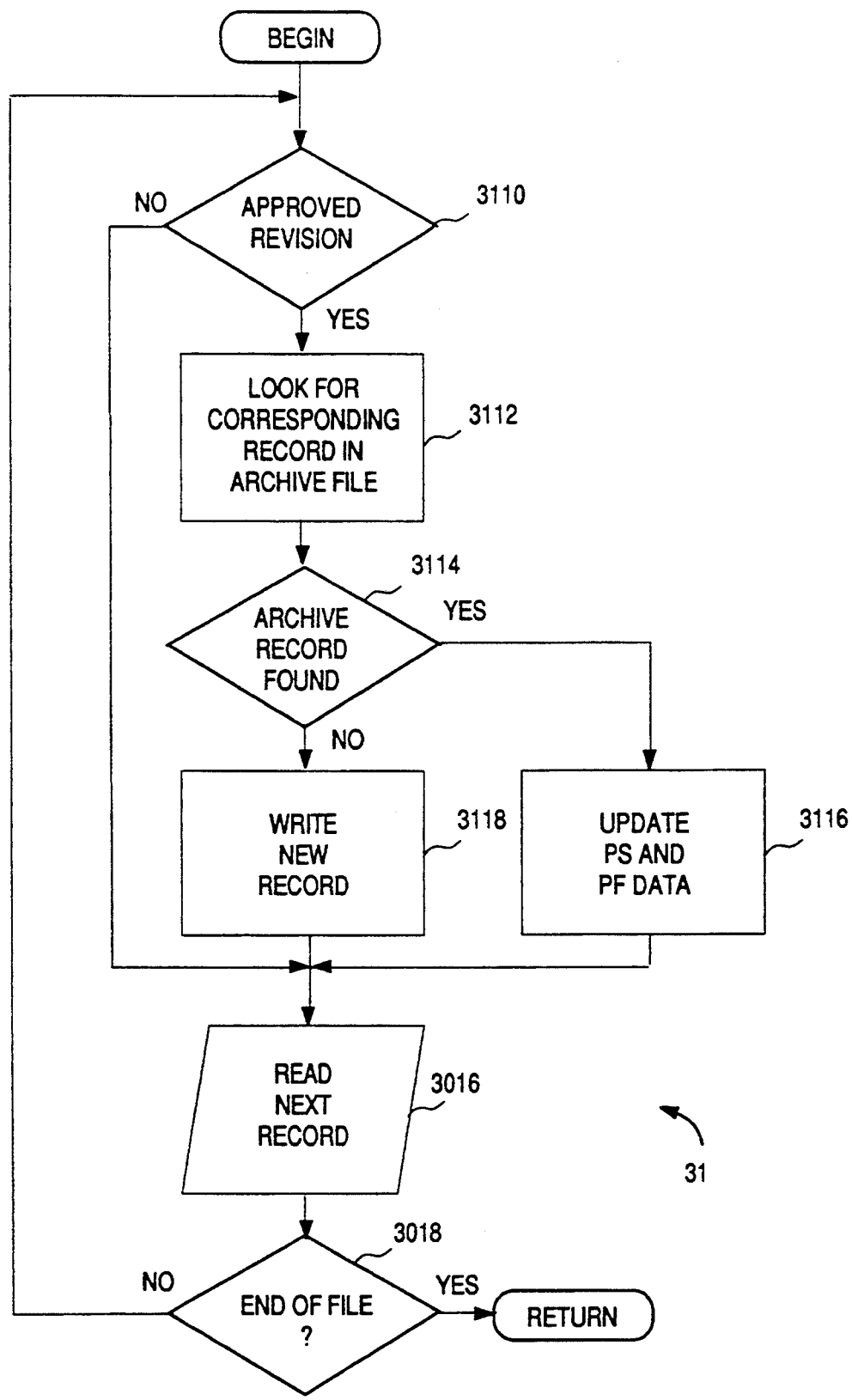

When the user decides to process the rejected and approved baseline changes, program control proceeds from task 3026 to module 31. FIG. 31 shows a flow chart of the process performed by module 31. Upon entering module 31, the first record in NST file 512 is read, and the indicator which may have been set in task 3024, discussed above, is evaluated in a query task 3110. If task 3110 fails to detect an approval indication, module 31 ignores the record 510 and loops to examine the next record in NST file 512. When a record 510 with an approved revision is encountered, a task 3112 looks for the corresponding record in the baseline archive file by matching WBS_IDs between the two files. A query task 3114 evaluates whether or not the corresponding archive record is found. If a corresponding archive record is found, a task 3116 updates the planned start date (PS) and planned finish date (PF) stored in that record. If a corresponding archive record is not found, a task 3118 writes a new record to the archive file. This new record includes the data elements discussed above in connection with module 19. Module 31 loops through tasks 3110-3118 until all records in NST file 512 have been evaluated. As a result of performing module 31, the baseline archive file has been updated to reflect only the approved changes in NST file 512. Module 31 exits to module 30, and program control then returns to module 29.

Figure 32:
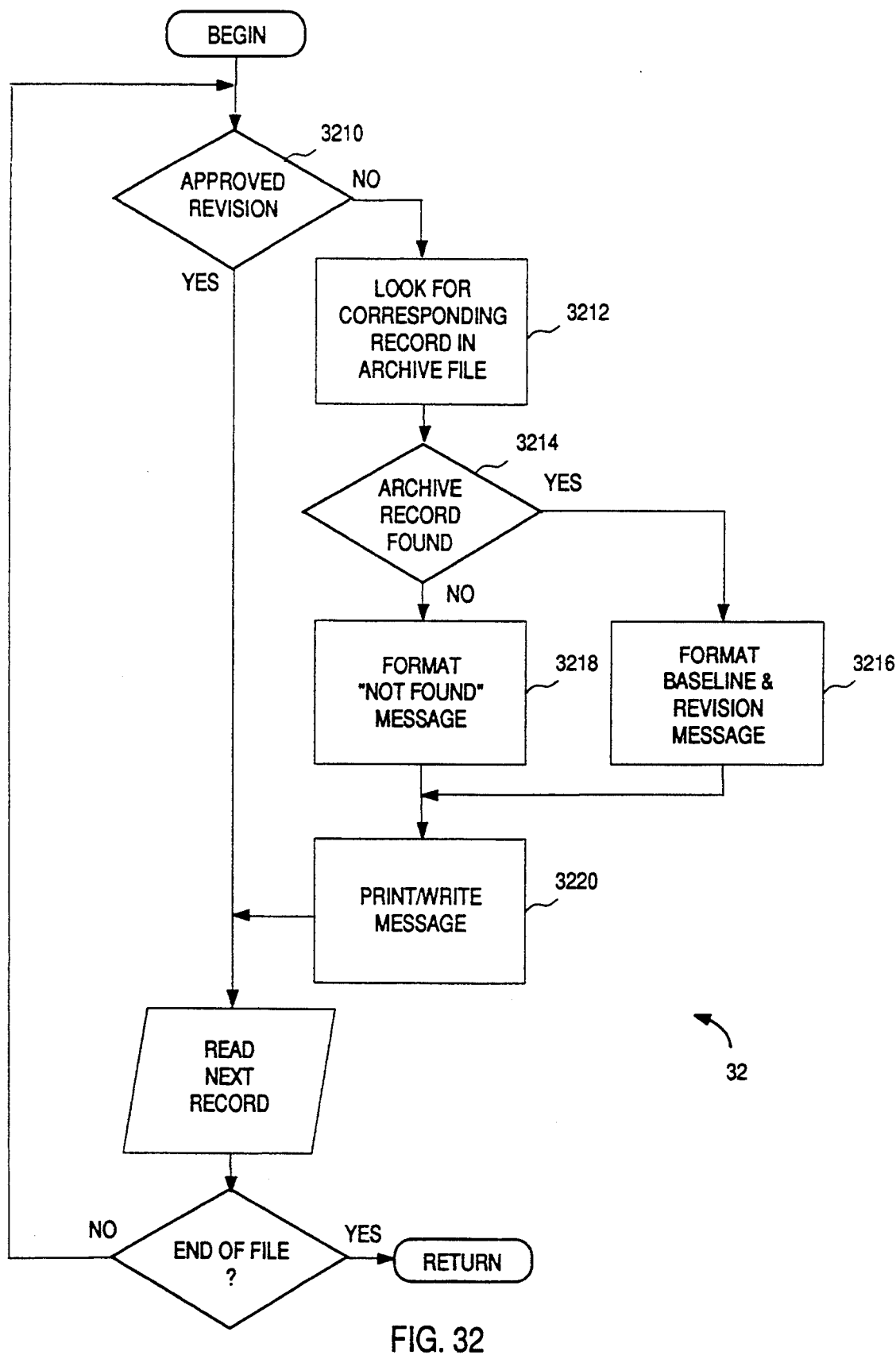

In response to a potential user selection from module 29, program control is routed to module 32 so that a "rejected changes report" can be produced. FIG. 32 shows a flow chart for module 32. Upon entering module 32, the first record in NST file 512 is read, and the indicator which was set in task 3024, discussed above, is evaluated in a query task 3210 to determine whether the current record 510 has been approved. If task 3210 detects an approved revision, module 32 ignores the current record 510 and loops to examine the next record 510 in NST file 512. When a changed but unapproved record is encountered, a task 3212 looks for a corresponding record in the baseline archive file by matching WBS_IDs between the two files. A query task 3214 evaluates whether or not the corresponding archive record is found. If a corresponding archive record is found, a task 3216 formats the baseline and revision data for printing at printer 234. If a corresponding archive record is not found, a task 3218 prepares a "record not found" message for printing at printer 234. After tasks 3216 or 3218, a task 3220 prints the message at printer 234, or otherwise writes the message to a convenient storage location. Module 32 loops through tasks 3210-3220 until all records in NST file 512 have been evaluated. When all records 510 in NST file 512 have been processed, module 32 returns to module 29.

Figure 33:
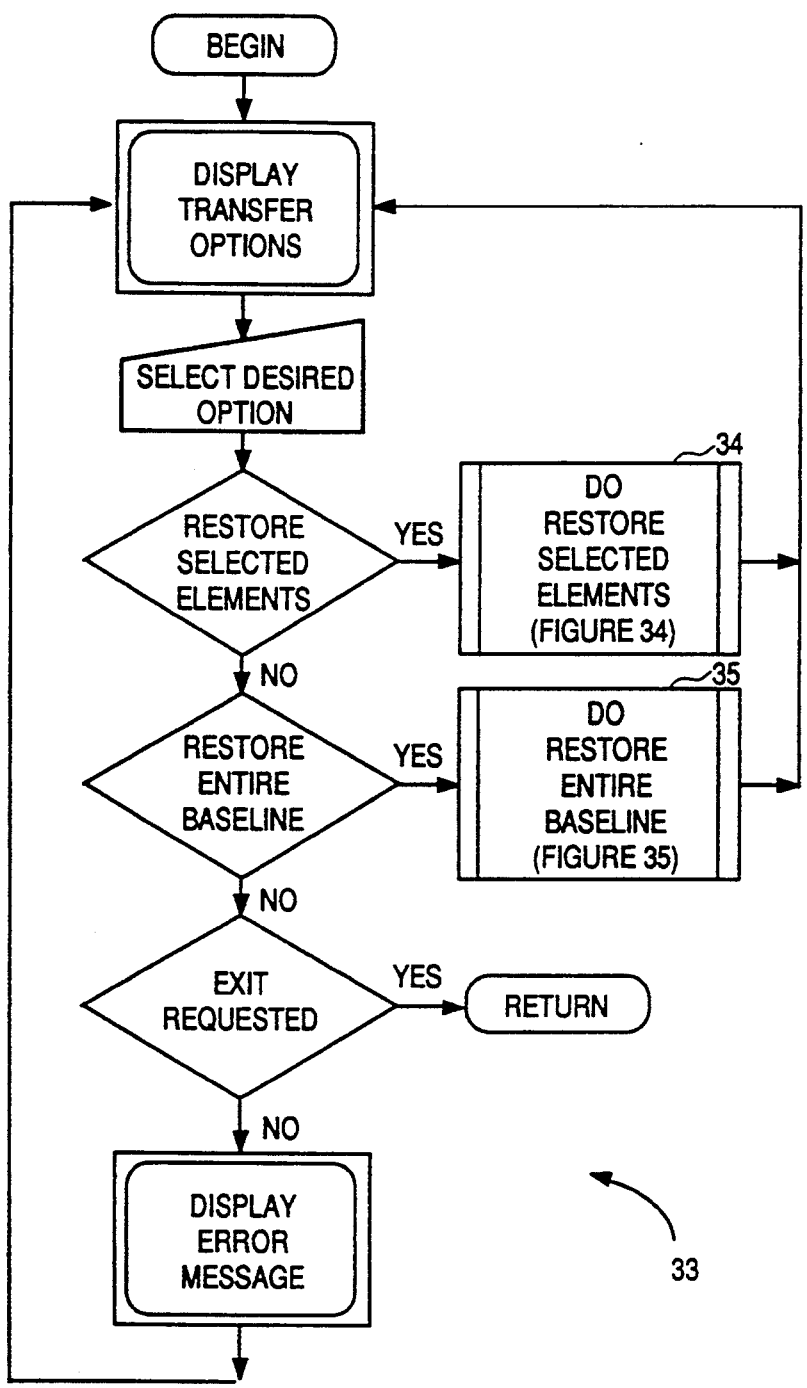

One of the potential selections presented through the menu of module 28 relates to restoring previously archived baseline data to NST 140. When the user chooses this selection in module 28, program control transfers to module 33, a flow chart of which is shown in FIG. 33. Module 33 runs another menu. The module 33 menu is a single selection menu that requires the user to choose between restoring selected work unit elements back to NST 140 and restoring the entire baseline archive file back to NST 140. In response to user selections, module 33 routes program control to modules 34 or 35.

Figure 34:
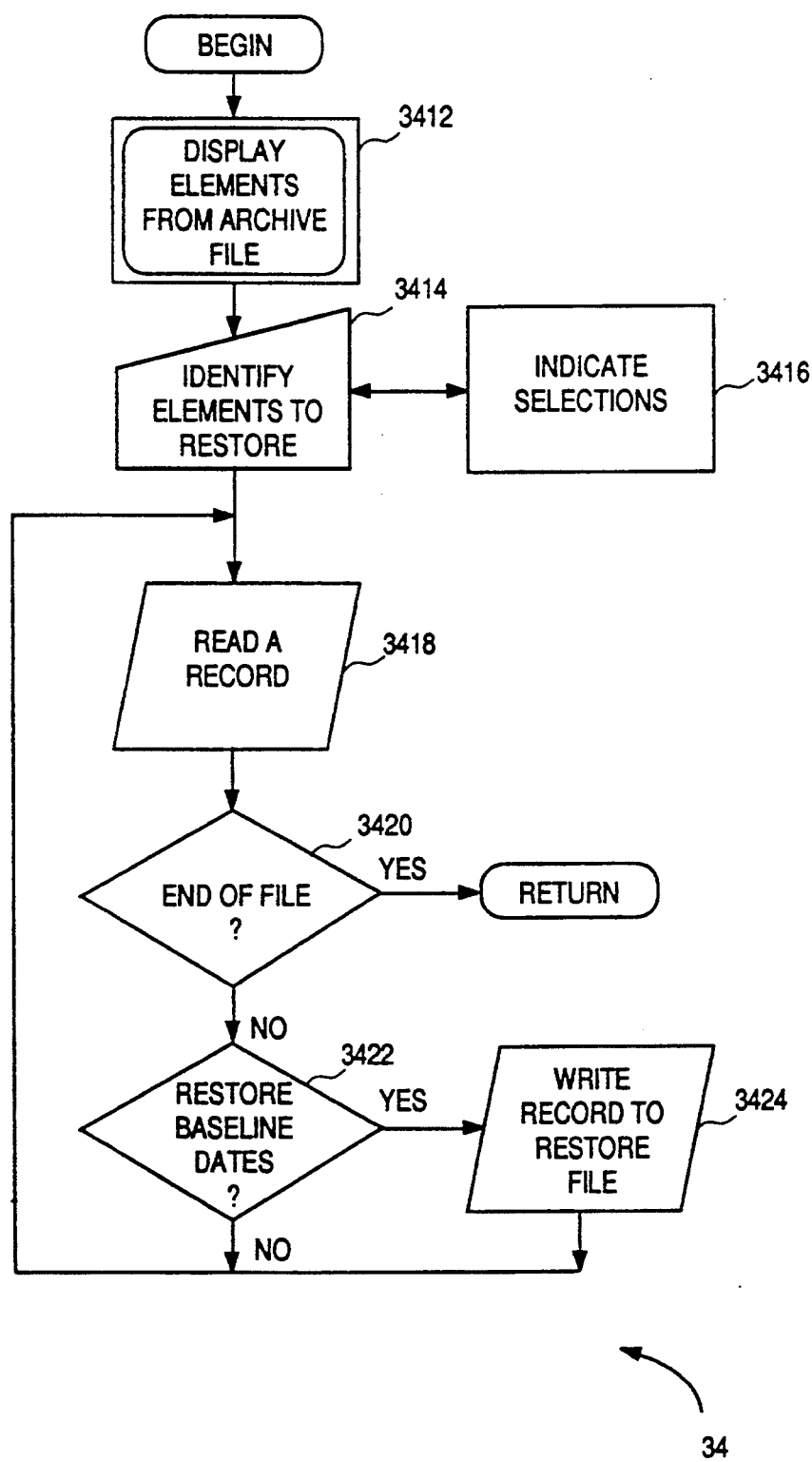

FIG. 34 shows a flow chart for module 34. Bridge 160 performs module 34 so that the user may select various elements from the baseline archive file for restoration back to NST 140. In other words, module 34 allows the user to select particular records stored in the baseline archive file and then places the selected records in a restoration file which is suitable for importation into NST 140. The user may wish to use the "rejected changes report," discussed above in connection with module 32, as a guide in identifying records to restore to NST 140. Thus, in normal use the rejected changes correspond to the records which need restoration within NST 140.

Upon beginning module 34, a task 3412 displays the records included in the baseline archive file at video display terminal 230. Of course, the baseline archive file may include more records than will fit on a single screen of terminal 230. Nevertheless, the user may operate an input device, such as keyboard 232, to scroll the display so that all records can be viewed. Task 3412 displays the WBS_ID, Description, WBST, original planned start date (PS) and original planned finish date (PF) for each record. A task 3414 allows the user to select various ones of these records, and a task 3416 indicates the selection state. This selection state is indicated both at video display terminal 230 and in the records of the baseline archive file. When the user has set the selection state of all records in the baseline archive file as desired, tasks 3418-3424 loop to examine, in query task 3422, all records in the baseline archive file. For those records whose selection state, discussed above, indicates that they are to be restored to NST 140, module 34 copies the record to an NST restoration file in task 3424. The NST restoration file is stored in secondary storage 228 and later transferred to computer 120. When the end of the baseline archive file is encountered at query task 3420, program control returns to module 33.

A user of NST 140 may then operate NST 140 in a conventional fashion to import this revision file therein. An activity identification code (see task 1914 of module 19) has been included with each record to link the revision records into the NST's data structure.

In the preferred embodiment of the present invention, a user of NST 140 makes two copies of the initial NST baseline file. One copy will be used for tracking project progress through statusing in NST 140 and the other will retain the original plan. NST 140 is utilized so that new baselines are "snapped" to a current status using only the statused one of the two baseline files. Snapshots are not taken in the original plan baseline file. The original plan baseline file is used for processing by bridge 160. The restoration file created by module 34 is then updated into both the statused and original plan baseline files within NST 140.

Figure 35:
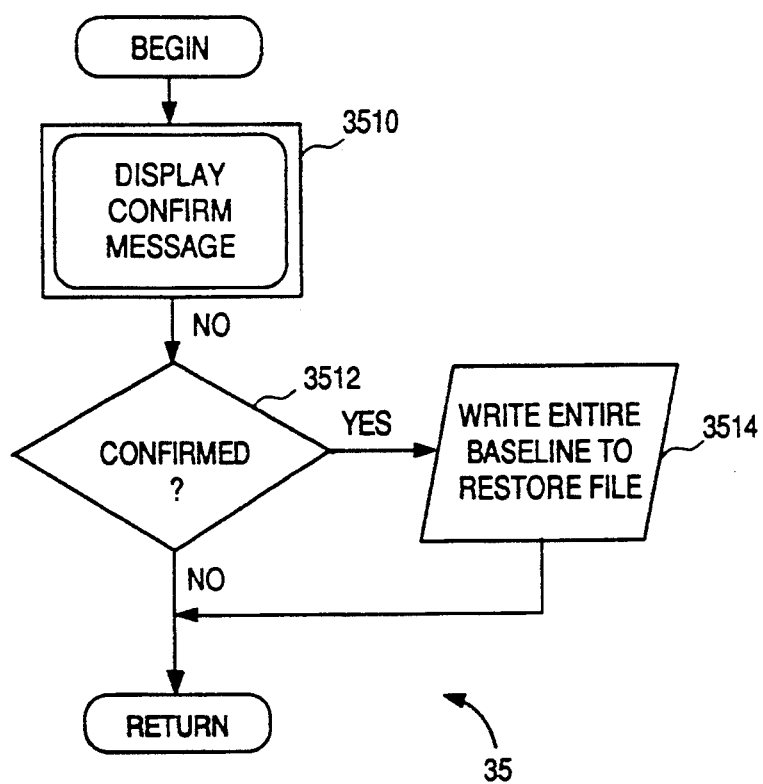

FIG. 35 shows a flow chart for module 35. Bridge 160 performs module 35 so that an entire baseline archive file may be restored to NST 140. This action may be needed if the data structure of NST 140 becomes lost or seriously corrupted. Module 35 is entered from module 33. Upon entry to module 35, a task 3510 requires the user to confirm the selection to restore the entire baseline before proceeding. A query task 3512 tests the results of the user's confirmation. If confirmed, a task 3514 copies the entire baseline archive file to an NST restoration file. The data written to the NST restoration file are the same data that were discussed above in connection with task 1914 of module 19. After the entire baseline archive file has been written to the NST restoration file, program control returns to module 33. The NST restoration file may then be transferred to computer 120 and imported into NST 140 to restore the baseline configuration for NST 140.

Figure 36:
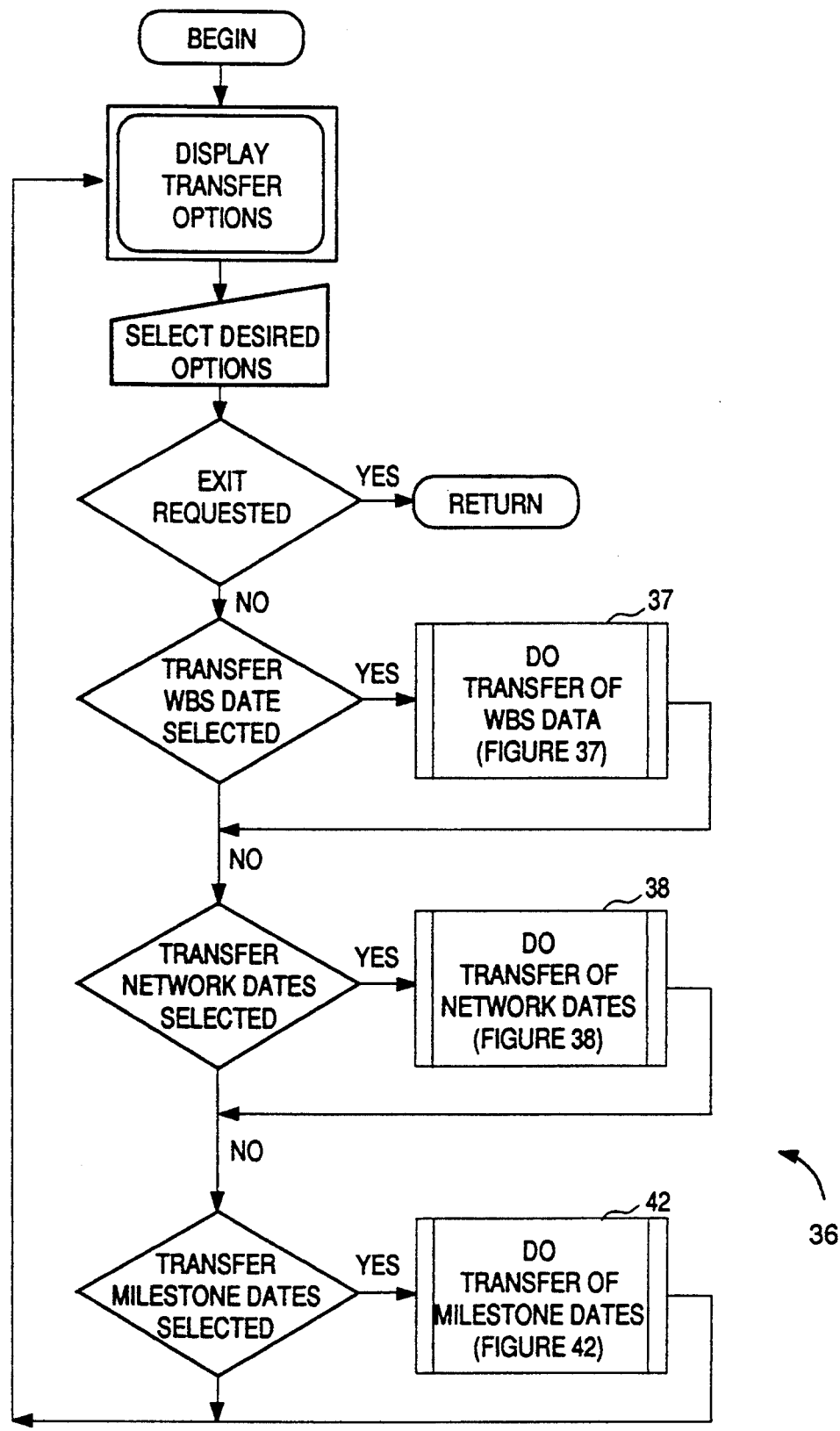

Another of the potential selections presented through the menu of module 28 relates to transferring changes in the baseline configuration to PST 150. When the user chooses this selection in module 28, program control transfers to module 36, a flow chart of which is shown in FIG. 36. Module 36 runs another menu. The module 36 menu is much like the module 11 menu discussed above. Selections related to preparing transfer files for three types of data: description data, schedule or timing data, and milestone data, are permitted. Module 36 operates a multiple selection menu. Thus, the user is allowed to choose one or more of these selections prior to processing the selections. In response to user selections, module 36 routes program control to modules 37, 38, and 42.

Figure 37:
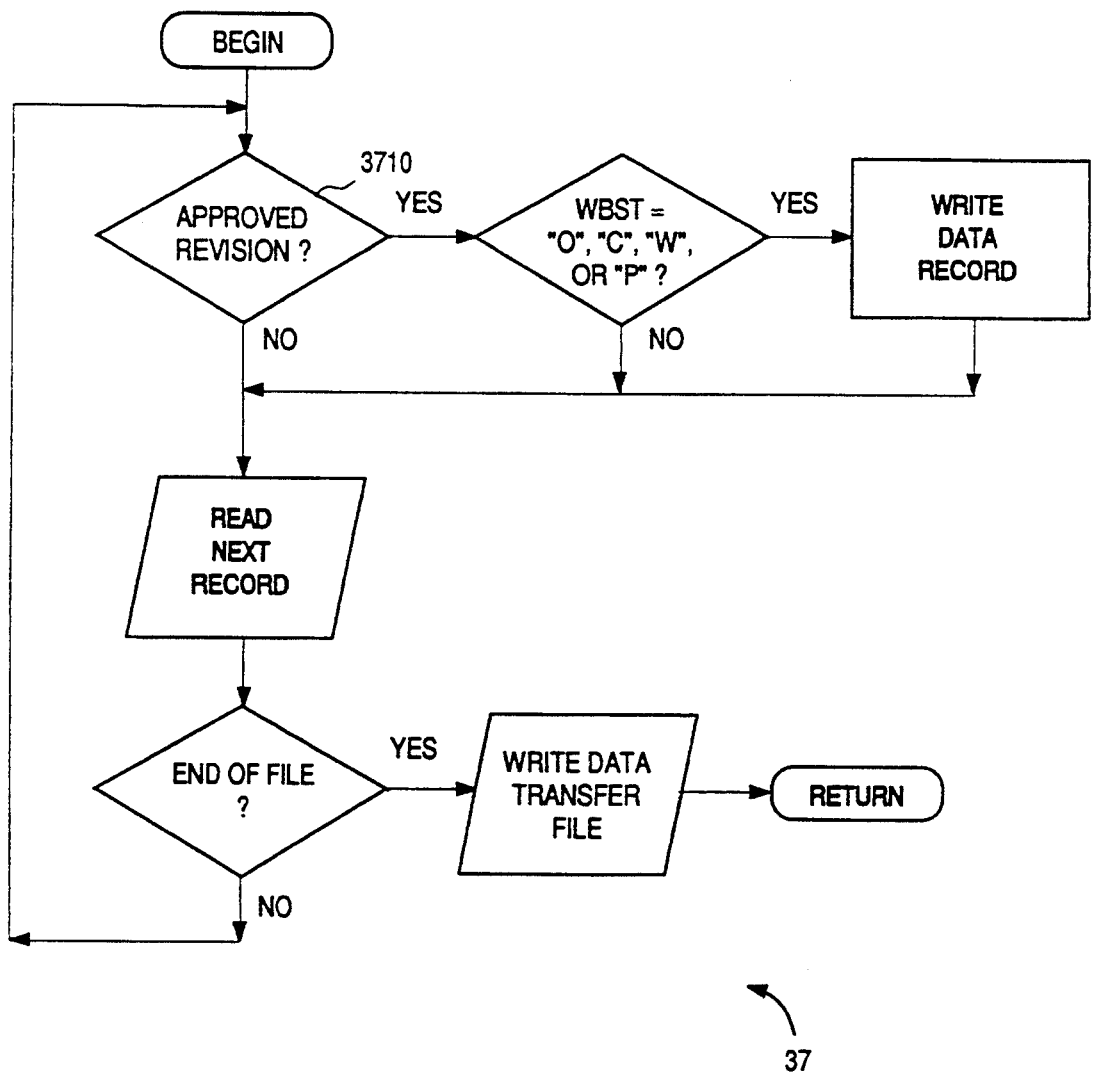

FIG. 37 shows a flow chart for module 37. Module 37 is entered from module 36 when the user chooses to create a file for transferring descriptive data to PMT 150. Module 37 operates substantially the same process using substantially the same data as discussed above in connection with module 12, with one exception. Module 37 does not include data associated with work unit records 510 in a revision baseline file unless the records 510 are indicated as being approved. The approval indications are formed in tasks 3022-3024 in module 30, and the approval indications are tested in a query task 3710 of module 37. Accordingly, module 30 must have been performed before any baseline revisions are allowed by module 37. Upon the completion of module 37, a baseline revision file of descriptive data has been created and stored in secondary storage 228 to record approved changes in the baseline configuration. This revision file includes one record for each approved change, and each record includes the data listed above in connection with task 1212 of module 12. Program control returns to module 36. The user may transfer this revision baseline file to PMT 150 for importation therein.

Figure 38:
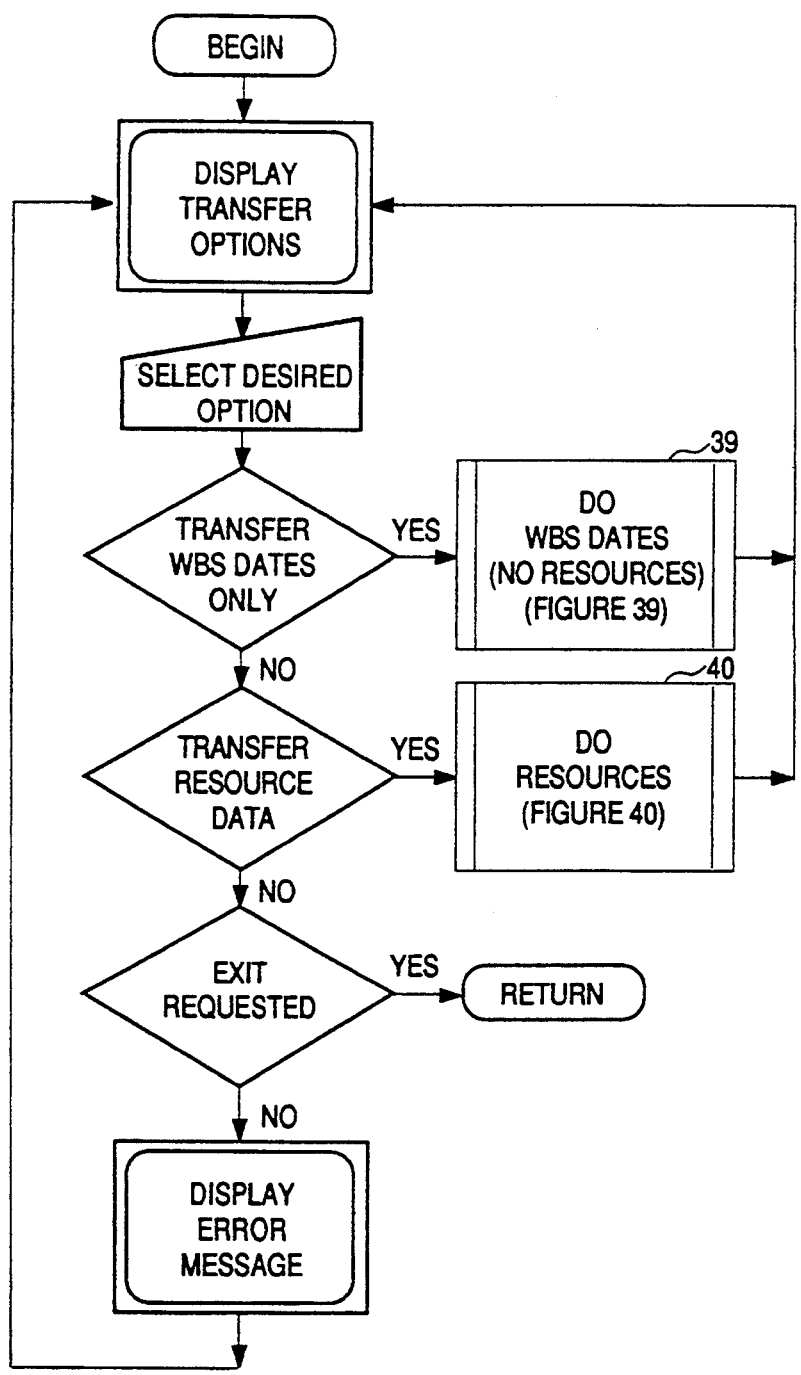

FIG. 38 shows a flow chart for module 38. Module 38 is entered from module 36 when the user chooses to create a baseline revision file for transferring schedule or timing data to PMT 150. Module 38 presents the user with a menu from which the user may select any one of two potential types of timing data. Module 38 routes program control to module 39 when the user selects to transfer timing data related to scheduling and to module 40 when the user selects to transfer timing data related to resource management.

Figure 39:
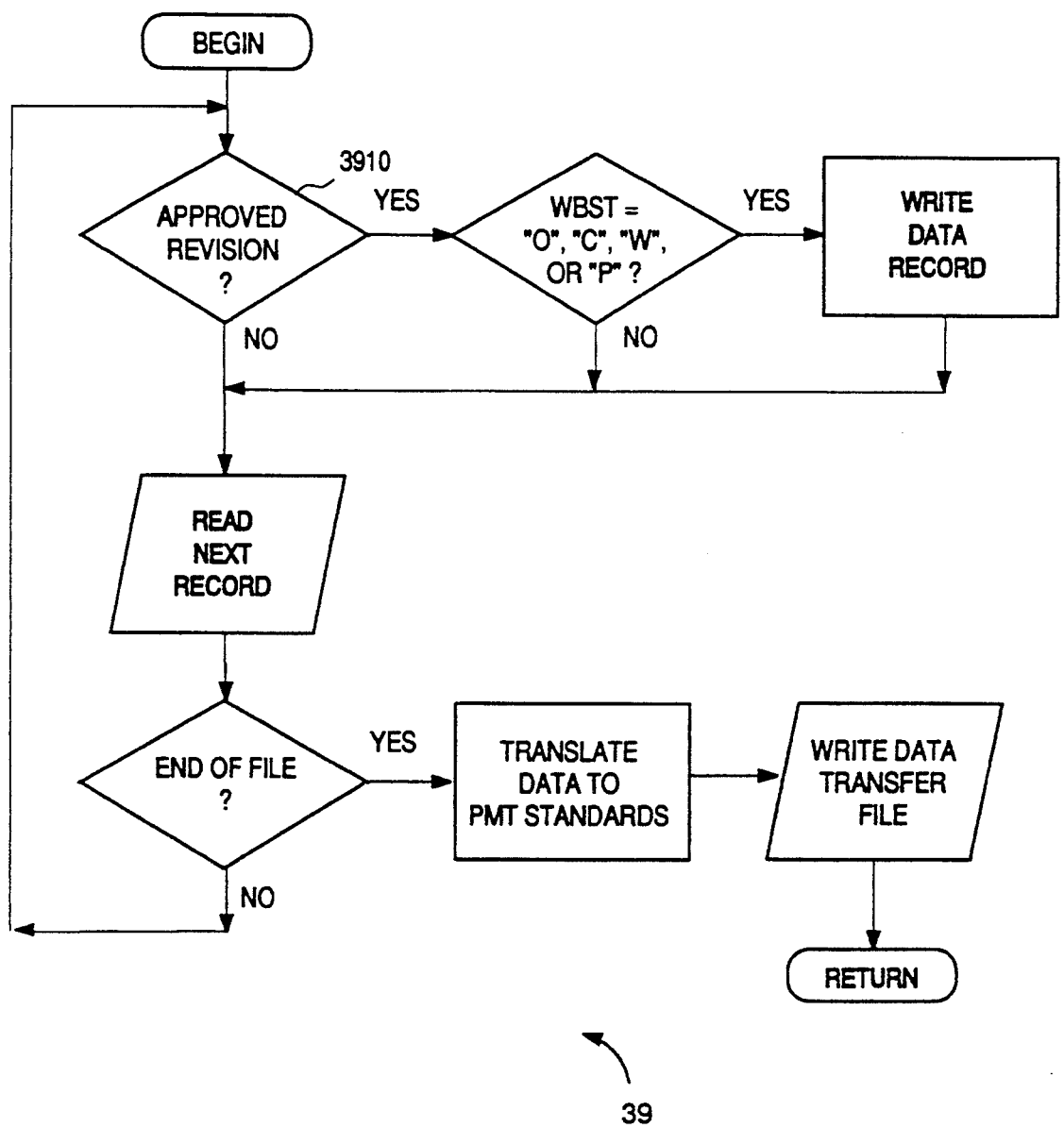

FIG. 39 shows a flow chart for module 39. Module 39 is entered from module 38 when the user chooses to create a baseline revision file for transferring schedule-related timing data to PMT 150. Module 39 operates substantially the same process using substantially the same data as discussed above in connection with module 14, with the above-discussed "approval" exception. Module 39 does not include data associated with work unit records 510 in a revision baseline file unless the records 510 are indicated as being approved. The approval indications are formed in tasks 3022–3024 in module 30, and the approval indications are tested in a query task 3910 of module 39. Accordingly, module 30 must have been performed before any baseline revisions are allowed by module 39. Upon the completion of module 39, a baseline revision file of schedule-related timing data has been created and stored in secondary storage 228 to record approved changes in the baseline configuration. This revision file includes one record for each approved change, and each record includes the data listed above in connection with task 1414 of module 14. Program control returns to module 38. The user may transfer this revision baseline file to PMT 150 for importation therein.

Figure 40A:
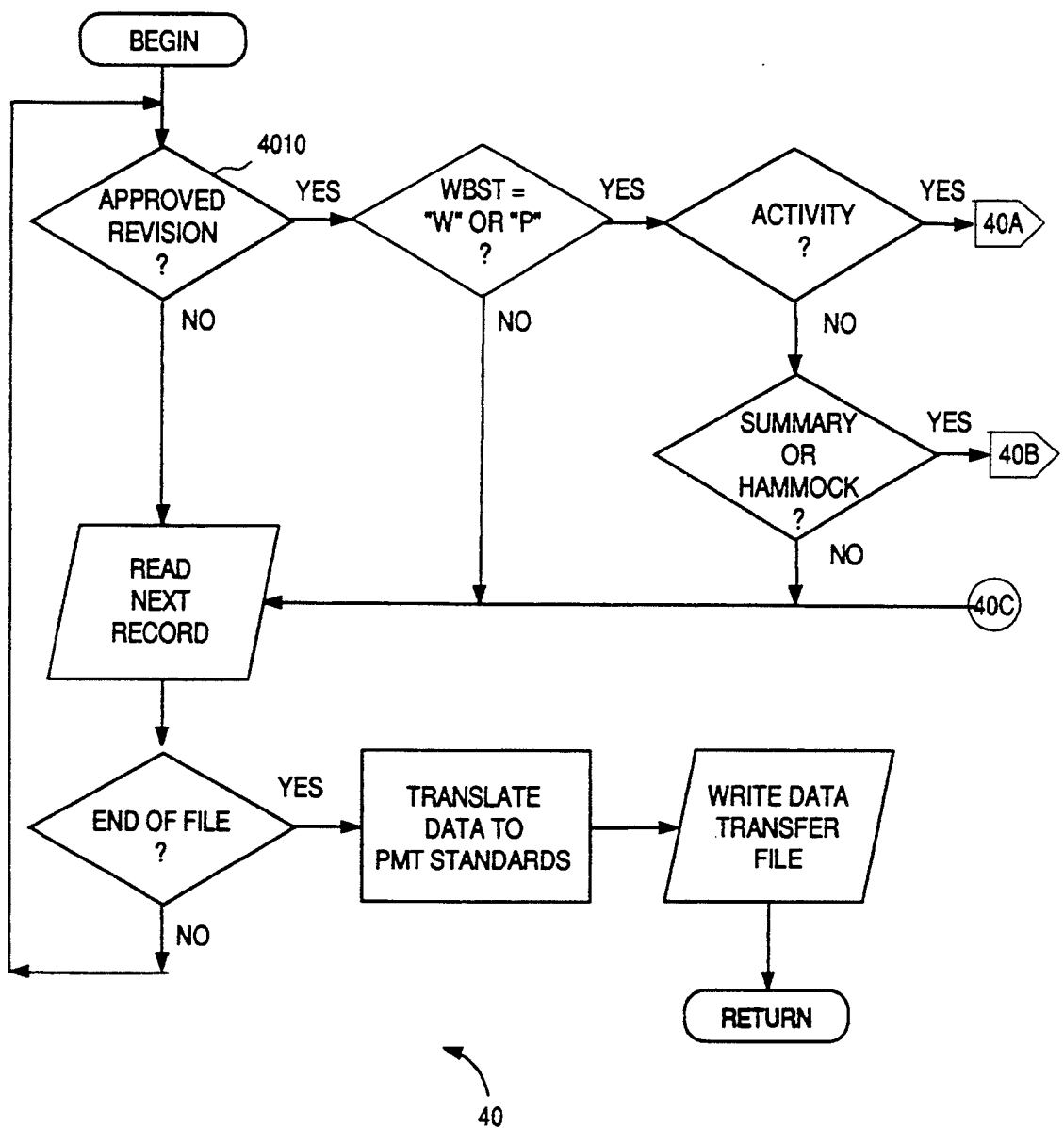
Figure 40B:
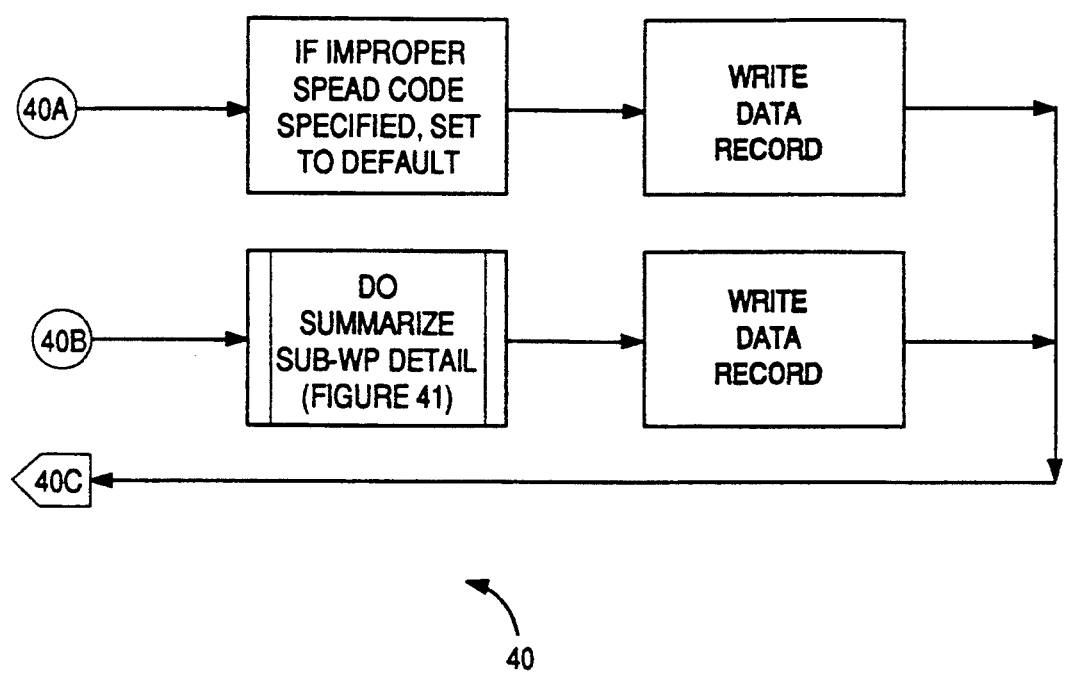
Figure 41:
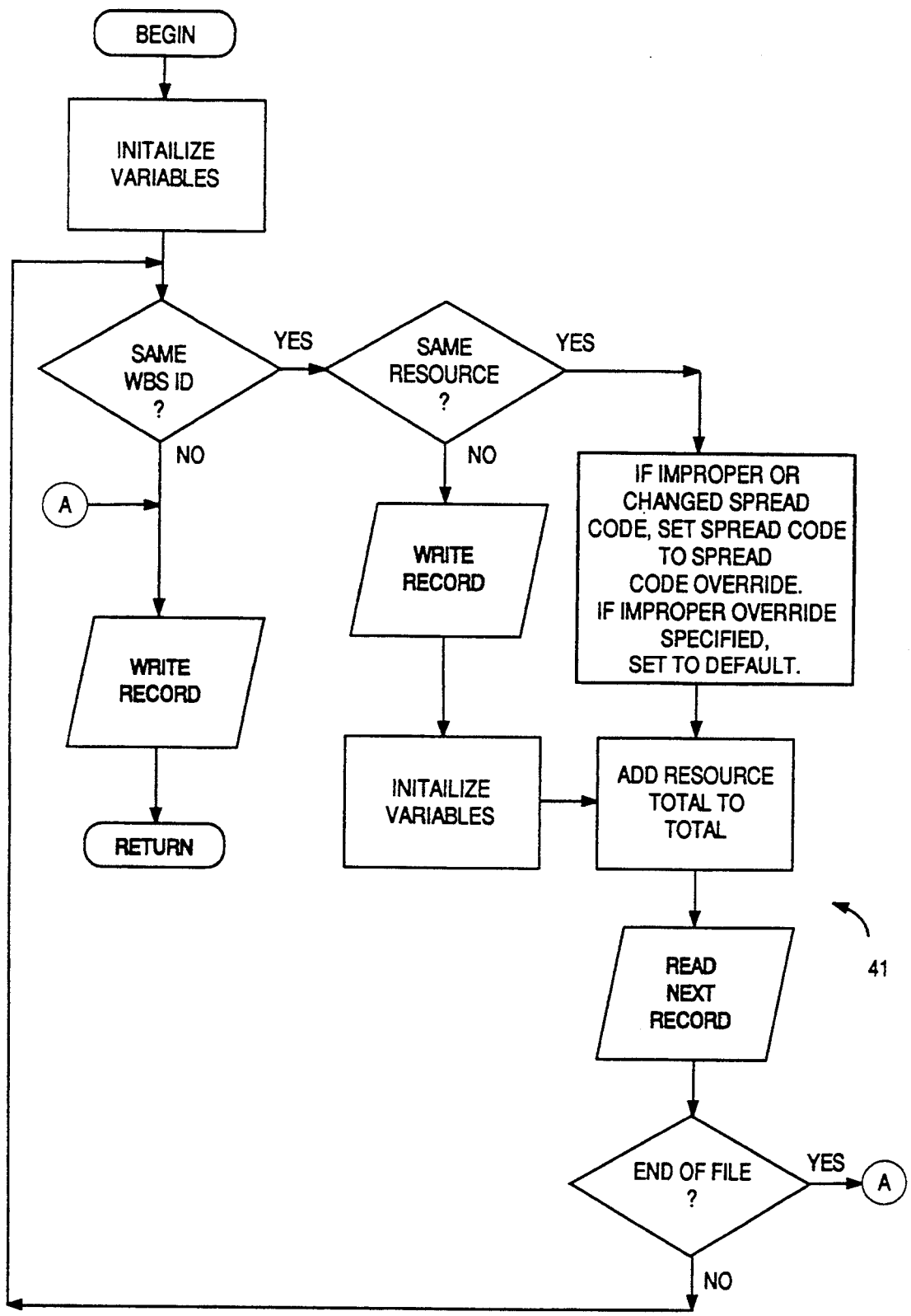

FIGS. 40 and 41 show flow charts for modules 40 and 41. Module 40 is entered from module 38 when the user chooses to create a baseline revision file for transferring resource management-related timing data to PMT 150. Module 40 operates substantially the same process using substantially the same data as discussed above in connection with module 15, and module 40 calls module 41 under substantially the same conditions as module 15 calls module 16. However, modules 40–41 include the above-discussed "approval" exception. Modules 40–41 do not include data associated with work unit records 510 in a revision baseline file unless the records 510 are indicated as being approved. The approval indications are formed in tasks 3022–3024 in module 30, and the approval indications are tested in a query task 4010 of module 40. Accordingly, module 30 must have been performed before any baseline revisions are allowed by modules 40–41. Upon the completion of modules 40–41, a baseline revision file of resource management-related timing data has been created and stored in secondary storage 228 to record approved changes in the baseline configuration. This revision file includes one record for each approved change, and each record includes the data listed above in connection with task 1516 of module 15. "Resource spread code" and "resource planned" parameters are set under the conditions discussed above in connection with modules 15–16. Program control returns to module 38. Later, the user may transfer this revision baseline file to PMT 150 for importation therein.

Figure 42A:
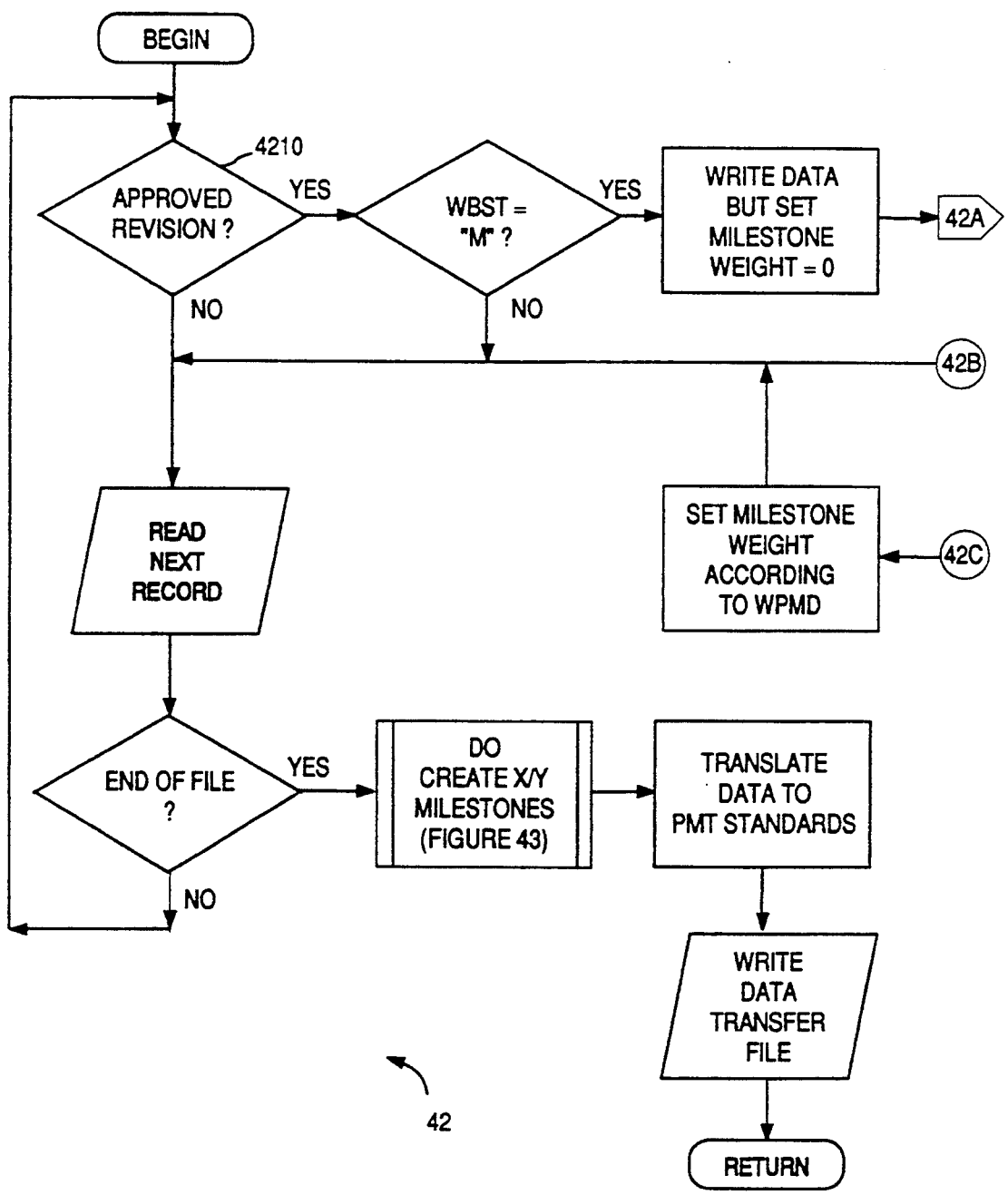
Figure 42B:
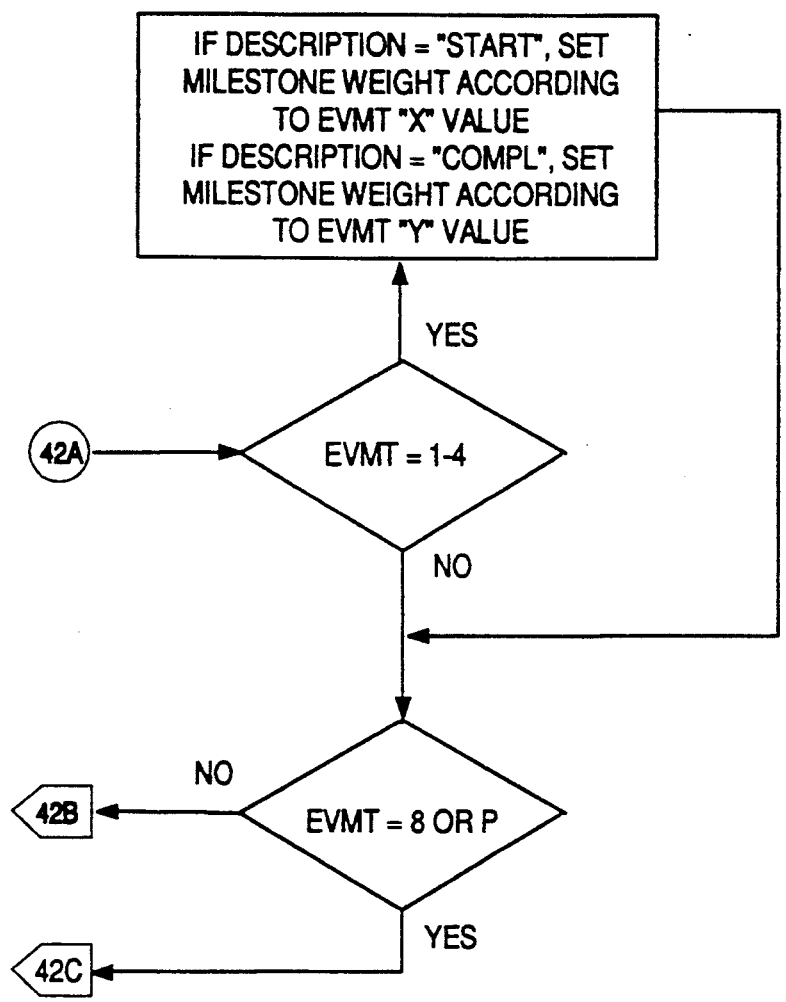
Figure 43A:
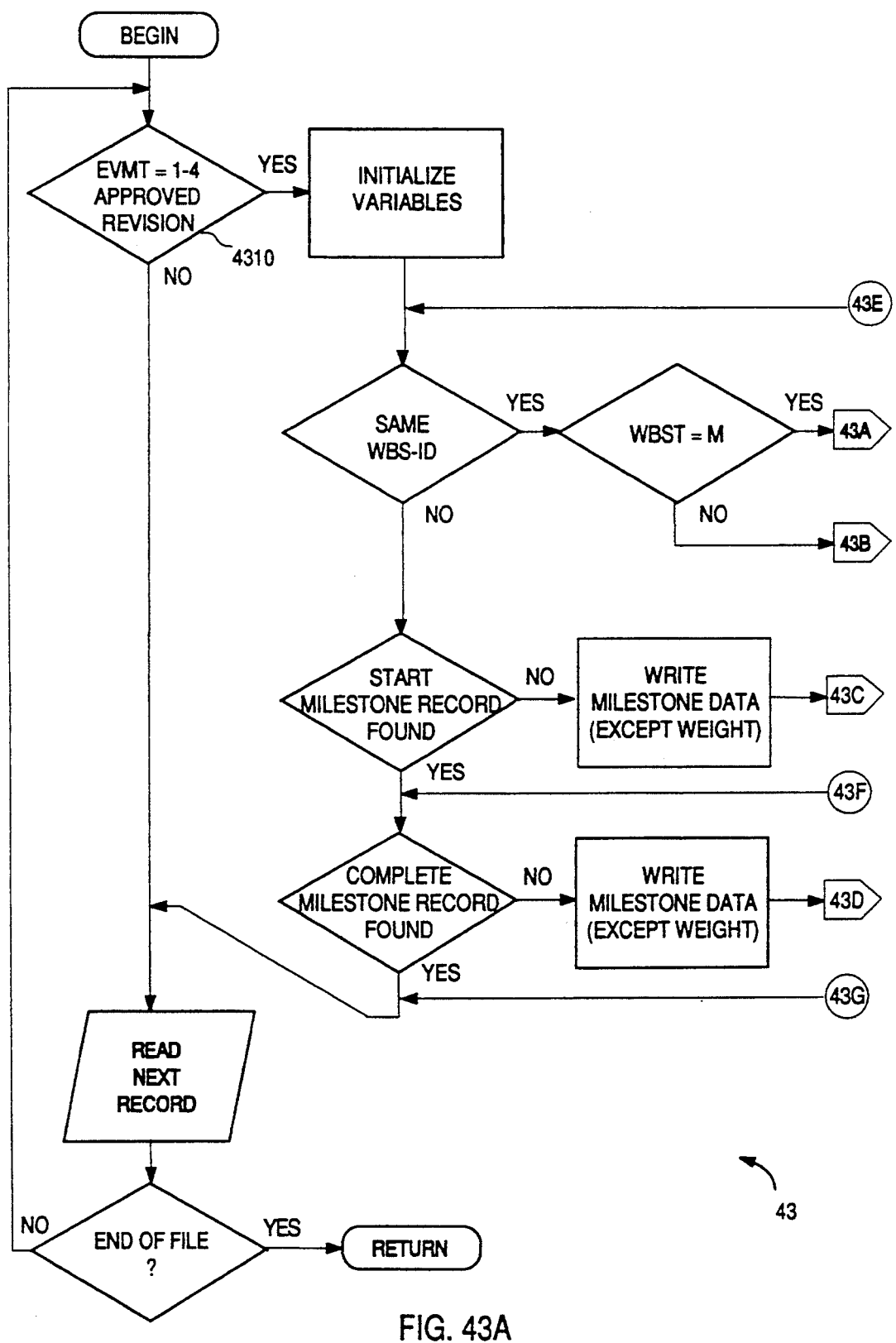
Figure 43B:
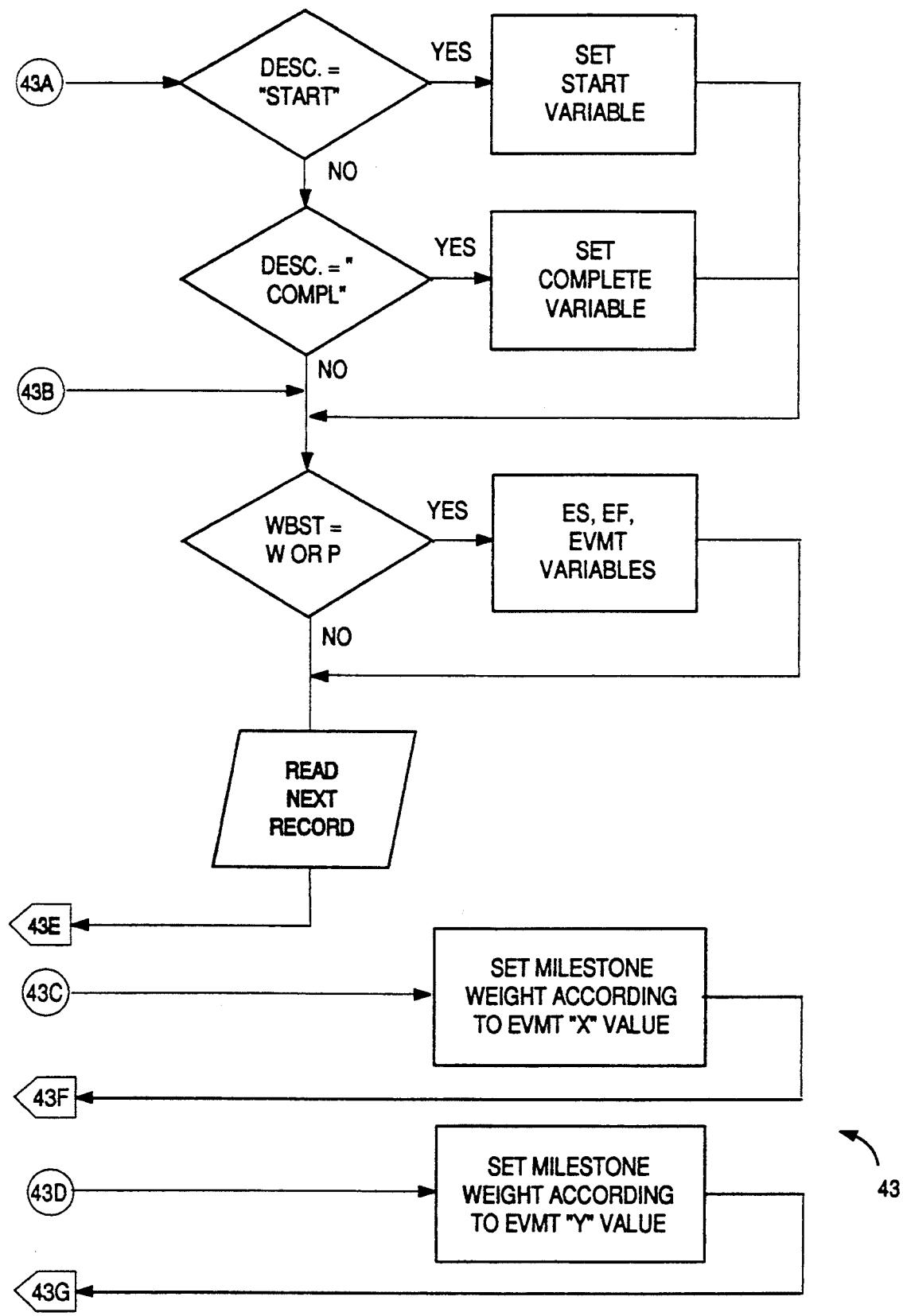

When module 36 recognizes a selection for transferring milestone-related baseline revision data, program control proceeds to module 42, a flow chart for which is presented in FIG. 42. Module 42 calls module 43, a flow chart for which is presented in FIG. 43. Module 42 operates substantially the same process using substantially the same data as discussed above in connection with module 17, and module 42 calls module 43 under substantially the same conditions as module 17 calls module 18. However, modules 42–43 include the above-discussed "approval" exception. Modules 42–43 do not include data associated with work unit records 510 in a revision baseline file created by modules 42–43 unless the records 510 are indicated as being approved. The approval indications are formed in tasks 3022–3024 in module 30, and the approval indications are tested in a query task 4210 of module 42 and a query task 4310 of module 43. Accordingly, module 30 must have been performed before any baseline revisions are allowed by modules 42–43. Upon the completion of modules 42–43, a baseline revision file of milestone-related data has been created and stored in secondary storage 228 to record approved changes in the baseline configuration. This revision file includes one record for each approved change, and each record includes the data listed above in connection with task 1712 of module 17. The milestone weight parameter is set under the conditions discussed above in connection with modules 17–18. Program control returns to module 36. The user may then transfer this revision baseline file to PMT 150 for importation therein.

In summary, the present invention provides an improved project management system. The project management system utilizes a conventional network scheduling tool (NST) and a conventional performance measurement tool (PMT) and automatically maintains alignment between the data operated upon by the two tools. Substantially all data needed for the NST and PMT are manually entered into only the NST. Thus, tasks of transcribing data to the diverse tools are not duplicated, and transcribing errors are reduced. The present invention utilizes a bridge to process data collected by the NST before it may be used by the PMT. Among other processes, the bridge automatically creates milestone records, automatically summarizes certain NST work unit records, and automatically computes values for percentage complete and status parameters. In addition, the bridge imposes a data security procedure on the project management system. The data security procedure requires all baseline changes to be reviewed and approved before they may be passed from the NST to the PMT.

The present invention has been described above with reference to a preferred embodiment. However, those skilled in the art will recognize that changes and modifications may be made in this preferred embodiment without departing from the scope of the present invention. For example, the bridge described herein is configured for a particular conventional NST and a particular conventional PMT utilizing a particular programming language. Those skilled in the art will understand that the teaching of the present invention may be applied to alternate NSTs, alternate PMTs, and alternate programming languages. In addition, the specific programming structure described herein may be substantially altered while still accomplishing the same processes that are disclosed herein. These and other changes and modifications which are obvious to those skilled in the art are intended to be included within the scope of the present invention.

What is claimed is:

1. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project wherein:

said collecting step comprises the steps of:

associating said second portion of said NSD and said customized data into work unit data records with respect to said NST, said work unit data records being of the type to specify an activity work unit which includes a beginning of an activity at a particular point in time and specifies a duration which said activity is to continue;

configuring a first portion of said customized data in said work unit data records to specify a work breakdown structure type (WBST) for said PMT, said WBST defining a type of work breakdown structure (WBS) element including a work package, cost account or planning element, said WBST specifying a work package WBST when said first portion of said customized data includes scheduled start and completion dates and a budget for said activity; and configuring a second portion of said customized data in said work unit data records to specify an earned value method type (EVMT) for said PMT, said EVMT specifying a method to calculate a budgeted cost of work performed (BCWP) for said work package and said EVMT being of the type to specify an X/Y EVMT when said X/Y EVMT includes an "X" percentage of a budget for said work package earned upon starting said work package and a "Y" percentage of said budget earned upon completion of said work package; and said generating step comprises the steps of:

detecting activity work unit records that are characterized as having said work package WBST and said X/Y EVMT, and forming a PMT data record which includes start and complete milestone data elements therein for work unit data records having said work package WBST with said X/Y EVMT.

2. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project, wherein:

said collecting step comprises the steps of:

associating by said NST said second portion of said NSD and said customized data into work unit data records with respect to said NST, said work unit data records being of the type to specify an activity work unit when said work unit data records include a beginning of an activity at a particular point in time and include a particular duration which said activity continues;

configuring a first portion of said customized data in said work unit data records to identify a work breakdown structure element with which said work unit data records are to be associated; and configuring a second portion of said customized data in said work unit data records to specify a work breakdown structure type (WBST) for said PMT, said WBST being of the type to specify one of a milestone or a work package WBST so that an activity work unit in said NST may correspond to either of a milestone or a work package in said PMT.

3. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project, wherein:

said collecting step comprises the steps of:

associating said second portion of said NSD and said customized data into work unit data records with respect to said NST;

configuring a first portion of said customized data in said work unit data records to specify a work breakdown structure type (WBST) for said PMT, said WBST specifying one of a milestone WBST, and configuring a second portion of said customized data in said work unit data records to specify an earned value method type (EVMT) for said PMT, said EVMT specifying that arbitrary milestone weights are to be used in computing earned value and said EVMT specifying that one of a plurality of predetermined X/Y computation algorithms is to be used in computing earned value; and said generating step comprises the steps of:

forming a milestone record for said PMT when a work unit record is described as a milestone WBST, said milestone record having a milestone weight data element, said milestone weight data element being determined in response to said second portion of said customized data; and writing said milestone weight data element to a temporary file.

4. A method as claimed in Claim 3 wherein, when said milestone WBST work unit record identifies one of said predetermined X/Y computation algorithms, said generating step assigns a value to said milestone weight data element in accordance with said predetermined algorithm.

5. A method as claimed in Claim 3 wherein:

said collecting step additionally comprises the step of configuring a third portion of said customized data in said work unit data records to specify an arbitrary milestone weight value; and when said milestone WBST work unit record identifies said arbitrary milestone weight EVMT, said generating step assigns said third portion of said customized data to said milestone weight data element.

6. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project, wherein:

said collecting step comprises the steps of:

associating said second portion of said NSD and said customized data into work unit data records with respect to said NST, configuring a portion of said second portion of said NSD in said work unit data records to describe a completed percentage of said NST work unit, configuring a first portion of said customized data in said work unit data records to specify an earned value method type (EVMT) for said PMT, said EVMT specifying a percent complete EVMT, and configuring a second portion of said customized data in said work unit data records to specify a type of percentage to use in performing earned value calculations, said type of percentage indicating a work-accomplished type and said type of percentage indicating a time-line type; and said generating step comprises the step of forming a status data record for said PMT, said status record having a percent complete data element when one of said work unit data records indicates said percent complete EVMT, said percent complete data element containing said second portion of said NSD if said second portion of said customized data does not specify that said type of percentage is a work-accomplished type.

7. A method as claimed in Claim 6 wherein:

said collecting step additionally comprises the step of configuring a third portion of said customized data in said work unit data records to specify a completed percentage to be associated with said work unit in said PMT; and said generating step additionally comprises the step of writing said third portion of said customized data to said percent complete data element of said status record if said work unit data record specifies that said type of percentage is a work-accomplished type.

8. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project, wherein:

said collecting step comprises the steps of:
associating said second portion of said NSD and said customized data into work unit data records with respect to said NST,
configuring a first portion of said customized data in said work unit data records to specify an earned value method type (EVMT) for said PMT, said EVMT specifying a budgeted cost of work performed (BCWP) EVMT, and
configuring a second portion of said customized data in said work unit data records to specify a BCWP amount for said PMT; and
said generating step comprises the step of forming status data records for said PMT that include said BCWP amount in response to work unit data records that indicate said BCWP EVMT.

9. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project, wherein:

said collecting step comprises the steps of:
associating said second portion of said NSD and said customized data into work unit data records with respect to said NST, said work unit data records being configured to identify summarized work units and non-summarized work units,
configuring a first portion of said customized data in said work unit data records to specify a first spread code for said PMT to use in allocating resources, and
configuring a second portion of said customized data in said work unit data records to specify a second spread code for said PMT to use in allocating resources; and
said generating step comprises the step of forming data records for said PMT that include a spread code data element, said spread code data element being configured to correspond to said first spread code in response to work unit data records indicated as being non-summarized work units.

10. A method as claimed in Claim 9 wherein said generating step additionally comprises the steps of:
recording said first spread code in response to a work unit data record indicated as being a summarized work unit;
combining, in a single PMT record, said work unit records which are indicated as being summarized by said summarized work unit record; and
including, in said spread code data element of said combined PMT record, said second spread code if any of said summarized work unit records indicate a spread code that differs from said recorded spread code.

11. A method executed by a computer system as part of a computer program, said system for coordinating the management of a project, said method using a network scheduling tool (NST) that collects, stores, and processes network schedule data (NSD) and a performance measurement tool (PMT) that collects, stores, and manipulates performance measurement data (PMD), said method maintaining alignment of information between said NST and said PMT, said method comprising the steps of:

collecting a first and second portion of said NSD and customized data by said NST, said first portion of said NSD including information required only by said NST, said second portion of said NSD including information required by both said NST and said PMT, said customized data comprising a portion of said PMD required only by said PMT, said collecting step performed by said NST operating on a computer that is part of said computer system;

first transferring by a data transfer means said second portion of said NSD and said customized data from said NST to a bridging tool operating on said computer;

generating said PMD by processing, in said bridging tool, said second portion of said NSD and said customized data, said PMD generated in a form aligned for use by said PMT and including said customized data;

storing said PMD in a storage means located in said computer system, said storing step performed by said bridging tool operating on said computer; and second transferring by said bridging tool said PMD to said PMT for allocating budgets and reporting costs of said specific project, and wherein said method further comprises the steps of: before said collecting step, the step of periodically updating said NSD and said customized data wherein said first transferring step is repeated in response to said updating step, and said generating step comprises the steps of:

constructing a baseline configuration for said second portion of said NSD and said PMD in response to a first iteration of said first transferring step; and revising said baseline configuration to form a revised baseline configuration when start or complete dates for said project contained in said second portion of said NSD have diverged from said baseline configuration, said revising step performed in response to a second iteration of said first transferring step.

12. A method as claimed in Claim 11 wherein said revising step comprises the steps of:
comparing said revised baseline configuration with said baseline configuration; and
indicating when said revised baseline configuration varies from said baseline configuration.

13. A method as claimed in Claim 12 additionally comprising, after said indicating step, the step of accepting user input to distinguish an accepted portion of said revised baseline configuration from a rejected portion of said revised baseline configuration.

14. A method as claimed in Claim 13 additionally comprising the step of transferring said rejected portion of said revised baseline configuration to said NST.

15. A computer system for coordinating the management of a project undertaken by an organization and for maintaining alignment of scheduling and performance measurement data, said computer system comprising:

a computer for operating a network scheduling tool (NST) that collects, stores, and processes network schedule data (NSD) and that collects customized data, said NSD describing features of an organization and scheduling and resource management requirements of said project, said customized data describing cost information for said project and including information required only by a performance measurement tool (PMT), said NST generating data which coordinates scheduling for said project;

a first data storage means coupled to said first computer for storing database which includes said NSD and said customized data for said project;

a bridging tool operating on said computer for generating performance measurement data (PMD) by using said NSD and said customized data, said PMD generated in a form compatible with and aligned for use by said PMT and including said customized data;

a second data storage means coupled to said computer for storing said second PMD; and a data transfer means for transferring said PMD to a data transfer file for use by said PMT, said PMT responsive to said PMD received from said bridging tool, said PMT being configured to collect, store, and manipulate said PMD, said PMT generating data which coordinate performance measurement for said project, wherein:
said first data storage means is configured by said computer for associating by said bridging tool, said NSD and said customized data into work unit data records, said work unit data records being of the type to specify an activity work unit, and said first data storage means additionally configured so that:

a first portion of said customized data in each work unit data record identifies a work breakdown structure element with which said work unit data record is to be associated;

a second portion of said customized data in each work unit data record specifies a work breakdown structure type (WBST) for said PMT, said WBST specifying one of a milestone or a work package WBST so that an activity work unit in said NST is associated with one of a milestone or a work package in said PMT; and a third portion of said customized data in each work unit data record specifies an earned value method type (EVMT) for use by said PMT in calculating earned value.

16. A system as claimed in Claim 15 wherein:
said second data storage means is configured by said computer for recording said PMD as work breakdown structure data records; and
said bridging tool comprises means for configuring by said computer said second data storage means to include a milestone record for said PMT when a work unit record is described as a milestone WBST, said milestone record having a milestone weight data element, said milestone weight data element being determined in response to said third portion of said customized data.

17. A system as claimed in Claim 16 wherein:
said first data storage means is further configured by said computer so that a fourth portion of said customized data in said work unit data records specifies an arbitrary milestone weight value;
said EVMT specifies that arbitrary milestone weights are to be used in computing earned value and said EVMT specifies that one of a plurality of predetermined X/Y computation algorithms is to be used in computing earned value; and
said configuring means of said bridging tool comprises:
means for assigning one of a plurality of predetermined values to said milestone weight data element, said assigned predetermined value being selected in response to an EVMT which specifies an X/Y computation algorithm, and
means for assigning said fourth portion of said customized data to said milestone weight data element in response to an EVMT which specifies said arbitrary milestone weight.

18. A system as claimed in Claim 15 wherein:
said first data storage means is further configured by said computer so that:
a portion of said NSD in said work unit data records describes a completed percentage of said NST work unit,
said third portion of said customized data in said work unit data records specifies a percent complete EVMT,
a fourth portion of said customized data in each work unit data record specifies a type of percentage to use in performing earned value calculations, said type of percentage indicating a work-accomplished type and said type of percentage indicating a time-line type, and
a fifth portion of said customized data in each work unit data record specifies a completed percentage to be associated with said work unit in said PMT; and
said bridging tool comprises means for configuring by said computer said second data storage means to include a percent complete data element when one of said work unit data records indicates said percent complete EVMT, said percent complete data element containing said completed percentage portion of said NSD if said fourth portion of said customized data does not specify that said type of percentage is a work-accomplished type, and said percent complete data element containing said fifth portion of said customized data if said fourth portion of said customized data specifies that said type of percentage is a work-accomplished type.

19. A computer system for coordinating the management of a project undertaken by an organization and for maintaining alignment of scheduling and performance measurement data, said computer system comprising:
a computer for operating a network scheduling tool (NST) that collects, stores, and processes network schedule data (NSD) and that collects customized data, said NSD describing features of an organization and scheduling and resource management requirements of said project, said customized data describing cost information for said project and including information required only by a performance measurement tool (PMT), said NST generating data which coordinates scheduling for said project;
a first data storage means coupled to said first computer for storing a database which includes said NSD and said customized data for said project;
a bridging tool operating on said computer for generating performance measurement data (PMD) by using said NSD and said customized data, said PMD generated in a form compatible with and aligned for use by said PMT and including said customized data;
a second data storage means coupled to said computer for storing said second PMD; and
a data transfer means for transferring said PMD to a data transfer file for use by said PMT, said PMT responsive to said PMD received from said bridging tool, said PMT being configured to collect, store, and manipulate said PMD PMT generating data which coordinate performance measurement for said project,
wherein:
said NST generates first and second iteration versions of said NSD, and said computer comprises:
means for operating said bridging tool to construct a baseline configuration data file from said first iteration version of said NSD, said baseline configuration data file describing common dates used by said NST and said PMT;
means for operating said bridging tool to compare said baseline configuration data file with dates from said second iteration version of said NSD; and
means, responsive to said means for operating said bridging tool to compare for operating said bridging tool to indicate variance between said second iteration dates and said baseline configuration dates.

20. In a computer system for coordinating the management of a project, said computer system including a network scheduling tool (NST) that collects, stores, and processes network schedule data (NSD) and a performance measurement tool (PMT) that collects, stores, and manipulates performance measurement data (PMD), a method executed by said computer system as part of a computer program for maintaining alignment of information carried by common portions of said NSD and PMD comprising the steps of:
collecting a first iteration of said NSD and customized data by said NST, said NST being operated by a first computer, said first computer being part of said computer system, said NSD and said customized data inputted to said system by users;
transferring by a first data transfer means said first iteration data to a bridging tool being run by said first computer;
operating said bridging tool on said first computer to record a baseline configuration for said common portion of said NSD;
storing said baseline configuration in a first data storage means, said first data storage means part of said computer system;
transferring by a second data transfer means, said baseline configuration from said bridging tool to said PMT operating on a second computer that is part of said computer system;
collecting a second iteration of said NSD and said customized data by said NST;
transferring by said first data transfer means said second iteration data to said bridging tool;
operating said bridging tool on said first computer to compare said second iteration data with said baseline configuration stored in said first data storage means;
operating said bridging tool on said first computer to indicate when said second iteration data varies from said baseline configuration;
operating said bridging tool on said first computer to distinguish an accepted portion of said second iteration data that varies from said baseline from a rejected portion of said second iteration data that varies from said baseline configuration;
storing said accepted position in said first data storage means; and
transferring by said second data transfer means said accepted portion of said second iteration data that varies from said baseline configuration to said PMT.

* * * * *

UNITED STATES PATENT AND TRADEMARK OFFICE
CERTIFICATE OF CORRECTION

PATENT NO.   :  5,381,332
DATED        :  January 10, 1995
INVENTOR(S)  :  Mark A. Wood It is certified that error appears in the above-indentified patent and that said Letters Patent is hereby corrected as shown below:

In column 33, line 67, insert --a-- between "storing" and "database".

In column 35, line 65, insert --, said-- between "PMD" and PMT".

Signed and Sealed this

Twenty-seventh Day of June, 1995

Attest:

BRUCE LEHMAN

Attesting Officer     Commissioner of Patents and Trademarks